(12) United States Patent
Fujikawa et al.

(10) Patent No.: US 11,930,280 B2
(45) Date of Patent: Mar. 12, 2024

(54) IMAGING SUPPORT DEVICE, IMAGING SYSTEM, IMAGING SUPPORT METHOD, AND PROGRAM

(71) Applicant: FUJIFILM Corporation, Tokyo (JP)

(72) Inventors: Tetsuya Fujikawa, Saitama (JP); Shinichiro Fujiki, Saitama (JP); Junichi Tanaka, Saitama (JP); Atsushi Kawanago, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 112 days.

(21) Appl. No.: 17/752,314

(22) Filed: May 24, 2022

(65) Prior Publication Data

US 2022/0294967 A1    Sep. 15, 2022

Related U.S. Application Data

(63) Continuation of application No. PCT/JP2020/039714, filed on Oct. 22, 2020.

(30) Foreign Application Priority Data

Nov. 29, 2019    (JP) .................................. 2019-217418

(51) Int. Cl.
*H04N 23/74*    (2023.01)
*G03B 5/04*    (2021.01)
*H04N 23/56*    (2023.01)

(52) U.S. Cl.
CPC ............... *H04N 23/74* (2023.01); *G03B 5/04* (2013.01); *H04N 23/56* (2023.01); *G03B 2205/0015* (2013.01)

(58) Field of Classification Search
CPC .... H04N 23/56; H04N 23/681; H04N 23/695; H04N 23/74; G03B 15/05;
(Continued)

(56) References Cited

U.S. PATENT DOCUMENTS 6,035,132 A * 3/2000 Washisu .................... G03B 5/00
396/55
9,762,803 B2 * 9/2017 Kunugi ................ H04N 25/704
(Continued)

FOREIGN PATENT DOCUMENTS

CN    102131054 A    7/2011
CN    105842958 A    8/2016
(Continued)

OTHER PUBLICATIONS

An Office Action mailed by the Japan Patent Office dated Mar. 7, 2023, which corresponds to Japanese Patent Application No. 2021-561225 and is related to U.S. Appl. No. 17/752,314; with English translation.
(Continued)

*Primary Examiner* — Amy R Hsu
(74) *Attorney, Agent, or Firm* — Studebaker & Brackett PC

(57) ABSTRACT

A processor of an imaging support device is configured to acquire data related to a shake correction amount of a shake correction mechanism and a focal length of an imaging apparatus in a state where the shake correction mechanism of the imaging apparatus is operating, and adjust an irradiation range of light from an irradiation apparatus for a target subject based on the acquired data related to the shake correction amount and the acquired data related to the focal length.

16 Claims, 37 Drawing Sheets

(58) Field of Classification Search
CPC .... G03B 2205/0007; G03B 2205/0015; G03B 2217/005; G03B 5/04
See application file for complete search history.

(56) References Cited

U.S. PATENT DOCUMENTS

| | | | |
|---|---|---|---|
| 10,057,547 B2* | 8/2018 | Nakamura | H04N 23/6811 |
| 2004/0061796 A1 | 4/2004 | Honda et al. | |
| 2006/0165399 A1 | 7/2006 | Feng et al. | |
| 2007/0019937 A1* | 1/2007 | Endo | H04N 23/68 396/52 |
| 2009/0175608 A1* | 7/2009 | Otake | H04N 23/687 396/55 |
| 2016/0165111 A1* | 6/2016 | Uemura | G02B 7/08 348/208.11 |
| 2017/0230580 A1 | 8/2017 | Ohara et al. | |
| 2017/0234972 A1* | 8/2017 | Takizawa | G01S 17/10 356/5.01 |
| 2017/0289423 A1 | 10/2017 | Yamamoto | |
| 2019/0158747 A1 | 5/2019 | Ohara et al. | |

FOREIGN PATENT DOCUMENTS

| | | |
|---|---|---|
| CN | 107295223 A | 10/2017 |
| JP | H06-18970 A | 1/1994 |
| JP | H06-67255 A | 3/1994 |
| JP | H06-337457 A | 12/1994 |
| JP | H07-13231 A | 1/1995 |
| JP | H08-6126 A | 1/1996 |
| JP | H10-322590 A | 12/1998 |
| JP | 2004-128584 A | 4/2004 |
| JP | 2009-080244 A | 4/2009 |
| JP | 2017-143427 A | 8/2017 |

OTHER PUBLICATIONS

An Office Action mailed by the Japan Patent Office dated Dec. 20, 2022, which corresponds to Japanese Patent Application No. 2021-561225 and is related to U.S. Appl. No. 17/752,314; with English translation.
International Search Report issued in PCT/JP2020/039714; dated Jan. 12, 2021.
Written Opinion issued in PCT/JP2020/039714; dated Jan. 12, 2021.
International Preliminary Report on Patentability issued in PCT/JP2020/039714; completed Jun. 16, 2021.
An Office Action mailed by China National Intellectual Property Administration dated Sep. 29, 2023, which corresponds to Chinese Patent Application No. 202080082669.3 and is related to U.S. Appl. No. 17/752,314; with English translation.

* cited by examiner

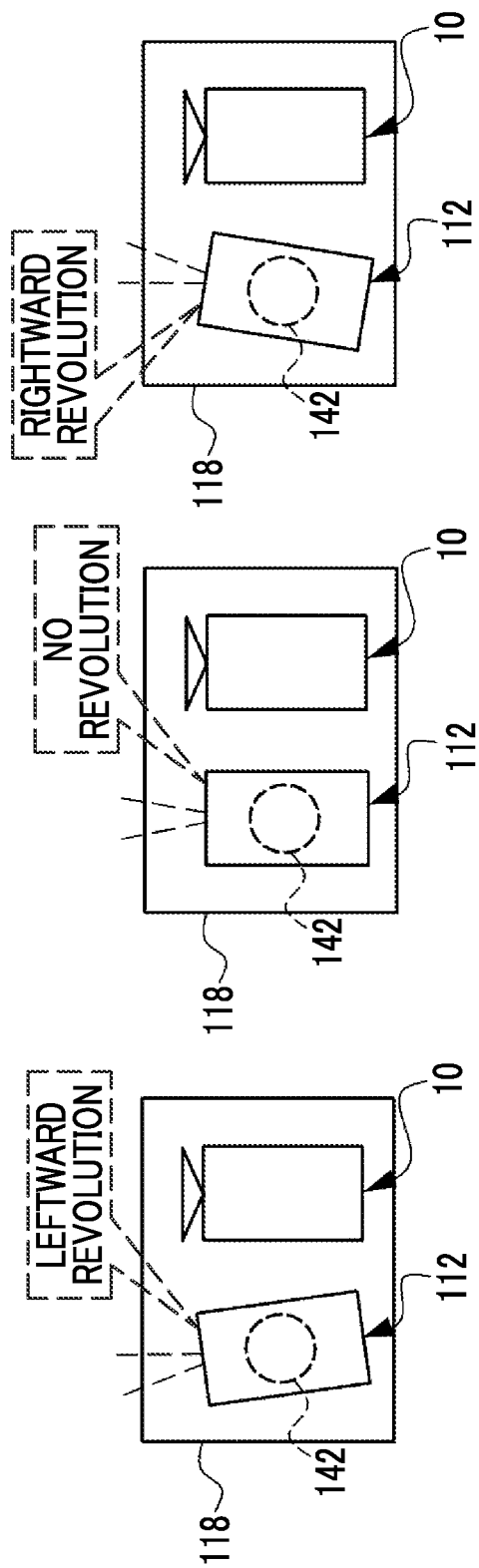

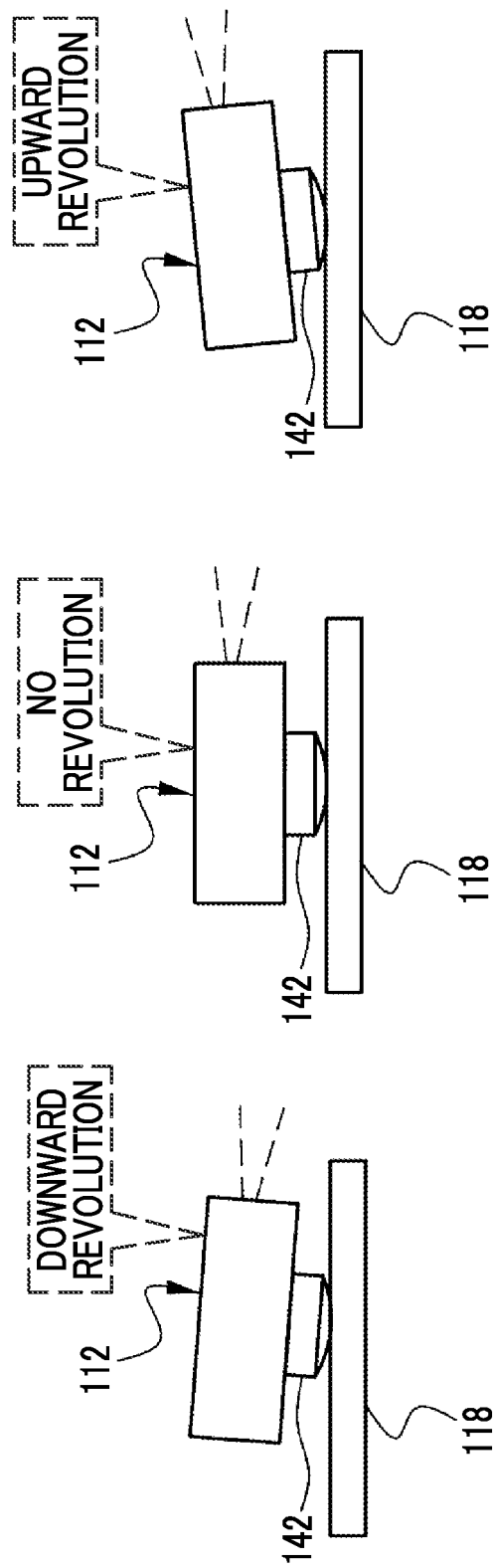

IMAGING SUPPORT DEVICE, IMAGING SYSTEM, IMAGING SUPPORT METHOD, AND PROGRAM

CROSS-REFERENCE TO RELATED APPLICATIONS

This application is a continuation application of International Application No. PCT/JP2020/039714, filed Oct. 22, 2020, the disclosure of which is incorporated herein by reference in its entirety. Further, this application claims priority from Japanese Patent Application No. 2019-217418 filed Nov. 29, 2019, the disclosure of which is incorporated herein by reference in their entirety.

BACKGROUND I/F THE INVENTION

Field of the Invention

The disclosed technology relates to an imaging support device, an imaging system, an imaging support method, and a program.

Description of the Related Art

JP1998-322590A (JP-H10-322590A) discloses an imaging apparatus comprising a detection unit that detects a shake of an imaging unit and outputs a shake signal, a processing unit that generates a shake correction signal by processing a shake vibration when a light emitting unit of auxiliary light is selected to be not used, a shake correction unit that optically corrects the shake based on the shake correction signal, and a control unit that controls the processing unit to a predetermined state at a time of imaging when the light emitting unit is selected to be not used.

JP2004-128584A discloses an imaging apparatus comprising a division unit that divides an exposure time period of an imaging unit into a plurality of time periods, a reading unit that reads out charge signals accumulated in a light receiving portion in each of two periods in imaging as first and second image data, a comparison unit that compares the first and second image data, and a detection unit that detects a relative shake amount between a subject and the imaging apparatus based on a comparison result of the comparison unit.

SUMMARY I/F THE INVENTION

One embodiment according to the disclosed technology provides an imaging support device, an imaging system, an imaging support method, and a program that can adjust an irradiation range of light from an irradiation apparatus for a target subject in accordance with an operation state of a shake correction mechanism.

A first aspect according to the disclosed technology is an imaging support device comprising a processor, and a memory that is connected to or incorporated in the processor, in which the processor is configured to acquire data related to a shake correction amount of a shake correction mechanism and data related to a focal length of an imaging apparatus in a state where the shake correction mechanism of the imaging apparatus is operating, and adjust an irradiation range of light from an irradiation apparatus for a target subject based on the acquired data related to the shake correction amount and the acquired data related to the focal length.

A second aspect according to the disclosed technology is the imaging support device according to the first aspect, in which the processor is configured to acquire data related to a subject distance from the imaging apparatus to the target subject and adjust the irradiation range based on the data related to the subject distance in addition to the data related to the shake correction amount and the data related to the focal length.

A third aspect according to the disclosed technology is the imaging support device according to the second aspect, in which the irradiation apparatus is capable of changing intensity of the light, and the processor is further configured to adjust the intensity of the light based on the subject distance.

A fourth aspect according to the disclosed technology is the imaging support device according to the first aspect, in which the processor is configured to adjust the irradiation range based on data related to an interval between an optical axis of a lens of the irradiation apparatus and an optical axis of a lens of the imaging apparatus, the data related to the shake correction amount, and the data related to the focal length.

A fifth aspect according to the disclosed technology is the imaging support device according to the second or third aspect, in which the processor is configured to adjust the irradiation range based on data related to an interval between an optical axis of a lens of the irradiation apparatus and an optical axis of a lens of the imaging apparatus, the data related to the shake correction amount, the data related to the subject distance, and the data related to the focal length.

A sixth aspect according to the disclosed technology is the imaging support device according to any one of the first to fifth aspects, in which the processor is configured to adjust the irradiation range in a case where a registration control of displacing a captured image by operating the shake correction mechanism is performed.

A seventh aspect according to the disclosed technology is the imaging support device according to the sixth aspect, in which the processor is configured to, in the registration control within a predetermined time period, adjust the irradiation range within a range that is restricted in accordance with a maximum value of a displacement amount of a target subject image in the captured image.

An eighth aspect according to the disclosed technology is the imaging support device according to any one of the first to seventh aspects, in which the processor is configured to adjust the irradiation range in a case where a shake correction control of correcting an image shake due to an external vibration exerted on the imaging apparatus by operating the shake correction mechanism is performed.

A ninth aspect according to the disclosed technology is the imaging support device according to the eighth aspect, in which the processor is configured to, in the shake correction control within a predetermined time period, adjust the irradiation range within a range that is restricted in accordance with a maximum correction amount of the image shake.

A tenth aspect according to the disclosed technology is the imaging support device according to any one of the first to ninth aspects, in which the irradiation apparatus performs surface irradiation of the target subject with the light, and the processor is configured to perform, on the irradiation apparatus, a control of irradiating the target subject with a center region of the light of the surface irradiation from the irradiation apparatus.

An eleventh aspect according to the disclosed technology is the imaging support device according to any one of the first to tenth aspects, in which the imaging apparatus includes a lens that is movable along an optical axis, and the processor is configured to adjust the irradiation range based on data related to a displacement amount of the lens on the optical axis, the data related to the shake correction amount, and the data related to the focal length.

A twelfth aspect according to the disclosed technology is an imaging system comprising the imaging support device according to any one of the first to eleventh aspects, the irradiation apparatus, and the imaging apparatus, in which the irradiation apparatus irradiates the irradiation range adjusted by the imaging support device with the light, and the imaging apparatus images the target subject in a state where the irradiation range is irradiated with the light.

A thirteenth aspect according to the disclosed technology is the imaging system according to the twelfth aspect, further comprising an attachment member to which the irradiation apparatus and the imaging apparatus are attached.

A fourteenth aspect according to the disclosed technology is the imaging system according to the thirteenth aspect, in which the processor is configured to adjust the irradiation range of the light for the target subject based on a difference in attachment position between an attachment position of the irradiation apparatus with respect to the attachment member and an attachment position of the imaging apparatus with respect to the attachment member.

A fifteenth aspect according to the disclosed technology is the imaging system according to the thirteenth or fourteenth aspect, in which the attachment member enables the irradiation apparatus and the imaging apparatus to revolve.

A sixteenth aspect according to the disclosed technology is an imaging support method comprising acquiring a shake correction amount of a shake correction mechanism and a focal length of an imaging apparatus in a state where the shake correction mechanism is operating in the imaging apparatus including the shake correction mechanism, and adjusting an irradiation range of light from an irradiation apparatus for a target subject that is a target of imaging, based on the acquired shake correction amount and the acquired focal length.

A seventeenth aspect according to the disclosed technology is a program causing a computer to execute a process comprising acquiring a shake correction amount of a shake correction mechanism and a focal length of an imaging apparatus in a state where the shake correction mechanism is operating in the imaging apparatus including the shake correction mechanism, and adjusting an irradiation range of light from an irradiation apparatus for a target subject that is a target of imaging, based on the acquired shake correction amount and the acquired focal length.

BRIEF DESCRIPTION I/F THE DRAWINGS

FIG. 20 is a schematic plan view illustrating a state where an irradiation apparatus according to the first modification example rotates.

FIG. 21 is a schematic side view illustrating a state where the irradiation apparatus according to the first modification example rotates.

DESCRIPTION I/F THE PREFERRED EMBODIMENTS

An example of an embodiment according to the disclosed technology will be described in accordance with the appended drawings.

First, words used in the following description will be described.

CPU is an abbreviation for "Central Processing Unit". RAM is an abbreviation for "Random Access Memory". ROM is an abbreviation for "Read Only Memory". ASIC is an abbreviation for "Application Specific Integrated Circuit". PLD is an abbreviation for "Programmable Logic Device". FPGA is an abbreviation for "Field-Programmable Gate Array". AFE is an abbreviation for "Analog Front End". DSP is an abbreviation for "Digital Signal Processor". ISP is an abbreviation for "Image Signal Processor". SoC is an abbreviation for "System-on-a-Chip". CMOS is an abbreviation for "Complementary Metal Oxide Semiconductor". CCD is an abbreviation for "Charge Coupled Device". SWIR is an abbreviation for "Short-Wavelength InfraRed".

SSD is an abbreviation for "Solid State Drive". USB is an abbreviation for "Universal Serial Bus". HDD is an abbreviation for "Hard Disk Drive". EEPROM is an abbreviation for "Electrically Erasable and Programmable Read Only Memory". EL is an abbreviation for "Electro-Luminescence". A/D is an abbreviation for "Analog/Digital". OF is an abbreviation for "Interface". UI is an abbreviation for "User Interface". WAN is an abbreviation for "Wide Area Network". CRT is an abbreviation for "Cathode Ray Tube". OIS is an abbreviation for "Optical Image Stabilizer". BIS is an abbreviation for "Body Image Stabilizer".

In the description of the present specification, "parallel" refers to being parallel in a sense of not only being completely parallel but also including an error generally allowed in the technical field to which the disclosed technology belongs. In the description of the present specification, "perpendicular" refers to being perpendicular in a sense of not only being completely perpendicular but also including an error generally allowed in the technical field to which the disclosed technology belongs.

First Embodiment

Figure 1:
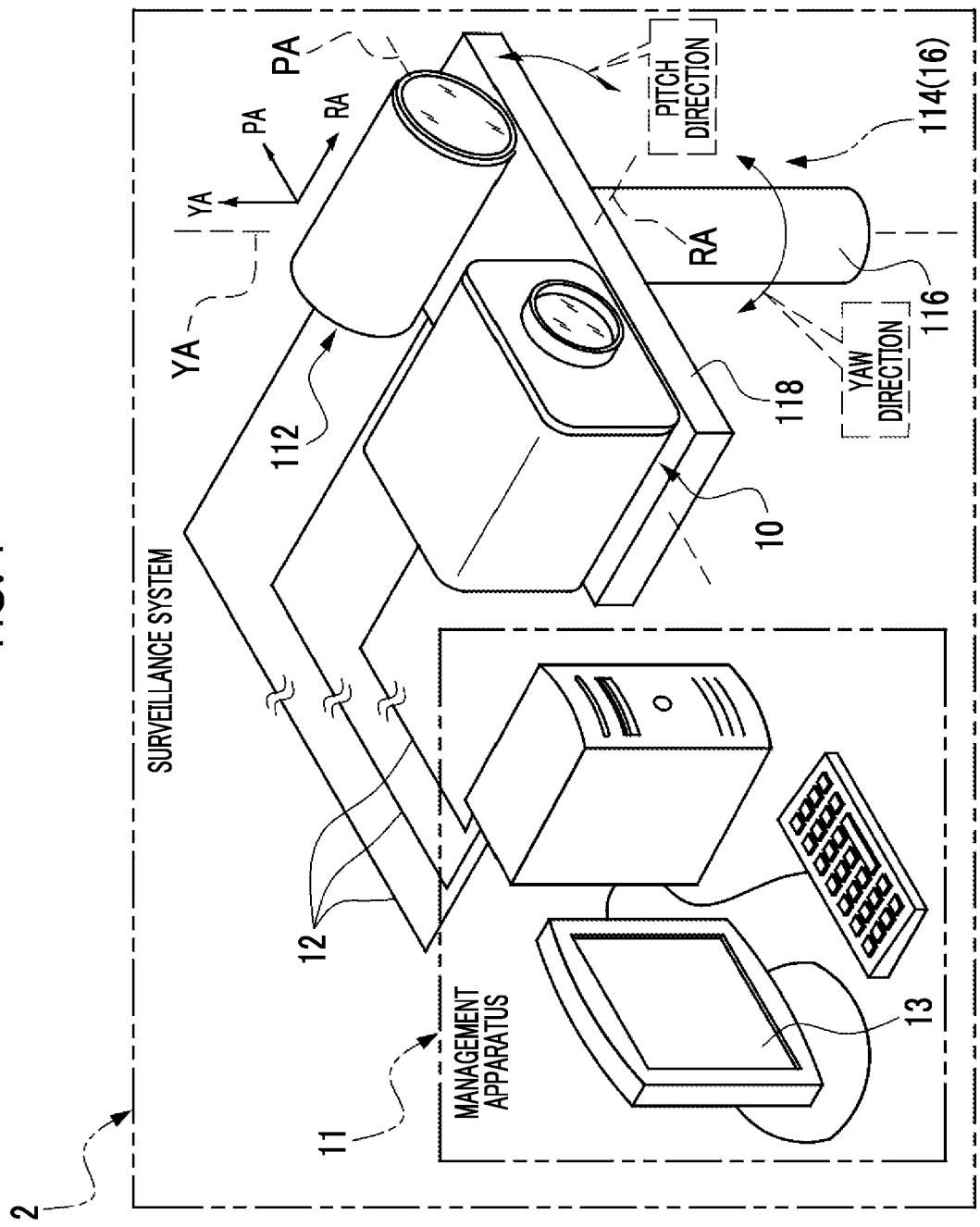
FIG. 1 is a schematic configuration diagram illustrating an example of a configuration of a surveillance system according to a first embodiment.

As illustrated in FIG. 1 as an example, a surveillance system 2 comprises a surveillance camera 10, an irradiation apparatus 112, an attachment member 114, and a management apparatus 11. The surveillance system 2 is an example of an "imaging system" according to the embodiment of the disclosed technology. The surveillance camera 10 is an example of an "imaging apparatus" according to the embodiment of the disclosed technology. The management apparatus 11 is an example of an "imaging support device" according to the embodiment of the disclosed technology. The attachment member 114 of the present embodiment doubles as a revolution mechanism 16 as will be described later.

The surveillance camera 10 is installed on an indoor or outdoor road surface, post, or wall, a part (for example, a rooftop) of a building, or the like through the attachment member 114, images a surveillance target (hereinafter, referred to as an "imaging region") that is a subject, and generates a motion picture image by the imaging. The motion picture image includes images of a plurality of frames obtained by imaging. The surveillance camera 10 transmits the motion picture image obtained by imaging to the management apparatus 11 through a communication line 12.

The management apparatus 11 comprises a display 13. Examples of the display 13 include a liquid crystal display, a plasma display, an organic EL display, and a CRT display.

In the management apparatus 11, the motion picture image transmitted by the surveillance camera 10 is received, and the received motion picture image is displayed on the display 13.

In the present embodiment, the attachment member 114 includes a support post 116 and a support table 118 attached to an upper portion of the support post 116. The surveillance camera 10 and the irradiation apparatus 112 are attached to the support table 118. In the first embodiment, the surveillance camera 10 and the irradiation apparatus 112 are fixed to the support table 118.

The support table 118 can revolve about the support post 116. By this revolution, the surveillance camera 10 and the irradiation apparatus 112 can also revolve together with the support table 118. Specifically, the revolution mechanism 16 is a 2-axis revolution mechanism that can rotate in a revolution direction (hereinafter, referred to as a "pitch direction") about a pitch axis PA as a central axis and can rotate in a revolution direction (hereinafter, referred to as a "yaw direction") about a yaw axis YA as a central axis. In such a manner, in the present embodiment, the attachment member 114 doubles as the revolution mechanism 16. While an example of the 2-axis revolution mechanism is illustrated as the revolution mechanism 16, the disclosed technology is not limited thereto, and a 3-axis revolution mechanism may be used.

Figure 2:
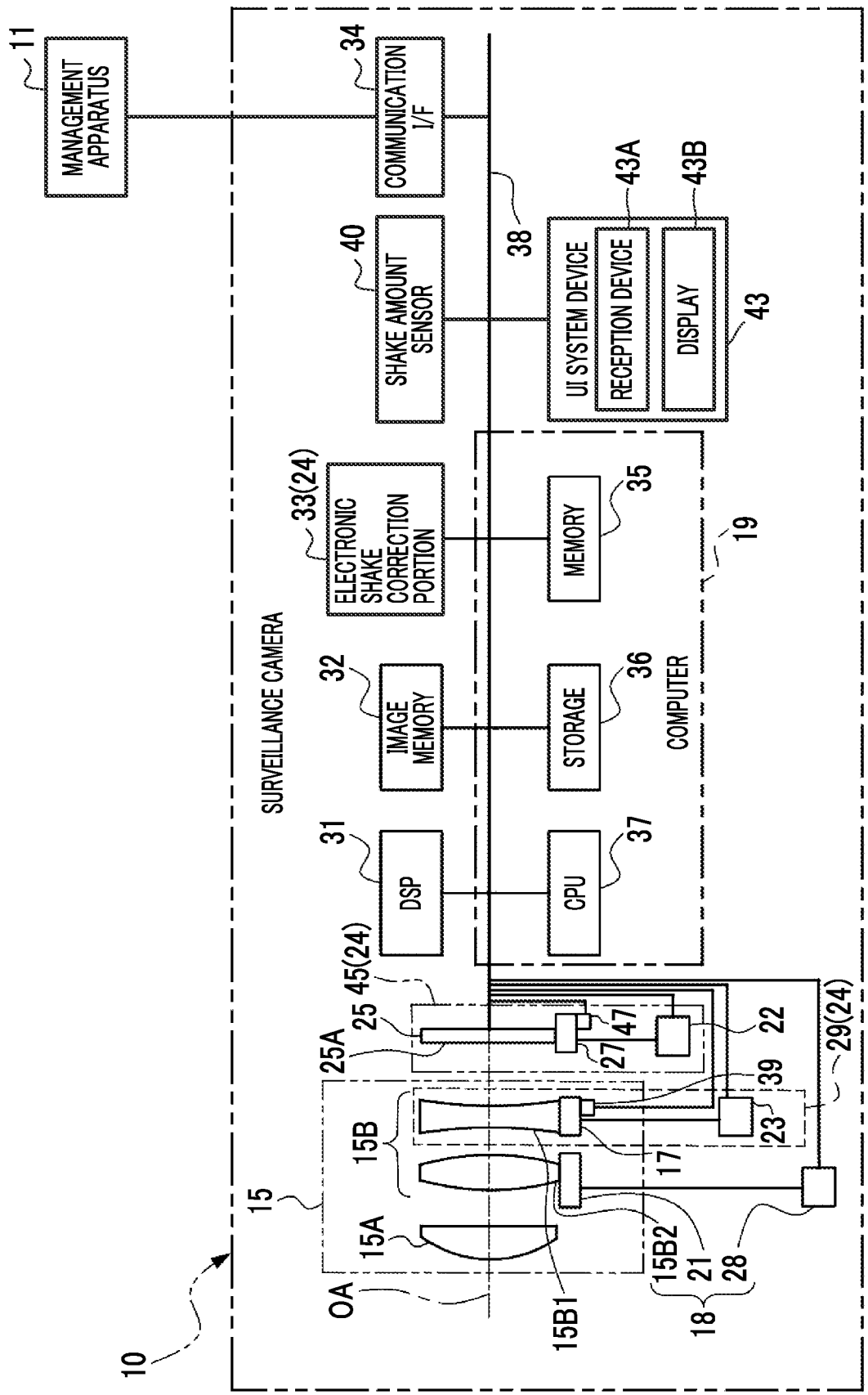
FIG. 2 is a block diagram illustrating an example of a configuration of an optical system and an electric system of a surveillance camera according to the first embodiment.

As illustrated in FIG. 2 as an example, the surveillance camera 10 comprises an optical system 15 and an imaging element 25. The imaging element 25 is positioned on a rear stage of the optical system 15. The imaging element 25 comprises a light-receiving surface 25A. An image of light of imaging region is formed on the light-receiving surface 25A by the optical system 15, and the imaging region is captured by the imaging element 25.

The surveillance camera 10 comprises a computer 19, a displacement driver 22, a displacement driver 23, a zoom driver 28, a DSP 31, an image memory 32, an electronic shake correction portion 33, a communication I/F 34, position sensors 39 and 47, a shake amount sensor 40, and a UI system device 43. The computer 19 comprises a memory 35, a storage 36, and a CPU 37.

The displacement driver 22, the displacement driver 23, the imaging element 25, the zoom driver 28, the DSP 31, the image memory 32, the electronic shake correction portion 33, the communication I/F 34, the memory 35, the storage 36, the CPU 37, the position sensors 39 and 47, the shake amount sensor 40, and the UI system device 43 are connected to a bus 38. In the example illustrated in FIG. 2, while one bus is illustrated as the bus 38 for convenience of illustration, a plurality of buses may be used. The bus 38 may be a serial bus or may be a parallel bus including a data bus, an address bus, a control bus, and the like.

The memory 35 temporarily stores various information and is used as a work memory. Examples of the memory 35 include a RAM. However, the disclosed technology is not limited thereto. A storage device of other types may be used.

The storage 36 stores various programs for the surveillance camera 10. The CPU 37 controls the entire surveillance camera 10 by reading out various programs from the storage 36 and executing the read various programs on the memory 35. Examples of the storage 36 include a flash memory, an SSD, an EEPROM, or an HDD. In addition, for example, various non-volatile memories such as a magnetoresistive memory and a ferroelectric memory may be used instead of the flash memory or together with the flash memory.

In the present embodiment, the imaging element 25 is a CMOS image sensor. The imaging element 25 images the target subject at a predetermined frame rate under an instruction of the CPU 37. Here, for example, the "predetermined frame rate" refers to a few tens of frames/second to a few hundred frames/second. The imaging element 25 may incorporate a control device (imaging element control device). In this case, the imaging element control device performs detailed controls inside imaging element 25 in accordance with an imaging instruction output by the CPU 37. In addition, the imaging element 25 may image a target subject at the predetermined frame rate under an instruction of the DSP 31. In this case, the imaging element control device performs the detailed controls inside the imaging element 25 in accordance with the imaging instruction output by the DSP 31. The DSP 31 may be referred to as an ISP.

The light-receiving surface 25A of the imaging element 25 is formed with a plurality of photosensitive pixels (not illustrated) arranged in a matrix. In the imaging element 25, photoelectric conversion is performed for each photosensitive pixel by exposing each photosensitive pixel.

Charges obtained by performing the photoelectric conversion for each photosensitive pixel correspond to an analog imaging signal indicating the target subject. Here, a plurality of photoelectric conversion elements (for example, photoelectric conversion elements in which infrared light transmissive filters are arranged) having sensitivity to infrared light are employed as the plurality of photosensitive pixels.

In the surveillance camera 10, imaging based on the infrared light (for example, light on a long wavelength side of approximately 700 nanometers) is performed using the photoelectric conversion elements having sensitivity to the infrared light. Particularly, for imaging for SWIR, for example, an InGaAs sensor and/or a type-2 quantum well (T2SL; Simulation of Type-II Quantum Well) sensor may be used as the imaging element 25 instead of the CMOS image sensor. However, the present embodiment is not limited thereto. Imaging based on visible light (for example, light on a short wavelength side of less than or equal to approximately 700 nanometers) may be performed using photoelectric conversion elements having sensitivity to the visible light. Alternatively, photoelectric conversion elements having sensitivity to both of the visible light and the infrared light may be used. Alternatively, an incidence ray transmitted through the optical system 15 may be separated into the visible light and the infrared light by a filter, a dichroic prism, or the like, and photoelectric conversion elements having sensitivity to each light may be used.

The imaging element 25 generates a digital image by performing signal processing such as A/D conversion on the analog imaging signal. The imaging element 25 is connected to the DSP 31 through the bus 38 and outputs the generated digital image to the DSP 31 in units of frames through the bus 38. Here, the digital image is an example of a "captured image" according to the embodiment of the disclosed technology.

Here, while the CMOS image sensor is illustratively described as an example of the imaging element 25, the disclosed technology is not limited thereto. A CCD image sensor may be applied as the imaging element 25. In this case, the imaging element 25 is connected to the bus 38 through an AFE (not illustrated) that incorporates a CCD driver. The AFE generates the digital image by performing the signal processing such as the A/D conversion on the analog imaging signal obtained by the imaging element 25 and outputs the generated digital image to the DSP 31. The CCD image sensor is driven by the CCD driver incorporated in the AFE. The CCD driver may be independently provided.

The DSP 31 performs various digital signal processing on the digital image. For example, the various digital signal processing refers to demosaicing, noise removal processing, gradation correction processing, and color correction processing.

The DSP 31 outputs the digital image after the digital signal processing to the image memory 32 for each frame. The image memory 32 stores the digital image from the DSP 31. Hereinafter, for convenience of description, the digital image stored in the image memory 32 will be referred to as the "captured image".

The shake amount sensor 40 is, for example, a device including a gyro sensor and detects the shake amount of the surveillance camera 10. The gyro sensor detects an amount of a rotational shake about each axis of the pitch axis PA, the yaw axis YA, and a roll axis RA (axis parallel to an optical axis OA). The shake amount sensor 40 detects the shake amount of the surveillance camera 10 by converting the amount of the rotational shake about the pitch axis PA and the amount of the rotational shake about the yaw axis YA detected by the gyro sensor into a shake amount in a two-dimensional plane parallel to the pitch axis PA and the yaw axis YA. The shake amount sensor 40 outputs the detected shake amount to the CPU 37.

Here, while the gyro sensor is illustrated as an example of the shake amount sensor 40, this is merely an example. The shake amount sensor 40 may be an acceleration sensor. The acceleration sensor detects the shake amount in the two-dimensional plane parallel to the pitch axis PA and the yaw axis YA.

In addition, here, while an example of a form of detecting the shake amount by the shake amount sensor 40 that is a physical sensor is illustrated, the disclosed technology is not limited thereto. For example, a movement vector obtained by comparing captured images that are stored in the image memory 32 and are adjacent to each other in time series may be used as the shake amount. In addition, a finally used shake amount may be derived based on the shake amount detected by the physical sensor and the movement vector obtained by the image processing.

The CPU 37 acquires the shake amount detected by the shake amount sensor 40 and controls a lens side shake correction mechanism 29, an imaging element side shake correction mechanism 45, and the electronic shake correction portion 33 based on the acquired shake amount. The shake amount detected by the shake amount sensor 40 is used for correction of the shake by each of the lens side shake correction mechanism 29, the imaging element side shake correction mechanism 45, and the electronic shake correction portion 33.

A shake correction portion 24 according to the embodiment of the disclosed technology includes the lens side shake correction mechanism 29, the imaging element side shake correction mechanism 45, and the electronic shake correction portion 33. That is, as will be described later, the shake correction portion 24 performs a shake correction control and a registration control by performing correction of displacing the captured image using any one or a plurality out of the lens side shake correction mechanism 29, the imaging element side shake correction mechanism 45, and the electronic shake correction portion 33. Particularly, in the first embodiment, the shake correction control of the captured image is performed.

The electronic shake correction portion 33 is a device including an ASIC. The electronic shake correction portion 33 corrects the shake by performing the image processing on the captured image obtained by imaging performed by the imaging element 25 in the image memory 32 based on the shake amount detected by the shake amount sensor 40.

In addition, here, while the device including the ASIC is illustrated as the electronic shake correction portion 33, the disclosed technology is not limited thereto. For example, a device including an FPGA or a PLD may be used. In addition, for example, the electronic shake correction portion 33 may be a device including a plurality out of the ASIC, the FPGA, and the PLD. In addition, a computer including a CPU, a storage, and a memory may be employed as the electronic shake correction portion 33. The number of CPUs may be singular or plural. In addition, the electronic shake correction portion 33 may be implemented by a combination of a hardware configuration and a software configuration.

The communication I/F 34 is, for example, a network interface and controls transfer of various information with respect to the management apparatus 11 through a network. Examples of the network include a WAN such as the Internet or a public communication network. Communication between the surveillance camera 10 and the management apparatus 11 is controlled.

The UI system device 43 comprises a reception device 43A and a display 43B. The reception device 43A includes, for example, a hard key and a touch panel and receives various instructions from the user. The CPU 37 acquires the various instructions received by the reception device 43A and operates in accordance with the acquired instructions.

The display 43B displays various information under control of the CPU 37. Examples of the various information displayed on the display 43B include contents of the various instructions received by the reception device 43A and the captured image.

The optical system 15 comprises an objective lens 15A and a lens group 15B. The objective lens 15A and the lens group 15B are arranged in an order of the objective lens 15A and the lens group 15B along the optical axis OA of the optical system 15 from the target subject side to the light-receiving surface 25A side of the imaging element 25. The lens group 15B includes an anti-vibration lens 15B1, a focus lens (not illustrated), a zoom lens 15B2, and the like. Various lenses (not illustrated) may be comprised as the optical system 15 in addition to the objective lens 15A and the lens group 15B. Furthermore, the optical system 15 may comprise a stop. Positions of the lenses, the lens group, and the stop included in the optical system 15 are not limited. For example, the disclosed technology is also established for positions different from the positions illustrated in FIG. 2.

The surveillance camera 10 comprises an actuator 17, an actuator 21, and an actuator 27. The anti-vibration lens 15B1 is movably supported in a direction perpendicular to the optical axis OA by the actuator 17. The zoom lens 15B2 is movably supported along the optical axis OA by the actuator 21. The imaging element 25 is movably supported in the direction perpendicular to the optical axis OA by the actuator 27.

The actuator 17 applies motive power to the anti-vibration lens 15B1 to change the anti-vibration lens 15B1 in a direction perpendicular to the optical axis OA. The actuator 17 is controlled by the CPU 37 through the displacement driver 23. The displacement driver 23 changes the position of the anti-vibration lens 15B1 in the direction perpendicular to the optical axis OA by operating the actuator 17 in accordance with an instruction from the CPU 37.

The actuator 21 applies motive power to the zoom lens 15B2 to move the zoom lens 15B2 along the optical axis OA. The actuator 21 is controlled by the CPU 37 through the zoom driver 28. The zoom driver 28 moves the position of the zoom lens 15B2 along the optical axis OA by operating the actuator 21 in accordance with the instruction from the CPU 37.

In such a manner, by moving the zoom lens 15B2, the surveillance camera 10 can continuously change a focal length X (refer to FIG. 8A and the like) and may employ values of a plurality of focal lengths X. A configuration that may employ the plurality of focal lengths X is not limited to a configuration including the zoom lens 15B2 and may be, for example, a lens-interchangeable camera. In this case, a value of a focal length set for each interchangeable lens is employed.

The actuator 27 applies motive power to the imaging element 25 to change the imaging element 25 in the direction perpendicular to the optical axis OA. The actuator 27 is controlled by the CPU 37 through the displacement driver 22. The displacement driver 22 moves a position of the imaging element 25 in the direction perpendicular to the optical axis OA by operating the actuator 27 in accordance with the instruction from the CPU 37.

The surveillance camera 10 includes a variable magnification mechanism 18. The variable magnification mechanism 18 is a mechanism that is configured with the zoom lens 15B2, the actuator 21, and the zoom driver 28 and enables the focal length X of the surveillance camera 10 to be changed. The CPU 37 changes the focal length X by operating the actuator 21 through the zoom driver 28. The diagram of the variable magnification mechanism 18 illustrated in the embodiment of the disclosed technology is merely a conceptual diagram. The variable magnification mechanism 18 may employ various configurations.

Examples of a vibration exerted on the surveillance camera 10 include, in a case of an outdoor space, a vibration caused by traffic of an automobile, a vibration caused by wind, a vibration caused by construction work, and the like and, in a case of an indoor space, a vibration caused by an operation of an air conditioner, a vibration caused by entrance and exit of a person, and the like. Thus, in the surveillance camera 10, a shake occurs due to the vibration exerted on the surveillance camera 10 (hereinafter, simply referred to as the "vibration"). In the present specification, the shake that occurs due to the vibration will be simply referred to as the "shake".

In the disclosed technology, the surveillance camera 10 and the irradiation apparatus 112 are attached to the attachment member 114. Accordingly, in a case where the attachment member 114 vibrates, this vibration is transmitted to both of the surveillance camera 10 and the irradiation apparatus 112.

In the present embodiment, the "shake" refers to a phenomenon in which a subject image on the light-receiving surface 25A of the imaging element 25 changes due to a change in positional relationship between the optical axis OA and the light-receiving surface 25A in the surveillance camera 10. In other words, the "shake" is said to be a phenomenon in which an optical image obtained by forming the image on the light-receiving surface 25A changes by inclination of the optical axis OA due to the vibration exerted on the surveillance camera 10. For example, changing of the optical axis OA means inclination of the optical axis OA with respect to a reference axis (for example, the optical axis OA before the shake occurs.

The shake is included in the captured image as a noise component and affects image quality of the captured image. Therefore, in order to remove the noise component included in the captured image due to the shake, the surveillance camera 10 comprises a shake correction portion 24.

In the disclosed technology, the shake correction portion 24 includes the lens side shake correction mechanism 29, the imaging element side shake correction mechanism 45, and the electronic shake correction portion 33. The lens side shake correction mechanism 29 is a mechanism that corrects the shake by applying motive power generated by a driving source such as a motor (for example, a voice coil motor) to the anti-vibration lens to move the anti-vibration lens in the direction perpendicular to the optical axis of the imaging optical system. The imaging element side shake correction mechanism 45 is a mechanism that corrects the shake by applying motive power generated by a driving source such as a motor (for example, a voice coil motor) to the imaging element to move the imaging element in the direction perpendicular to the optical axis of the imaging optical system. The electronic shake correction portion 33 corrects the shake by performing image processing on a captured image based on a shake amount. That is, the shake correction portion 24 mechanically or electronically corrects the shake using a hardware configuration and/or a software configuration. Here, mechanical correction of the shake refers to correction of the shake implemented by mechanically moving a shake correction element such as an anti-vibration lens and/or an imaging element using motive power generated by a driving source such as a motor (for example, a voice coil motor). Electronic correction of the shake refers to correction of the shake implemented by performing the image processing by a processor. All of the lens side shake correction mechanism 29, the imaging element side shake correction mechanism 45, and the electronic shake correction portion 33 are used for correcting the shake. In addition, in the present embodiment, "correction of the shake" includes a meaning of removing the shake and also a meaning of reducing the shake.

The lens side shake correction mechanism 29 is a mechanism that moves the anti-vibration lens 15B1 in the direction perpendicular to the optical axis OA. The imaging element side shake correction mechanism 45 is a mechanism that moves a region of the captured image in the imaging element 25 in the direction perpendicular to the optical axis OA by moving the imaging element 25 in the direction perpendicular to the optical axis OA. The electronic shake correction portion 33 is a mechanism that does not move the anti-vibration lens 15B1 and the imaging element 25 and moves a region of an imaging range PE in the imaging element 25 in the direction perpendicular to the optical axis OA by moving a range of pixels extracted from the imaging element 25 as the imaging range PE.

The lens side shake correction mechanism 29 comprises the anti-vibration lens 15B1, the actuator 17, the displacement driver 23, and the position sensor 39.

Various well-known methods can be employed as a method of correcting the shake by the lens side shake correction mechanism 29. In the present embodiment, a method of moving the anti-vibration lens 15B1 based on the shake amount detected by the shake amount sensor 40 is employed as the method of correcting the shake. Specifically, the shake is corrected by moving the anti-vibration lens 15B1 in a direction of canceling the shake by an amount with which the shake is canceled.

The actuator 17 is attached to the anti-vibration lens 15B1. The actuator 17 is a shift mechanism in which a voice coil motor is mounted, and changes the anti-vibration lens 15B1 in the direction perpendicular to the optical axis OA by driving the voice coil motor. Here, while the shift mechanism in which the voice coil motor is mounted is employed as the actuator 17, the disclosed technology is not limited thereto. Other motive power sources such as a stepping motor or a piezo element may be applied instead of the voice coil motor.

Driving of the actuator 17 is controlled by the displacement driver 23. Driving the actuator 17 under control of the displacement driver 23 mechanically changes the position of the anti-vibration lens 15B1 in a two-dimensional plane perpendicular to the optical axis OA.

The position sensor 39 detects the current position of the anti-vibration lens 15B1 and outputs a position signal indicating the detected current position. Here, a device including a hall element is employed as an example of the position sensor 39. Here, the current position of the anti-vibration lens 15B1 refers to the current position in a two-dimensional plane of the anti-vibration lens 15B1 (hereinafter, referred to as an anti-vibration lens two-dimensional plane). The anti-vibration lens two-dimensional plane refers to a two-dimensional plane perpendicular to the optical axis OA. In the present embodiment, while the device including the hall element is employed as an example of the position sensor 39, the disclosed technology is not limited thereto. A magnetic sensor, a photosensor, or the like may be employed instead of the hall element.

The lens side shake correction mechanism 29 corrects the shake by moving the anti-vibration lens 15B1 along at least one of the pitch axis PA or the yaw axis YA. That is, the lens side shake correction mechanism 29 corrects the shake by moving the anti-vibration lens 15B1 by a movement amount corresponding to the shake amount detected by the shake amount sensor 40 in the anti-vibration lens two-dimensional plane.

The imaging element side shake correction mechanism 45 is configured with the imaging element 25, the displacement driver 22, the actuator 27, and the position sensor 47.

In the same manner as the method of correcting the shake by the lens side shake correction mechanism 29, various well-known methods can be employed as a method of correcting the shake by the imaging element side shake correction mechanism 45. In the present embodiment, a method of moving the imaging element 25 by the displacement driver 22 through the actuator 27 in accordance with the instruction from the CPU 37 based on the shake amount detected by the shake amount sensor 40 is employed as the method of correcting the shake. Specifically, the shake is corrected by moving the imaging element 25 in the direction of canceling the shake by the amount with which the shake is canceled.

The actuator 27 is a shift mechanism in which a voice coil motor is mounted, and changes the imaging element 25 in the direction perpendicular to the optical axis OA by driving the voice coil motor. Here, while the shift mechanism in which the voice coil motor is mounted is employed as the actuator 27, the disclosed technology is not limited thereto. Other motive power sources such as a stepping motor or a piezo element may be applied instead of the voice coil motor.

The position sensor 47 detects the current position of the imaging element 25 and outputs a position signal indicating the detected current position. Here, a device including a hall element is employed as an example of the position sensor 47. Here, the current position of the imaging element 25 refers to the current position in a two-dimensional plane of the imaging element 25 (hereinafter, referred to as an imaging element two-dimensional plane). The imaging element two-dimensional plane refers to a two-dimensional plane perpendicular to the optical axis OA. In the present embodiment, while the device including the hall element is employed as an example of the position sensor 47, the disclosed technology is not limited thereto. A magnetic sensor, a photosensor, or the like may be employed instead of the hall element.

The imaging element side shake correction mechanism 45 corrects the shake by moving the imaging element 25 along at least one of the pitch axis PA or the yaw axis YA. That is, the imaging element side shake correction mechanism 45 corrects the shake by moving the imaging element 25 by a movement amount corresponding to the shake amount detected by the shake amount sensor 40 in the imaging element two-dimensional plane.

Figure 3:
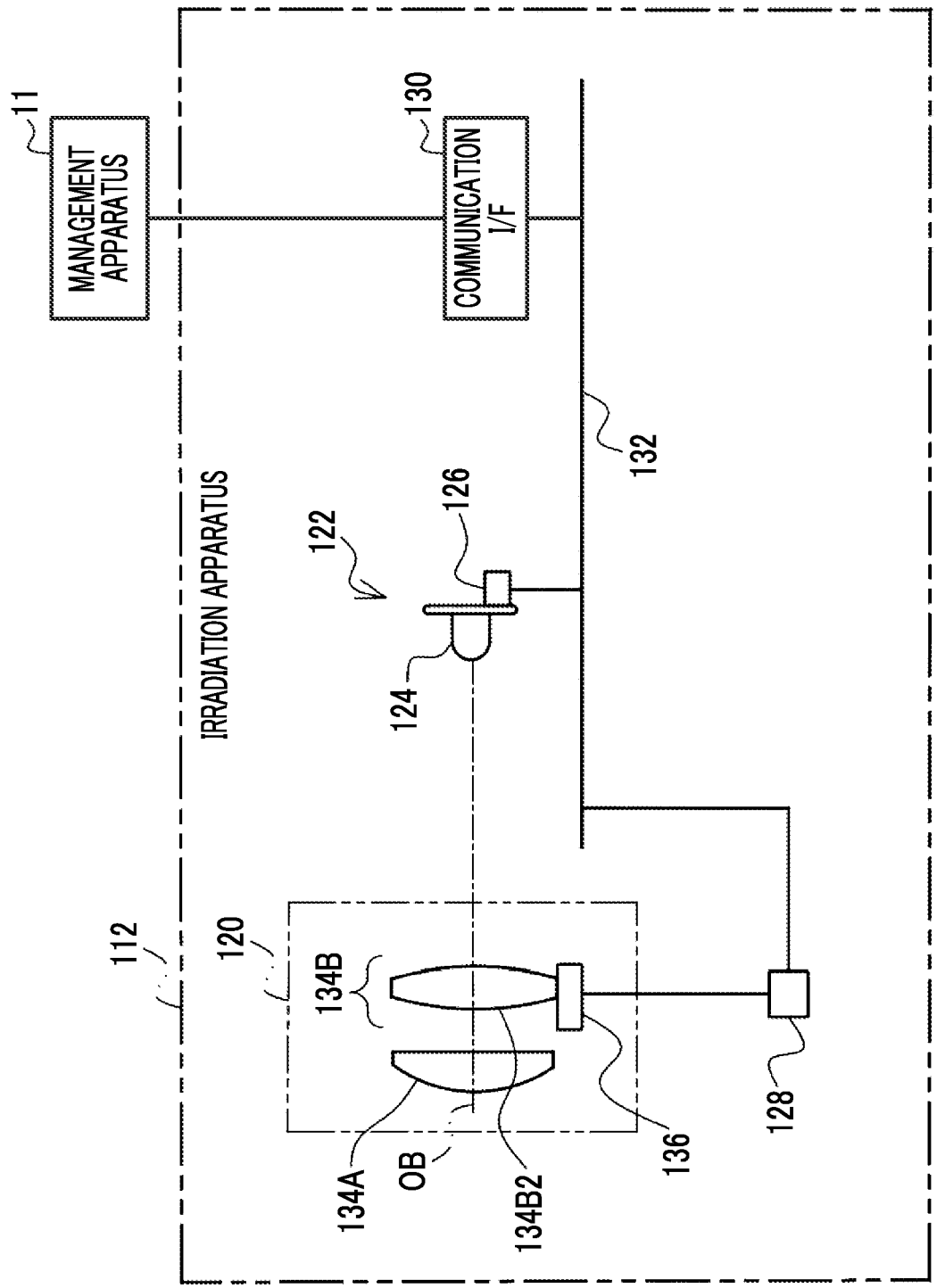
FIG. 3 is a block diagram illustrating an example of a configuration of an optical system and an electric system of an irradiation apparatus according to the first embodiment.

As illustrated in FIG. 3 as an example, the irradiation apparatus 112 comprises an optical system 120 and a light emitting portion 122. The light emitting portion 122 includes a light source 124 that emits light, and a light source driver 126 that controls driving of the light source 124. The light emitted from the light source 124 is transmitted through the optical system 120 and is emitted outside the irradiation apparatus 112 by irradiation. The light source 124 can change intensity of the emitted light.

Furthermore, the irradiation apparatus 112 comprises a zoom driver 128 and a communication I/F 130.

The light source driver 126, the zoom driver 128, and the communication I/F 130 are connected to a bus 132. In the example illustrated in FIG. 3, while one bus is illustrated as the bus 132 for convenience of illustration, a plurality of buses may be used. The bus 132 may be a serial bus or may be a parallel bus including a data bus, an address bus, a control bus, and the like.

The light source 124 is, for example, a light emitting diode. In the surveillance camera 10 of the present embodiment, imaging based on the infrared light is performed as described above. Thus, the light source 124 emits the infrared light. In this case, an infrared LED or an infrared laser can be used as the light source 124. In a case of performing imaging based on the visible light, the light source 124 may emit the visible light.

The optical system 120 comprises an objective lens 134A and a lens group 134B. The objective lens 134A and the lens group 134B are arranged in an order of the objective lens 134A and the lens group 134B along an optical axis OB of the optical system 120 from the target subject side, that is, an irradiation target side, to the light source 124 side. The lens group 134B includes a zoom lens 134B2, various lenses (not illustrated), and the like. Various lenses (not illustrated) may be further comprised as the optical system 120 in addition to the objective lens 134A and the lens group 134B. Furthermore, the optical system 120 may comprise a stop. Positions of the lenses, the lens group, and the stop included in the optical system 120 are not limited. For example, the disclosed technology is also established for positions different from the positions illustrated in FIG. 3.

The irradiation apparatus 112 comprises an actuator 136. The zoom lens 134B2 is movably supported along the optical axis OB by the actuator 136.

The actuator 136 applies motive power to the zoom lens 134B2 to move the zoom lens 134B2 along the optical axis OB of the optical system 120. The actuator 136 is controlled by the CPU 60A of the management apparatus 11 through the zoom driver 128. The zoom driver 128 moves a position of the zoom lens 134B2 along the optical axis OB by operating the actuator 136 in accordance with an instruction from the CPU 60A. By moving the zoom lens 134B2 along the optical axis OB, an irradiation range of the light from the irradiation apparatus 112, that is, a spreading angle of the light, is adjusted.

The light source driver 126 instructs the light source 124 to emit light of a decided light quantity. That is, in the present embodiment, the intensity of the light of irradiation from the irradiation apparatus 112 can be adjusted. The light source 124 is controlled by the CPU 60A of the management apparatus 11 through the light source driver 126.

In the disclosed technology, the mechanism that includes the zoom lens 134B2, the actuator 136, and the zoom driver 128 and is illustrated as a mechanism adjusting the irradiation range of the light in the irradiation apparatus 112 is merely a conceptual diagram. The mechanism adjusting the irradiation range of the light may employ various configurations.

The communication I/F 130 receives a control signal from the management apparatus 11. The irradiation apparatus 112 is driven based on the control signal from the management apparatus 11. More specifically, the communication I/F 130 is, for example, a network interface. The communication I/F 130 is communicably connected to a communication OF 80 (refer to FIG. 5) of the management apparatus 11 through a network and controls transfer of various information with respect to the management apparatus 11. For example, the communication I/F 130 requests the management apparatus 11 to transmit information related to the irradiation range of the light. In the management apparatus 11, the information is transmitted from the communication I/F 80 in response to the request of the irradiation apparatus 112.

Figure 4:
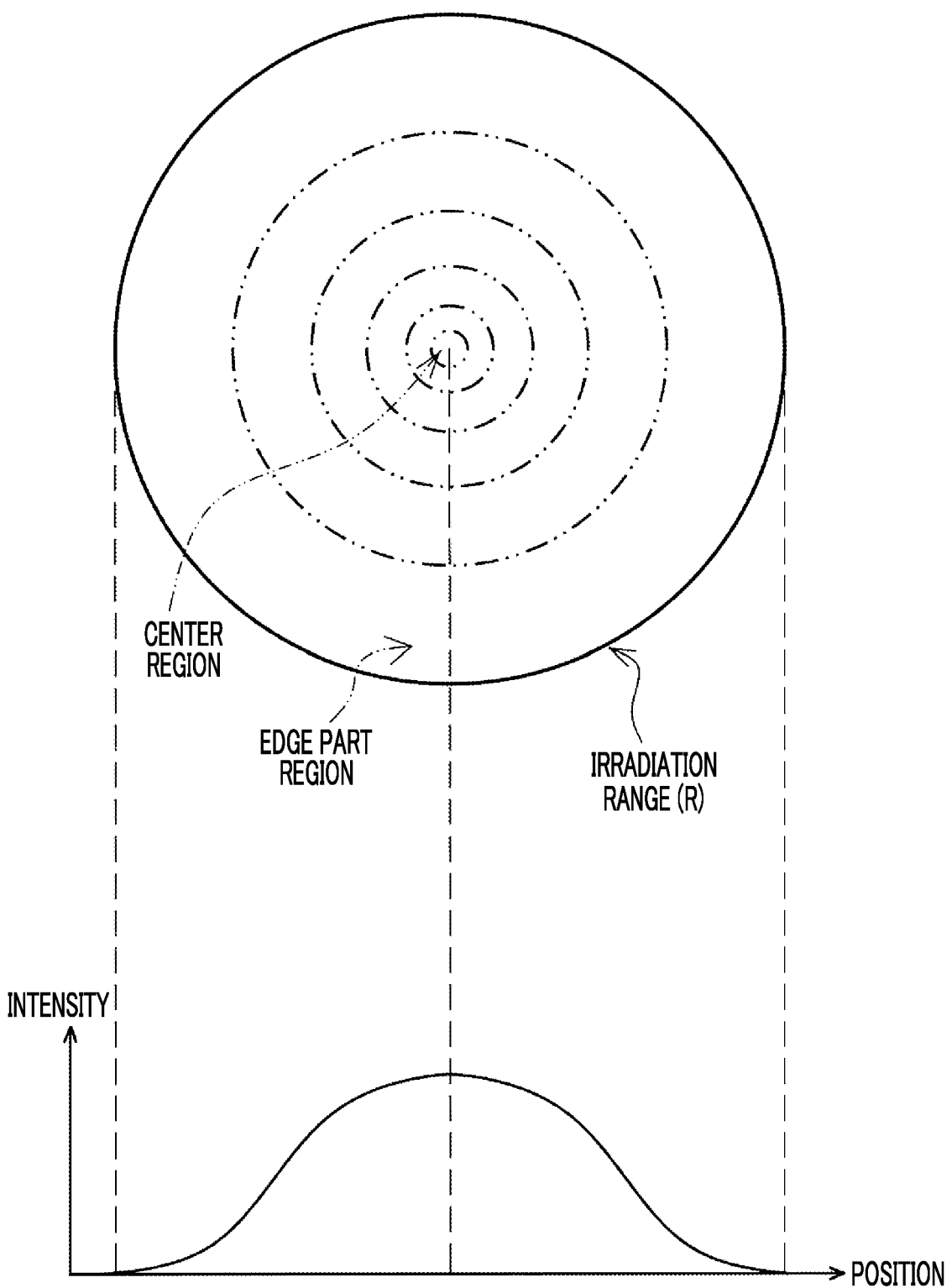
FIG. 4 is a diagram illustrating an irradiation range and an intensity distribution of light of irradiation from the irradiation apparatus.

In the disclosed technology, surface irradiation of a target subject TH (refer to FIG. 8A and the like) with the light emitted from the irradiation apparatus 112 is performed. For example, as an intensity distribution of the light with which the target subject TH is irradiated, as illustrated in FIG. 4, the light has high intensity in a center region of the irradiation light and has gradually lower intensity in a direction toward an edge part region. For example, this "intensity distribution of the light" is an intensity distribution in a two-dimensional plane perpendicular to the optical axis OB.

Figure 5:
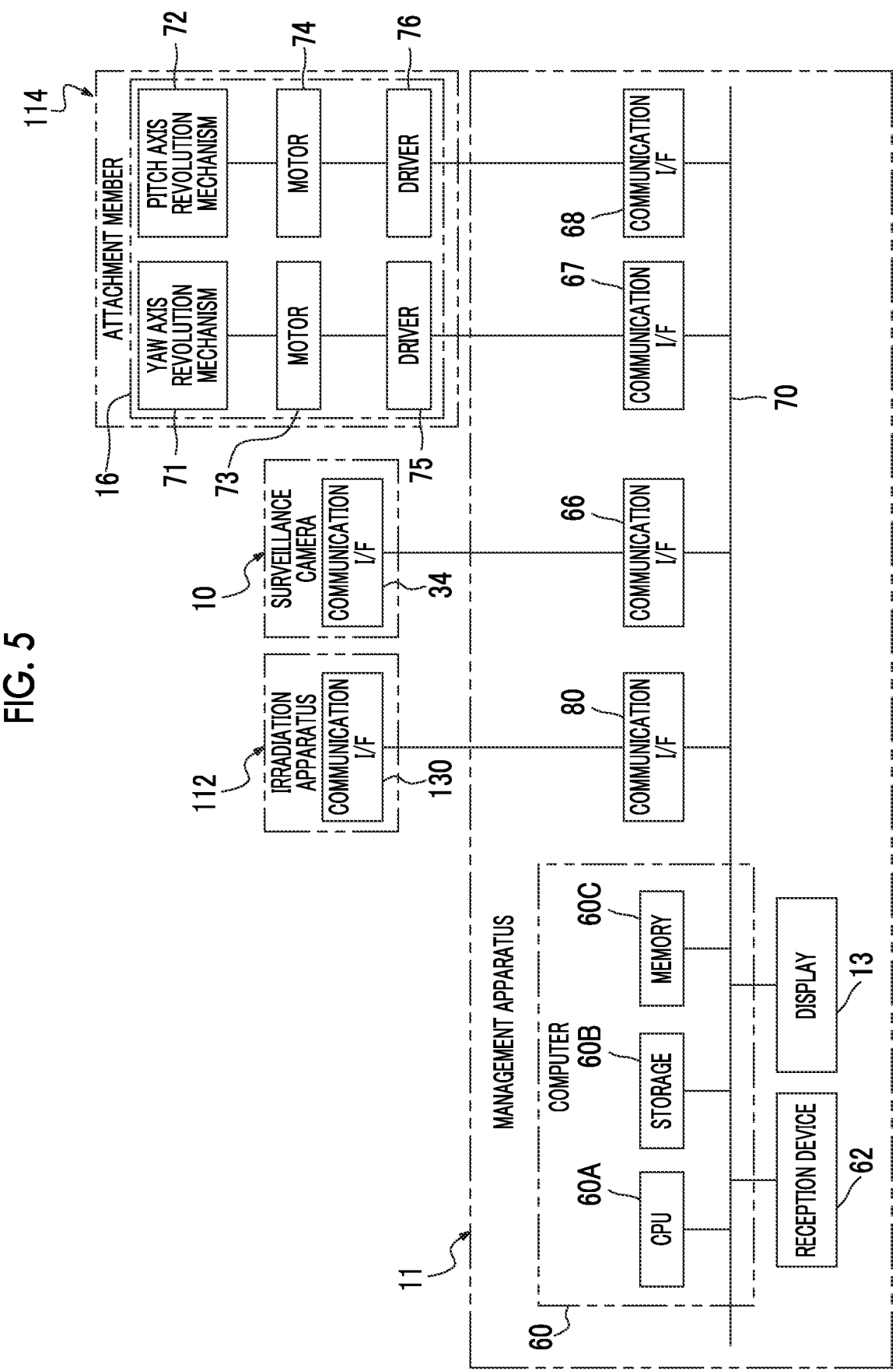
FIG. 5 is a block diagram illustrating an example of a configuration of an electric system of a management apparatus and a revolution mechanism according to the first embodiment.

As illustrated in FIG. 5 as an example, the management apparatus 11 comprises the display 13, a computer 60, a reception device 62, a communication I/F 66, a communication OF 67, a communication I/F 68, and the communication I/F 80. In addition, the revolution mechanism 16 comprises a yaw axis revolution mechanism 71, a pitch axis revolution mechanism 72, a motor 73, a motor 74, a driver 75, and a driver 76. The computer 60 is an example of a "computer" according to the embodiment of the disclosed technology.

The computer 60 comprises a CPU 60A, a storage 60B, and a memory 60C. The CPU 60A is an example of a "processor" according to the embodiment of the disclosed technology. Each of the display 13, the reception device 62, the CPU 60A, the storage 60B, the memory 60C, and the communication I/Fs 66 to 68 and 80 is connected to a bus 70. In the example illustrated in FIG. 5, while one bus is illustrated as the bus 70 for convenience of illustration, a plurality of buses may be used. The bus 70 may be a serial bus or may be a parallel bus including a data bus, an address bus, a control bus, and the like.

The memory 60C temporarily stores various information and is used as a work memory. Examples of the memory 60C include a RAM. However, the disclosed technology is not limited thereto. A storage device of other types may be used. The storage 60B stores various programs for the management apparatus 11 (hereinafter, simply referred to as a "management apparatus program"). The CPU 60A controls the entire management apparatus 11 by reading out the management apparatus program from the storage 60B and executing the read management apparatus program on the memory 60C.

The communication I/F 66 is, for example, a network interface. The communication I/F 66 is communicably connected to the communication I/F 34 of the surveillance camera 10 through a network and controls transfer of various information with respect to the surveillance camera 10. For example, the communication I/F 66 requests the surveillance camera 10 to transmit the captured image and receives the captured image transmitted from the communication I/F 34 of the surveillance camera 10 in response to the request for transmission of the captured image.

The communication I/F 67 and the communication I/F 68 are, for example, network interfaces. The communication I/F 67 is communicably connected to the driver 75 of the revolution mechanism 16 through a network. The CPU 60A controls a revolution operation of the yaw axis revolution mechanism 71 by controlling the motor 73 through the communication I/F 67 and the driver 75. The communication I/F 68 is communicably connected to the driver 76 of the revolution mechanism 16 through a network. The CPU 60A controls a revolution operation of the pitch axis revolution mechanism 72 by controlling the motor 74 through the communication I/F 68 and the driver 76.

The communication I/F 80 is, for example, a network interface. The communication I/F 80 is communicably connected to the communication I/F 130 of the irradiation apparatus 112 through a network and controls transfer of various information with respect to the irradiation apparatus 112. For example, the communication I/F 80 controls irradiation with the light in the irradiation apparatus 112 by transmitting the information related to the irradiation range of the light to the irradiation apparatus 112.

The reception device 62 includes, for example, a keyboard, a mouse, and a touch panel and receives various instructions from the user. The CPU 60A acquires the various instructions received by the reception device 62 and operates in accordance with the acquired instructions. For example, in a case where a processing content for the surveillance camera 10 and/or the revolution mechanism 16 is received by the reception device 62, the CPU 60A operates the surveillance camera 10 and/or the revolution mechanism 16 in accordance with an instruction content received by the reception device 62.

The display 13 displays various information under control of the CPU 60A.

Examples of the various information displayed on the display 13 include contents of the various instructions received by the reception device 62 and the captured image received by the communication I/F 66. In such a manner, the computer 60 performs a control of displaying the captured image received by the communication I/F 66 on the display 13.

In the revolution mechanism 16, the motor 73 is driven to generate motive power under control of the driver 75. The yaw axis revolution mechanism 71 causes the surveillance camera 10 to revolve in the yaw direction by receiving the motive power generated by the motor 73. The motor 74 is driven to generate motive power under control of the driver 76. The pitch axis revolution mechanism 72 causes the surveillance camera 10 to revolve in the pitch direction by receiving the motive power generated by the motor 74.

Figure 6:
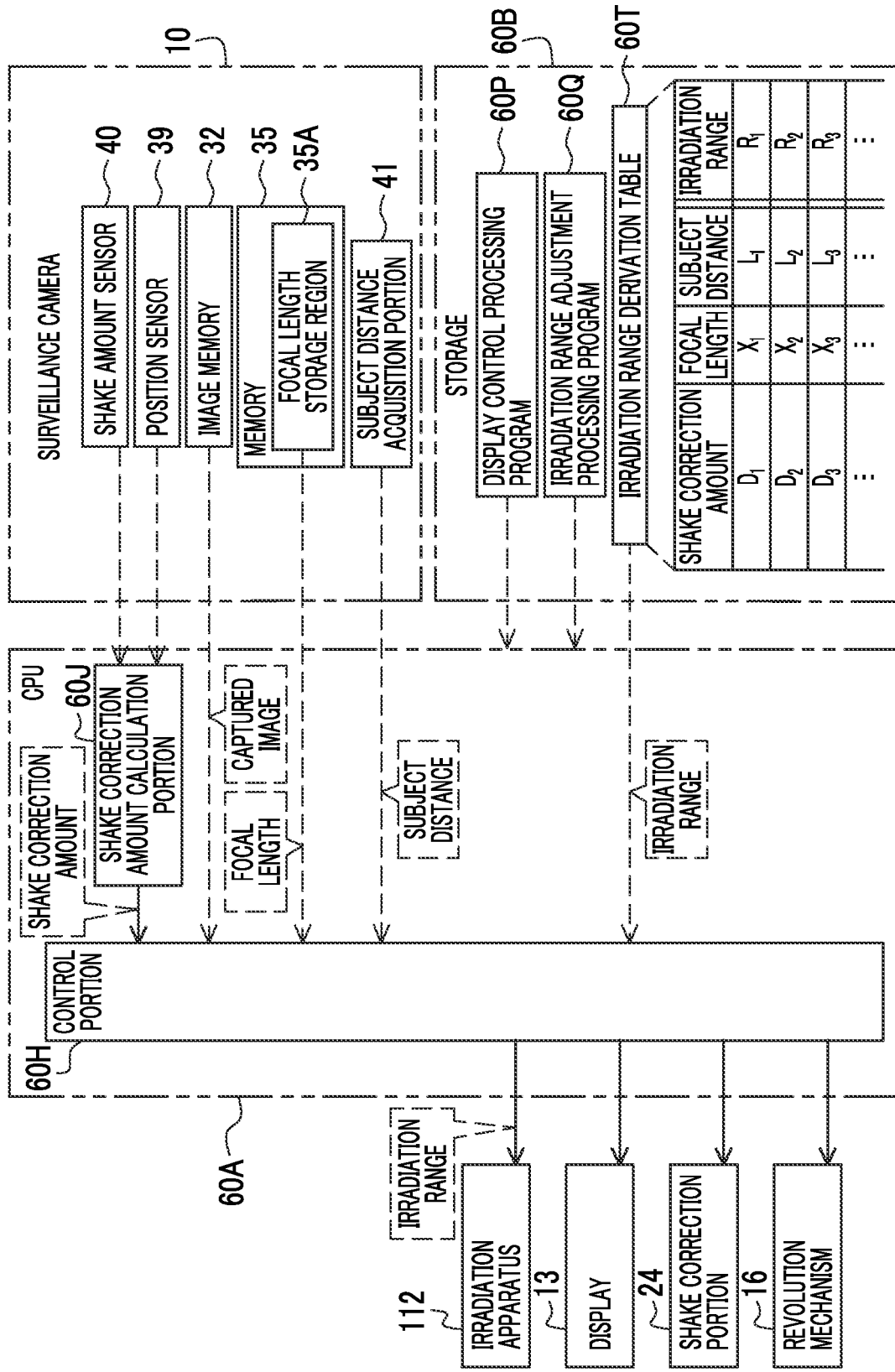
FIG. 6 is a function block diagram illustrating an example of functions of a CPU included in the management apparatus according to the first embodiment.

As illustrated in FIG. 6 as an example, the storage 60B of the management apparatus 11 in the first embodiment stores a display control processing program 60P and an irradiation range adjustment processing program 60Q.

The memory 35 of the surveillance camera 10 includes a focal length storage region 35A. The most recent focal length X is stored in an overwriting manner in the focal length storage region 35A each time the focal length X is changed by moving the zoom lens 15B2.

The surveillance camera 10 includes a subject distance acquisition portion 41. The subject distance acquisition portion 41 acquires a subject distance L (refer to FIG. 8A and the like) as a distance from the surveillance camera 10 to the target subject TH. For example, the subject distance L is a distance from a reference point set in the surveillance camera 10, for example, a center point of a lens predetermined in the lens group 15B, to the target subject TH.

A configuration of acquiring the subject distance L is not limited. For example, a configuration of irradiating the target subject TH with laser light and calculating the subject distance L from a time period required for reciprocating of the laser light can be employed. A configuration of irradiating the target subject TH with light and calculating the subject distance L using trigonometry may also be employed. While the subject distance acquisition portion 41 may be provided inside the surveillance camera 10, the subject distance acquisition portion 41 may be provided outside the surveillance camera 10 and may be configured to acquire the subject distance L separately from the surveillance camera 10 and transmit the acquired subject distance L to the surveillance camera 10.

The CPU 60A reads out the display control processing program 60P from the storage 60B and executes the read display control processing program 60P on the memory 60C (refer to FIG. 5). A control portion 60H of the CPU 60A operates as a display control portion that controls display on the display 13.

The control portion 60H receives the captured image stored in the image memory 32 of the surveillance camera 10 and displays the received captured image on the display 13 as a live view image. Here, while the live view image is illustrated as the image displayed on the display 13, the disclosed technology is not limited thereto. The image displayed on the display 13 may be a motion picture image or a still picture image recorded on the storage 60B.

The control portion 60H acquires the focal length X from the focal length storage region 35A of the surveillance camera 10. In the control portion 60H, a determination as to whether or not the acquired focal length X has changed is performed. Specifically, an internal memory (not illustrated) of the CPU 60A in the management apparatus 11 stores a previously acquired focal length (hereinafter, referred to as the "previous focal length").

In the control portion 60H, the previous focal length stored in the internal memory and the currently acquired most recent focal length (hereinafter, referred to as the "most recent focal length") may be compared. In a case where the previous focal length and the most recent focal length are different, it may be determined that the focal length X has changed. In a case where the previous focal length and the most recent focal length are not different, it may be determined that the focal length X has not changed. In a case where the most recent focal length is equal to the previous focal length, it can be determined that the focal length has not changed.

Furthermore, the control portion 60H derives an irradiation range R of the light of the irradiation apparatus 112 from the storage 60B. In the present embodiment, as an example, the storage 60B stores an irradiation range derivation table 60T. In the irradiation range derivation table 60T, the irradiation range R corresponding to a shake correction amount D, the focal length X, and the subject distance L is registered. The irradiation range R registered in the irradiation range derivation table 60T is a range that covers the imaging range PE in a case of the shake correction amount D, the focal length X, and the subject distance L. From the irradiation range derivation table 60T, the control portion 60H derives the irradiation range R corresponding to the shake correction amount D, the focal length X, and the subject distance L acquired from the surveillance camera 10.

Figure 7:
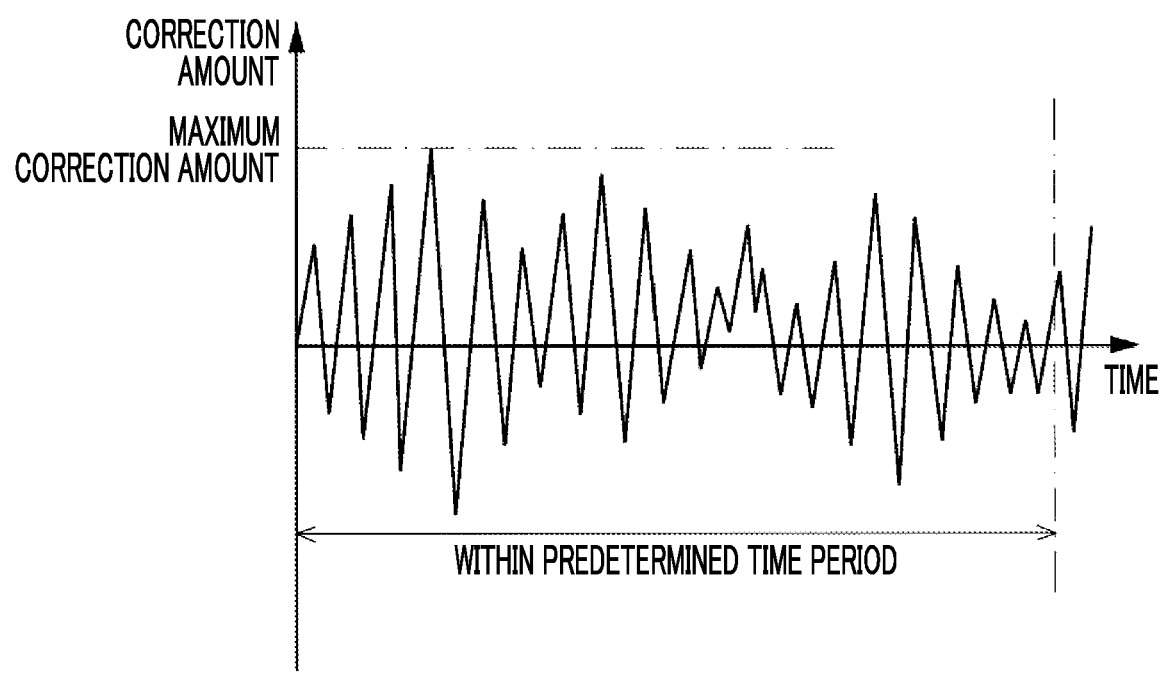
FIG. 7 is a graph illustrating an example of a temporal change in correction amount of a shake of the surveillance camera.

FIG. 7 illustrates an example of a temporal change in correction amount of the captured image in the shake correction control of the captured image. The control portion 60H acquires a maximum value of the shake correction amount, that is, a maximum correction amount, within a predetermined time period of the shake correction control as the shake correction amount D to be used for deriving the irradiation range R. For example, the maximum correction amount is obtained by performing processing of acquiring the shake correction amount in constant cycles within the predetermined time period and sequentially updating the currently acquired shake correction amount to the maximum correction amount in a case where the currently acquired shake correction amount is larger than the previously acquired shake correction amount.

Here, FIG. 8A to FIG. 10B illustrate a relationship between the imaging range PE of the surveillance camera 10 and the irradiation range R of the irradiation apparatus 112 in the first embodiment.

Figure 8A:
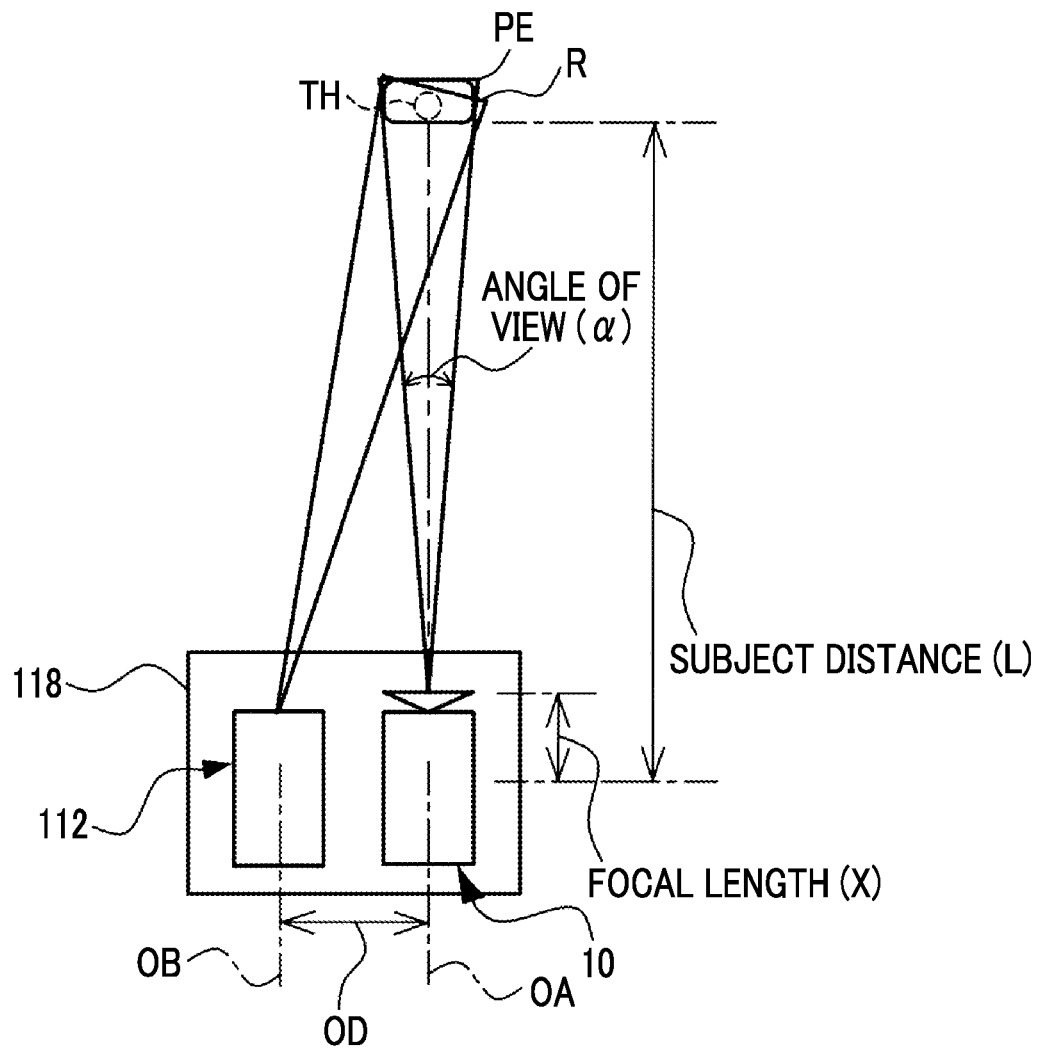
FIG. 8A is a conceptual diagram illustrating an example of a state where a target subject is positioned in front of the surveillance camera according to the first embodiment.

FIG. 8A illustrates the focal length X and an angle of view a of the surveillance camera 10. A change in focal length X actually occurs inside the surveillance camera 10 and appears as a change in angle of view a outside the surveillance camera 10. That is, in a case where the zoom lens 15B2 moves to a telephoto side from the current point in time, the focal length X is increased. Thus, the angle of view a is narrowed. Narrowing of the angle of view a means narrowing of the imaging range PE. In addition, in a case where the zoom lens 15B2 moves to a wide angle side from the current point in time, the focal length X is decreased. Thus, the angle of view a is widened. Widening of the angle of view a means widening of the imaging range PE. Thus, the irradiation range R of the light by the irradiation apparatus 112 is also changed in accordance with the focal length X (refer to FIG. 11 and FIG. 12).

Figure 8B:
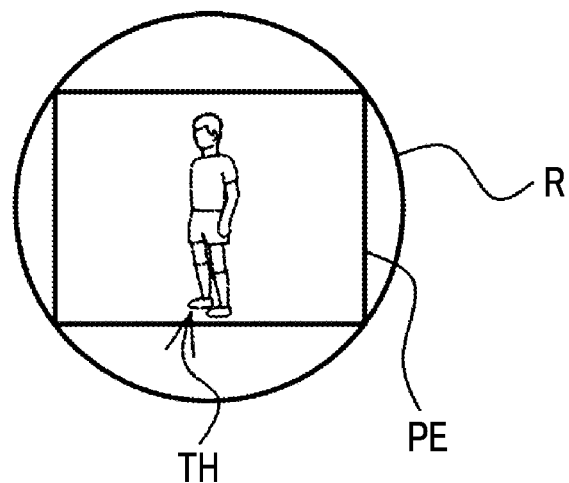
FIG. 8B is a schematic diagram illustrating an example of a captured image obtained by imaging by the surveillance camera and the irradiation range of the light in the state illustrated in FIG. 8A.

FIG. 8A is a state where the target subject TH is positioned in front of the surveillance camera 10, and the shake correction portion 24 is not operating. In this case, as illustrated in FIG. 8B, the irradiation range R of the light from the irradiation apparatus 112 covers the imaging range PE of the surveillance camera 10.

Figure 9A:
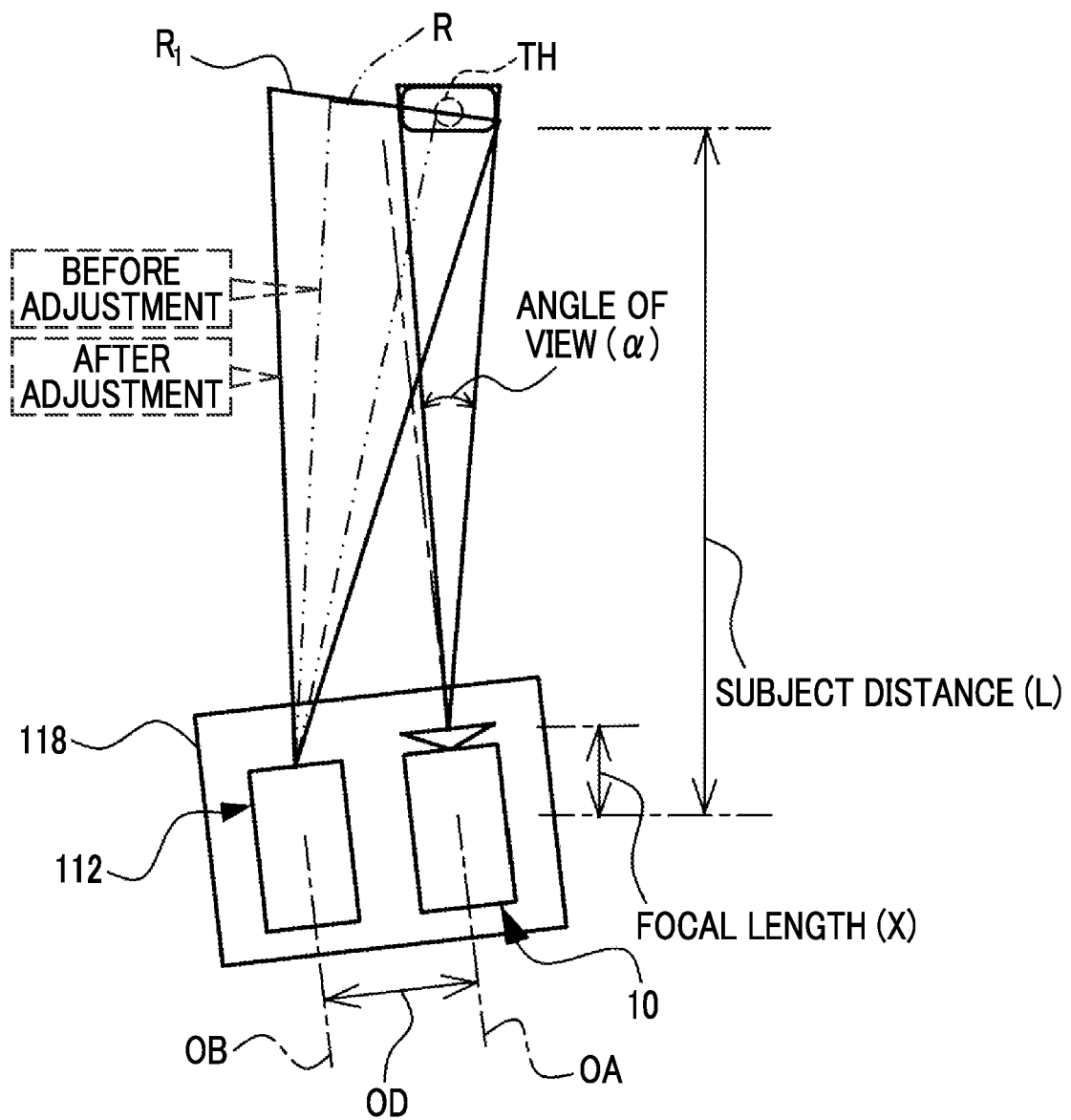
FIG. 9A is a conceptual diagram illustrating an example of a state where a shake correction control is performed in the surveillance camera according to the first embodiment.
Figure 9B:
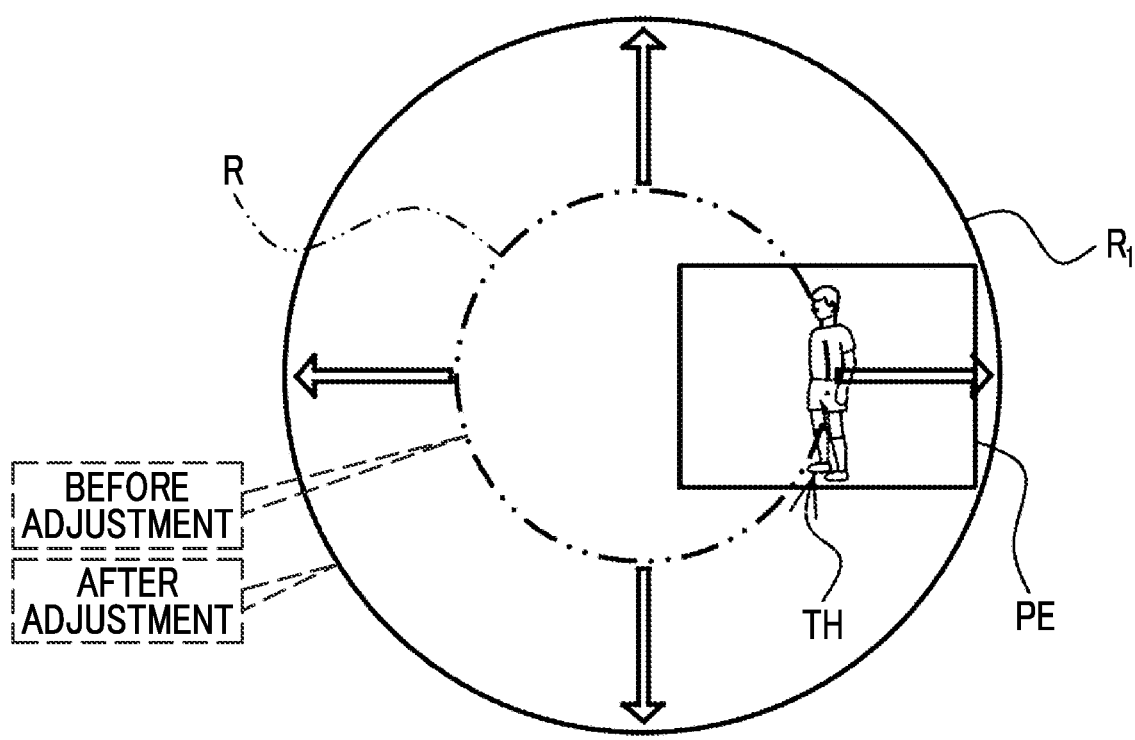
FIG. 9B is a schematic diagram illustrating an example of the captured image obtained by imaging by the surveillance camera and the irradiation range of the light in the state illustrated in FIG. 9A.

FIG. 9A is a state where the attachment member 114 vibrates, and the attachment member 114 rotates in a counterclockwise direction from the state in FIG. 8A. In this case, an image of the target subject TH falls within the imaging range PE as illustrated in FIG. 9B by executing the shake correction control by the shake correction portion 24 of the surveillance camera 10. However, in the irradiation apparatus 112, in a case of not adjusting the irradiation range R of the light, as illustrated by a dash double dotted line in FIG. 9A and FIG. 9B, the irradiation range R deviates to a left side from the imaging range PE, and the irradiation range R cannot cover the imaging range PE. Therefore, the control portion 60H derives the irradiation range R corresponding to the shake correction amount D, the focal length X, and the subject distance L from the irradiation range derivation table 60T and transmits information of the derived irradiation range R to the irradiation apparatus 112. In the irradiation apparatus 112, the irradiation range R is widened in accordance with the transmitted information as illustrated by a solid line in FIG. 9A and FIG. 9B. Accordingly, a state where the irradiation range R covers the imaging range PE is implemented. FIG. 9A and FIG. 9B illustrate a case of adjustment to an irradiation range $R_1$ corresponding to a shake correction amount $D_1$, a focal length $X_1$, and a subject distance $L_1$.

Figure 10A:
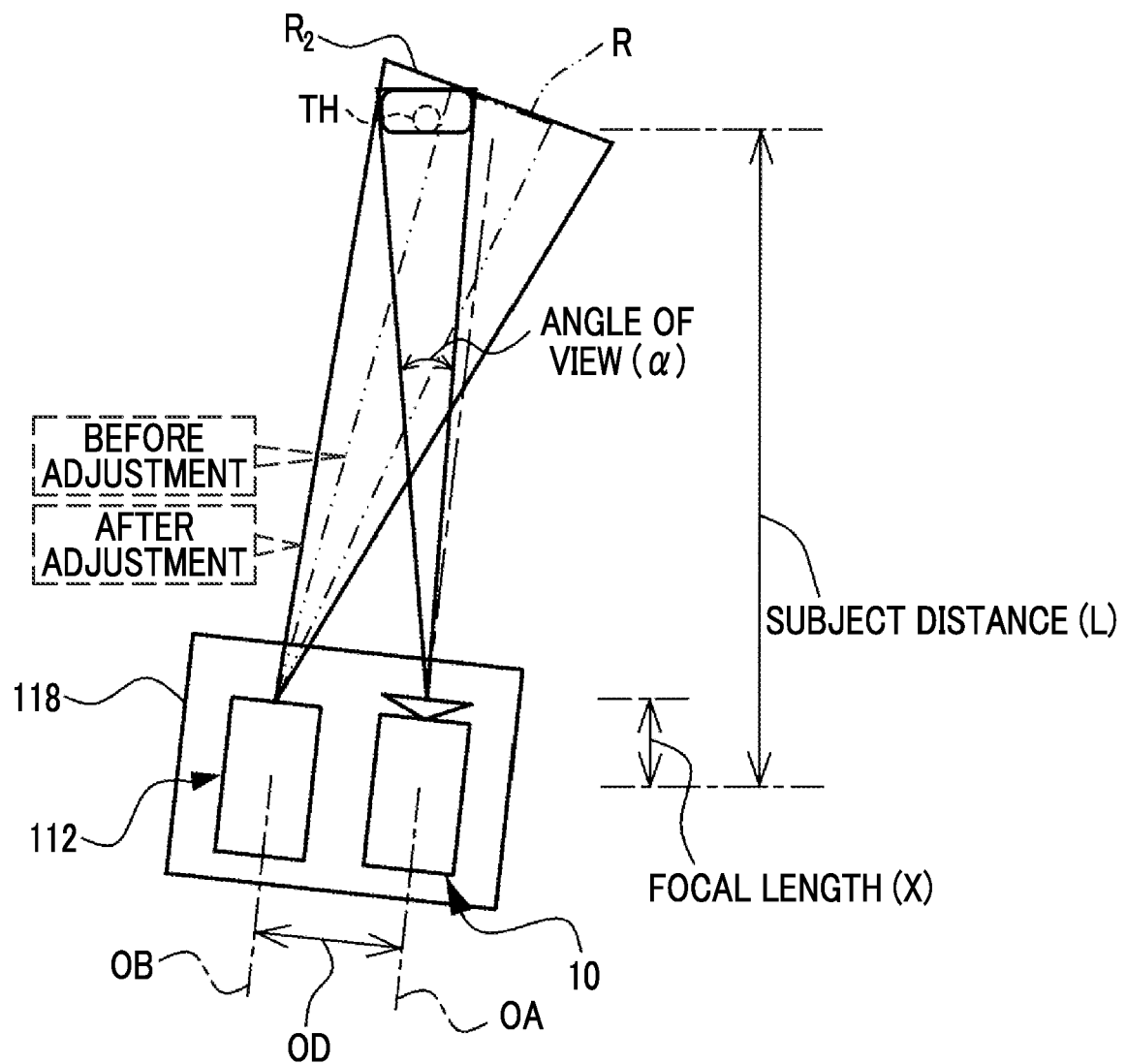
FIG. 10A is a conceptual diagram illustrating an example of a state where the shake correction control is performed in the surveillance camera according to the first embodiment.
Figure 10B:
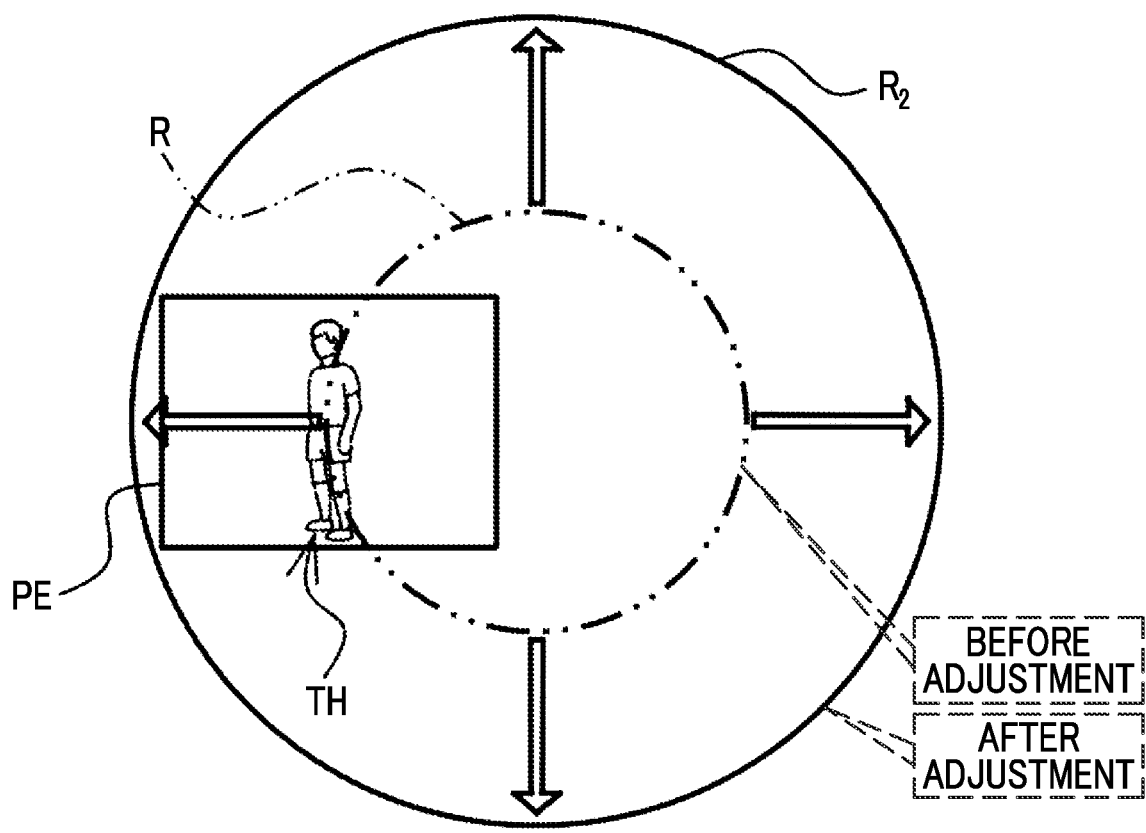
FIG. 10B is a schematic diagram illustrating an example of the captured image obtained by imaging by the surveillance camera and the irradiation range of the light in the state illustrated in FIG. 10A.

In addition, FIG. 10A is a state where the attachment member 114 vibrates, and the attachment member 114 rotates in a clockwise direction from the state in FIG. 8A. Even in this case, the image of the target subject TH falls within the imaging range PE as illustrated in FIG. 10B by executing the shake correction control by the shake correction portion 24 of the surveillance camera 10. However, in the irradiation apparatus 112, in a case of not adjusting the irradiation range R of the light, as illustrated by a dash double dotted line in FIG. 10A and FIG. 10B, the irradiation range R deviates to a right side from the imaging range PE, and the irradiation range R cannot cover the imaging range PE as in the case of FIG. 9A and FIG. 9B. Even in this case, the control portion 60H derives the irradiation range R corresponding to the shake correction amount D, the focal length X, and the subject distance L from the irradiation range derivation table 00 and transmits the information of the derived irradiation range R to the irradiation apparatus 112. In the irradiation apparatus 112, the irradiation range R is widened in accordance with the transmitted information as illustrated by a solid line in FIG. 10A and FIG. 10B. Accordingly, a state where the irradiation range R covers the imaging range PE is implemented. FIG. 10A and FIG. 10B illustrate a case of adjustment to an irradiation range $R_2$ corresponding to a shake correction amount $D_2$, a focal length $X_2$, and a subject distance $L_2$.

Figure 11:
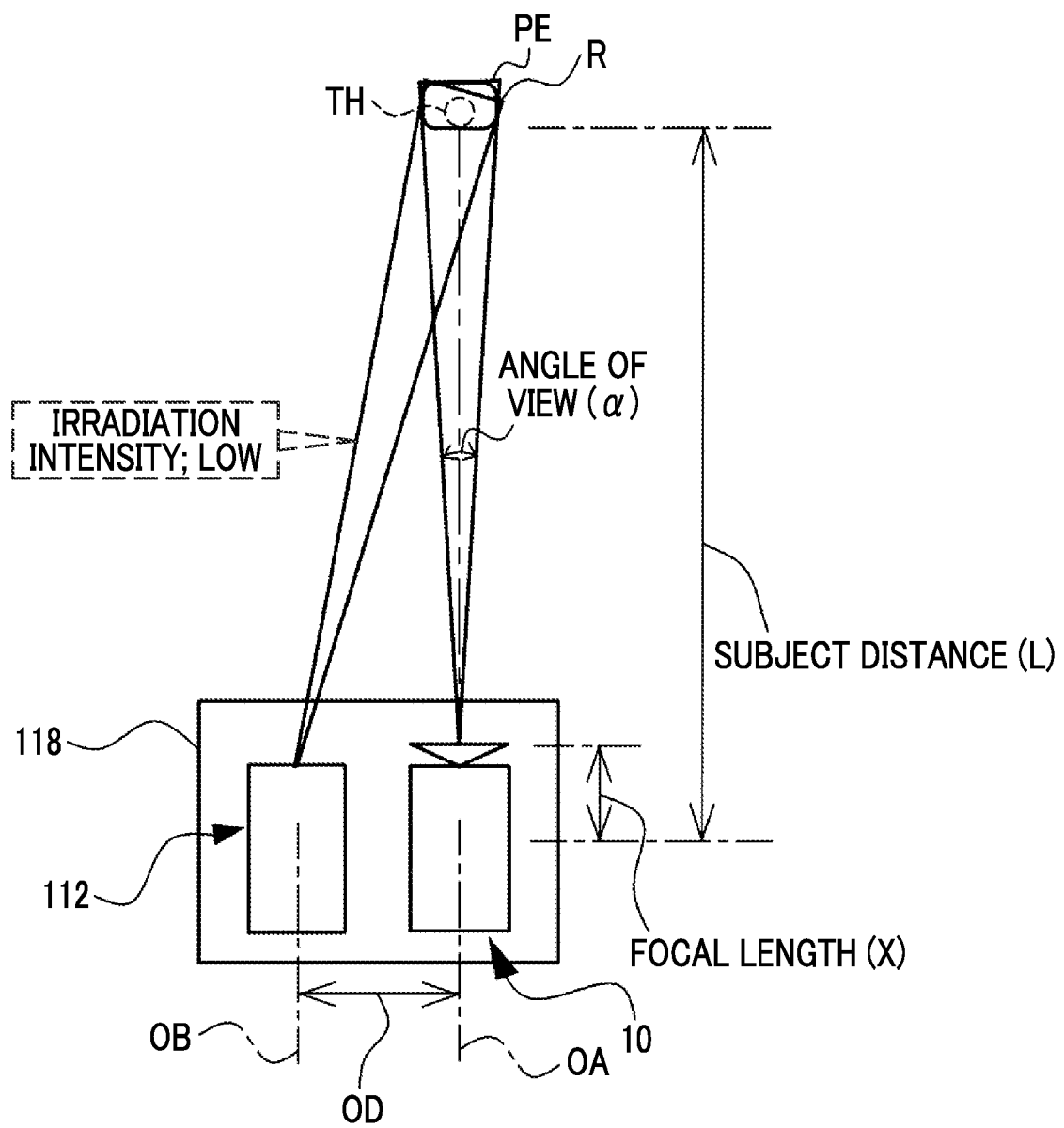
FIG. 11 is a conceptual diagram illustrating an example of a state where the target subject is positioned in front of the surveillance camera according to the first embodiment.

FIG. 11 is a case where the focal length X of the surveillance camera 10 is long compared to the case illustrated in FIG. 8A. In FIG. 11, the angle of view a is narrower than in the case illustrated in FIG. 8A. Since the angle of view a is narrow, the irradiation range R of the light from the irradiation apparatus 112 is set to be narrow in a case where the target subject TH is in front of the surveillance camera 10. In this case, in a case where the attachment member 114 vibrates, the irradiation range R of the light from the irradiation apparatus 112 is adjusted by considering that the focal length X is long, that is, the angle of view a is narrow.

Figure 12:
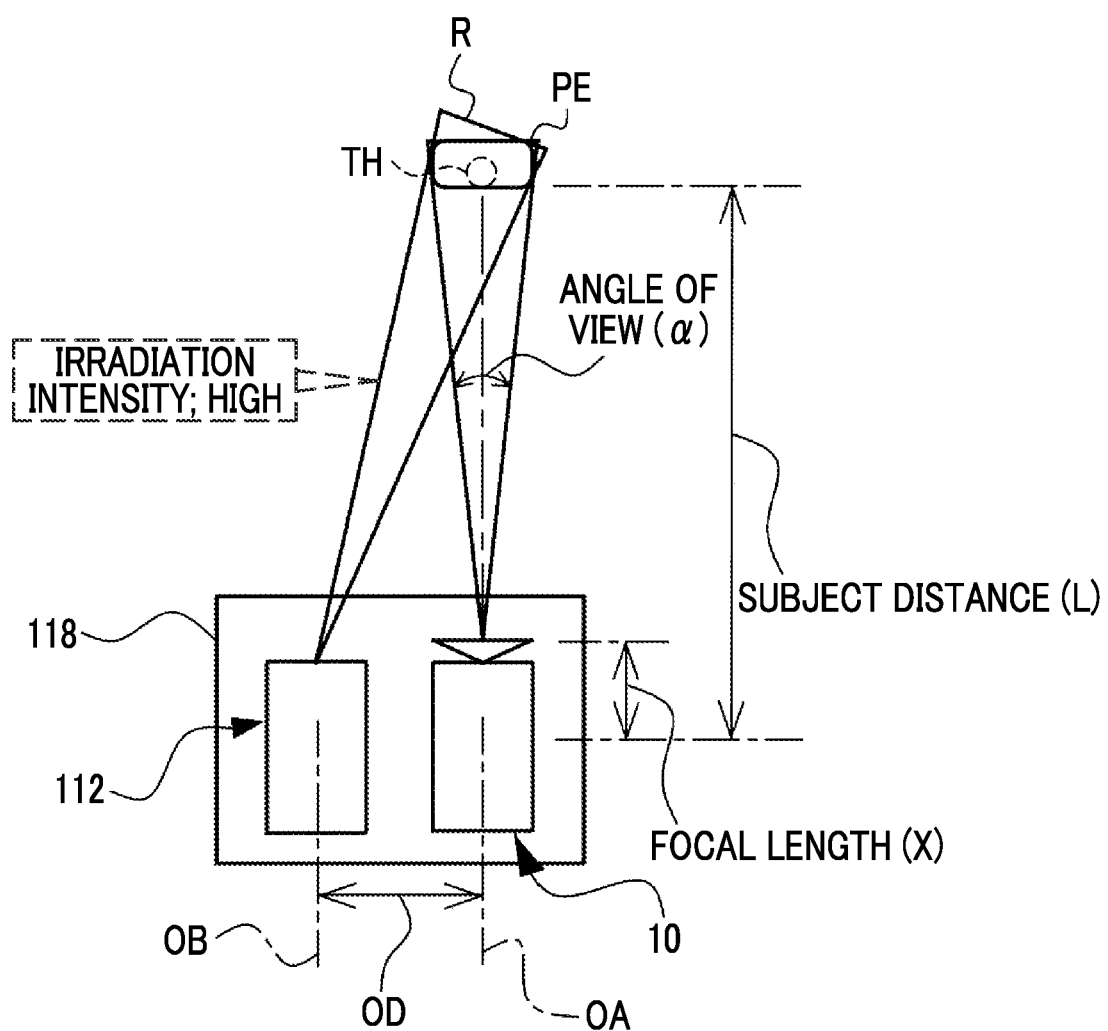
FIG. 12 is a conceptual diagram illustrating an example of a state where the target subject is positioned in front of the surveillance camera according to the first embodiment.

FIG. 12 is a case where the subject distance L is short compared to the case illustrated in FIG. 8A. In FIG. 12, the angle of view a is wider than in the case illustrated in FIG. 8A. Since the angle of view a is wide, the irradiation range R of the light from the irradiation apparatus 112 is set to be wide in a case where the target subject TH is in front of the surveillance camera 10. In this case, in a case where the attachment member 114 vibrates, the irradiation range R of the light from the irradiation apparatus 112 is adjusted by considering that the subject distance L is short.

In such a manner, in the present embodiment, in a case where vibrations occur in the surveillance camera 10 and the irradiation apparatus 112, the irradiation range R of the light of irradiation from the irradiation apparatus 112 is adjusted to cover the imaging range PE.

In the case illustrated in FIG. 11, the angle of view a is narrow compared to the case illustrated in FIG. 8A. The spreading angle of the light of irradiation from the irradiation apparatus 112 is also narrow. In this case, in a state where the intensity of the light is not changed, a light quantity per unit area with which the target subject TH is irradiated is increased. The CPU 60A can suppress an increase in light quantity per unit area with which the target subject TH is irradiated, by controlling the light source 124 to decrease the intensity of the light through the light source driver 126.

In the case illustrated in FIG. 12, the angle of view a is wide compared to the case illustrated in FIG. 8A. The spreading angle of the light of irradiation from the irradiation apparatus 112 is also wide. In this case, in a state where the intensity of the light is not changed, the light quantity per unit area with which the target subject TH is irradiated is decreased. The CPU 60A can suppress a decrease in light quantity per unit area with which the target subject TH is irradiated, by controlling the light source 124 to increase the intensity of the light through the light source driver 126.

In such a manner, in the present embodiment, the intensity of the light of irradiation from the irradiation apparatus 112 is adjusted such that the light quantity per unit area of the target subject TH is uniformly approximated in accordance with the focal length X and the subject distance L of the surveillance camera 10.

Figure 13:
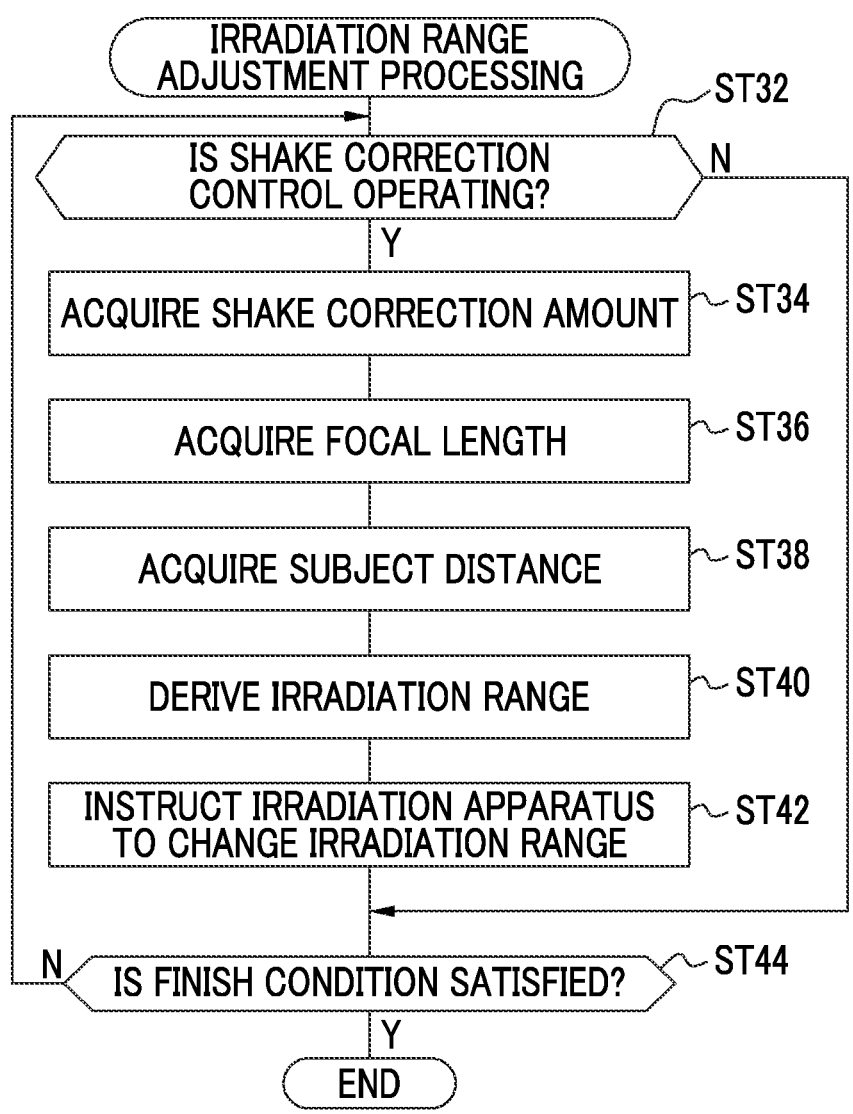
FIG. 13 is a flowchart illustrating an example of a flow of irradiation range adjustment processing according to the first embodiment.

Next, actions of parts according to the embodiment of the disclosed technology in the first embodiment will be described with reference to FIG. 13. FIG. 13 illustrates an example of a flow of irradiation range adjustment processing executed by the CPU 60A of the management apparatus 11 in accordance with the irradiation range adjustment processing program 60Q. The flow of irradiation range adjustment processing illustrated in FIG. 13 is an example of an "irradiation range adjustment method" according to the embodiment of the disclosed technology.

In the irradiation range adjustment processing illustrated in FIG. 13, first, in step ST32, the control portion 60H determines whether or not the shake correction control of the captured image by the shake correction portion 24 is operating. In step ST32, in a case where the shake correction control is not operating, a negative determination is made, and the irradiation range adjustment processing transitions to step ST42.

In step ST32, in a case where the shake correction control is operating, a positive determination is made, and the irradiation range adjustment processing transitions to step ST34.

In step ST34, the control portion 60H acquires the shake correction amount D from the surveillance camera 10. The irradiation range adjustment processing transitions to step ST36. In the present embodiment, as illustrated in FIG. 6, the control portion 60H acquires the maximum value of the shake correction amount, that is, the maximum correction amount, within the predetermined time period of the shake correction control. The shake correction amount D acquired in step ST34 is the maximum correction amount.

In step ST36, the control portion 60H acquires the focal length X from the surveillance camera 10. The irradiation range adjustment processing transitions to step ST38.

In step ST38, the control portion 60H acquires the subject distance L from the surveillance camera 10. The irradiation range adjustment processing transitions to step ST40.

In step ST40, the control portion 60H derives the irradiation range R from the irradiation range derivation table 60T based on the acquired shake correction amount D, focal length X, and subject distance L. The irradiation range adjustment processing transitions to step ST42.

In the first embodiment, the control portion 60H acquires the subject distance L in step ST38. Accordingly, in step ST40, the intensity of the light emitted from the light source 124 can be adjusted based on the subject distance L.

In step ST42, the control portion 60H instructs the irradiation apparatus 112 to change the irradiation range R. Accordingly, as illustrated in FIG. 9A to FIG. 10B, the irradiation range R is changed in the irradiation apparatus 112, and the irradiation range R covers the imaging range PE. The irradiation range adjustment processing transitions to step ST44.

In step ST44, the control portion 60H determines whether or not a condition (hereinafter, referred to as a "finish condition") under which the irradiation range adjustment processing is finished is satisfied. Examples of the finish condition include a condition that an instruction to finish the irradiation range adjustment processing is received by the reception device 62. In step ST44, in a case where the finish condition is not satisfied, a negative determination is made, and the irradiation range adjustment processing transitions to step ST32. In step ST44, in a case where the finish condition is satisfied, a positive determination is made, and the irradiation range adjustment processing is finished.

In the first embodiment, in a state where the shake correction control of the surveillance camera 10 is being performed, the irradiation range R of the light from the irradiation apparatus 112 for the target subject TH is adjusted based on the shake correction amount D, the focal length X, and the subject distance L. Accordingly, in a case where the shake occurring in the surveillance camera 10 is corrected by operation of the shake correction portion 24, the irradiation range R of the light from the irradiation apparatus 112 can be adjusted.

In the first embodiment, the CPU 60A acquires the maximum value of the shake correction amount, that is, the maximum correction amount, within the predetermined time period of the shake correction control. The maximum correction amount within the predetermined time period is acquired in step ST34. In the derivation of the irradiation range R in step ST40, the irradiation range R is derived within a range restricted in accordance with the maximum correction amount. In a configuration of adjusting the irradiation range R without providing such a restriction corresponding to the maximum correction amount, the adjustment of the irradiation range R accompanied by a change in shake may be excessively frequently performed. By adjusting the irradiation range R within the range restricted in accordance with the maximum correction amount, excessively frequent adjustment of the irradiation range R can be suppressed.

In the first embodiment, instead of the irradiation range derivation table 60T, an irradiation range function that takes the shake correction amount D, the focal length X, and the subject distance L as independent variables and takes the irradiation range R as a dependent variable may be stored in the storage 60B, and the irradiation range R may be calculated using this irradiation range function.

Second Embodiment

Next, a second embodiment will be described. In the second embodiment, the same elements, members, and the like as in the first embodiment will be designated by the same reference numerals as in the first embodiment and will not be described in detail. In addition, overall configurations of a surveillance camera that is an example of an imaging apparatus, and an irradiation apparatus of the second embodiment are the same as the surveillance camera 10 and the irradiation apparatus 112 of the first embodiment and thus, will not be illustrated.

Figure 14:
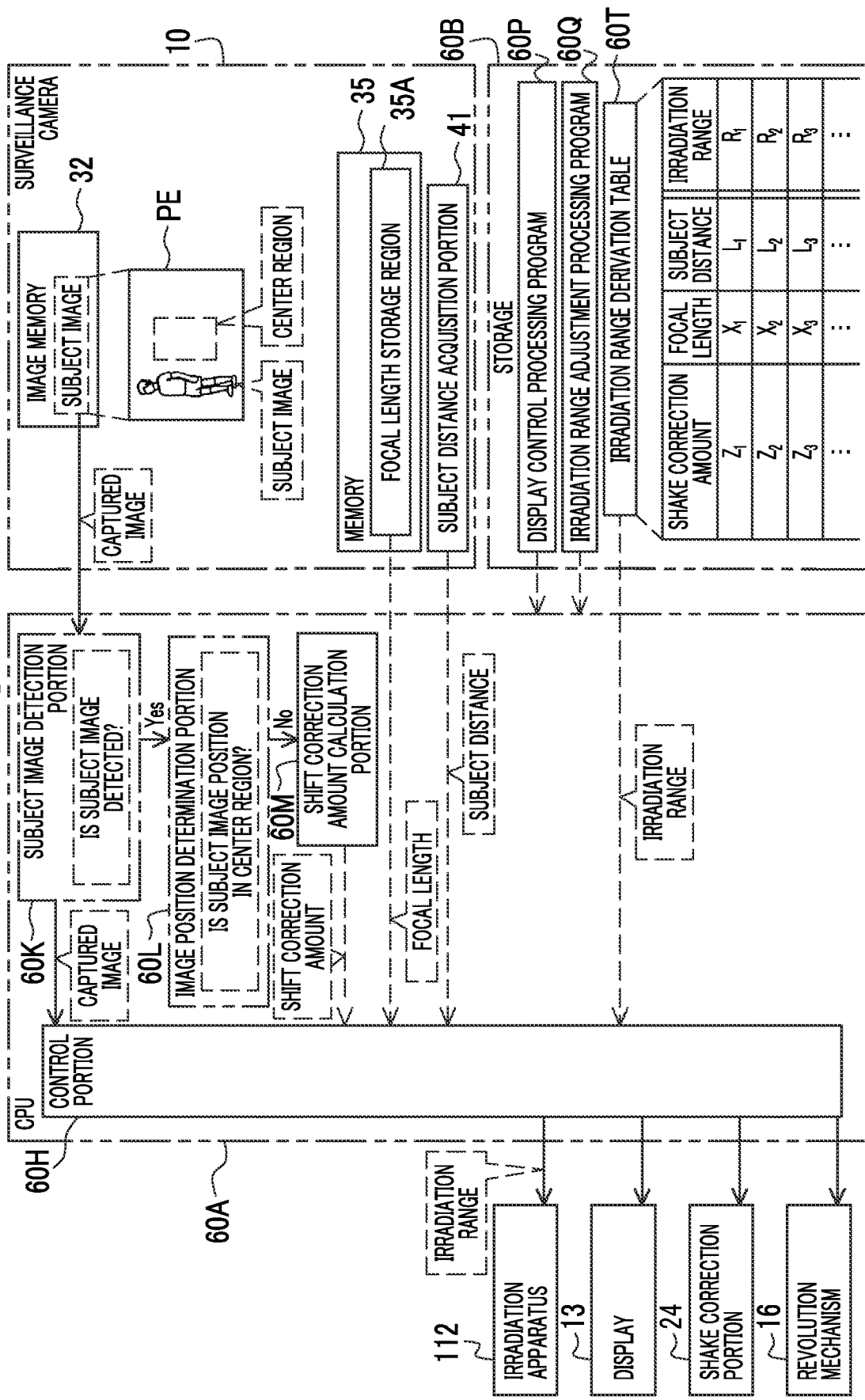
FIG. 14 is a function block diagram illustrating an example of functions of a CPU included in a management apparatus according to a second embodiment.

As illustrated in FIG. 14 as an example, in the second embodiment, the registration control of displacing the captured image by operating the shake correction portion 24 is performed.

As a method of displacing the captured image, a method of moving the surveillance camera 10 in the pitch direction and/or the yaw direction using the revolution mechanism 16 is considered. However, in the method by the revolution mechanism 16, a movement amount of the surveillance camera 10 may be excessively increased, and the target subject TH may significantly deviate from the imaging range PE. Therefore, in the second embodiment, the captured image is displaced using the shake correction portion 24 instead of the revolution mechanism 16.

In the second embodiment, the CPU 60A comprises a subject image detection portion 60K and an image position determination portion 60L. The subject image detection portion 60K acquires the captured image from the image memory 32 of the surveillance camera 10. The subject image detection portion 60K detects the image of the target subject TH (hereinafter, referred to as a subject image) within the imaging range PE of the captured image acquired from the image memory 32. In addition, in a case where the subject image is detected, the subject image detection portion 60K detects a position of the subject image (subject image position) within the imaging range PE.

The image position determination portion 60L determines whether or not the subject image position detected by the subject image detection portion 60K is in a predetermined center region in the captured image. As an example, in a case where the target subject TH moves and deviates from the imaging range PE, the subject image position is not in a state of being in the center region.

A shift correction amount calculation portion 60M calculates a shift correction amount Z in a case where the image position determination portion 60L determines that the subject image position is not in the center region. The shift correction amount Z is an amount for adjusting the imaging range PE to position the subject image in the center region by resolving shifting (difference in relative position) of the subject image position with respect to the center region, and is a vector having values on two axes of the pitch axis PA and the yaw axis YA. Examples of the shift correction amount Z include a shift amount between a center of the subject image and a center of the center region. As an example, the center of the subject image can be obtained as a combination of two values of a coordinate in a direction along the pitch axis PA and a coordinate in a direction along the yaw axis YA of the subject image.

Figure 15:
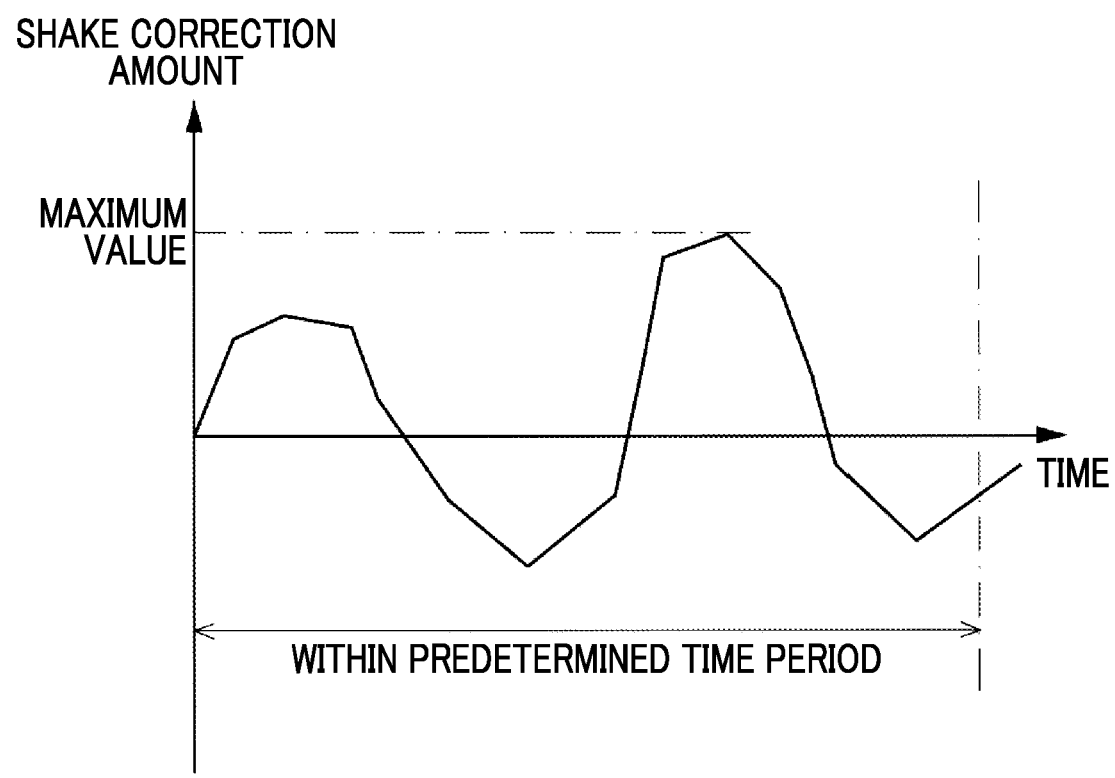
FIG. 15 is a graph illustrating an example of a temporal change in shake correction amount.

Here, FIG. 15 illustrates an example of a temporal change in shift correction amount Z in the registration control of the captured image. In the present embodiment, the CPU 60A acquires a maximum value of the shift correction amount Z within a predetermined time period of the registration control as the shift correction amount Z to be used for deriving the irradiation range R. For example, the maximum value of the shift correction amount Z is obtained by performing processing of acquiring the shift correction amount Z in constant cycles within the predetermined time period and sequentially updating the currently acquired shift correction amount Z to the "maximum value of the shift correction amount Z" in a case where the currently acquired shift correction amount Z is larger than the previously acquired shift correction amount Z.

The control portion 60H operates the shake correction portion 24 in accordance with the shift correction amount Z. For example, the anti-vibration lens 15B1 is moved in the anti-vibration lens two-dimensional plane by operating the lens side shake correction mechanism 29. In such a manner, by operating the shake correction portion 24 under control of the control portion 60H, the subject image position falls within the center region. The shift correction amount Z is an example of a "shake correction amount" according to the embodiment of the disclosed technology.

In the second embodiment, the irradiation range R corresponding to the shift correction amount Z, the focal length X, and the subject distance L is registered in the irradiation range derivation table 60T stored in the storage 60B. The irradiation range R registered in the irradiation range derivation table 60T is a range that covers the imaging range PE in a case of the shift correction amount Z, the focal length X, and the subject distance L. From the irradiation range derivation table 00, the control portion 60H derives the irradiation range R corresponding to the shift correction amount Z calculated by the shift correction amount calculation portion 60M and the focal length X and the subject distance L acquired from the surveillance camera 10.

Figure 16A:
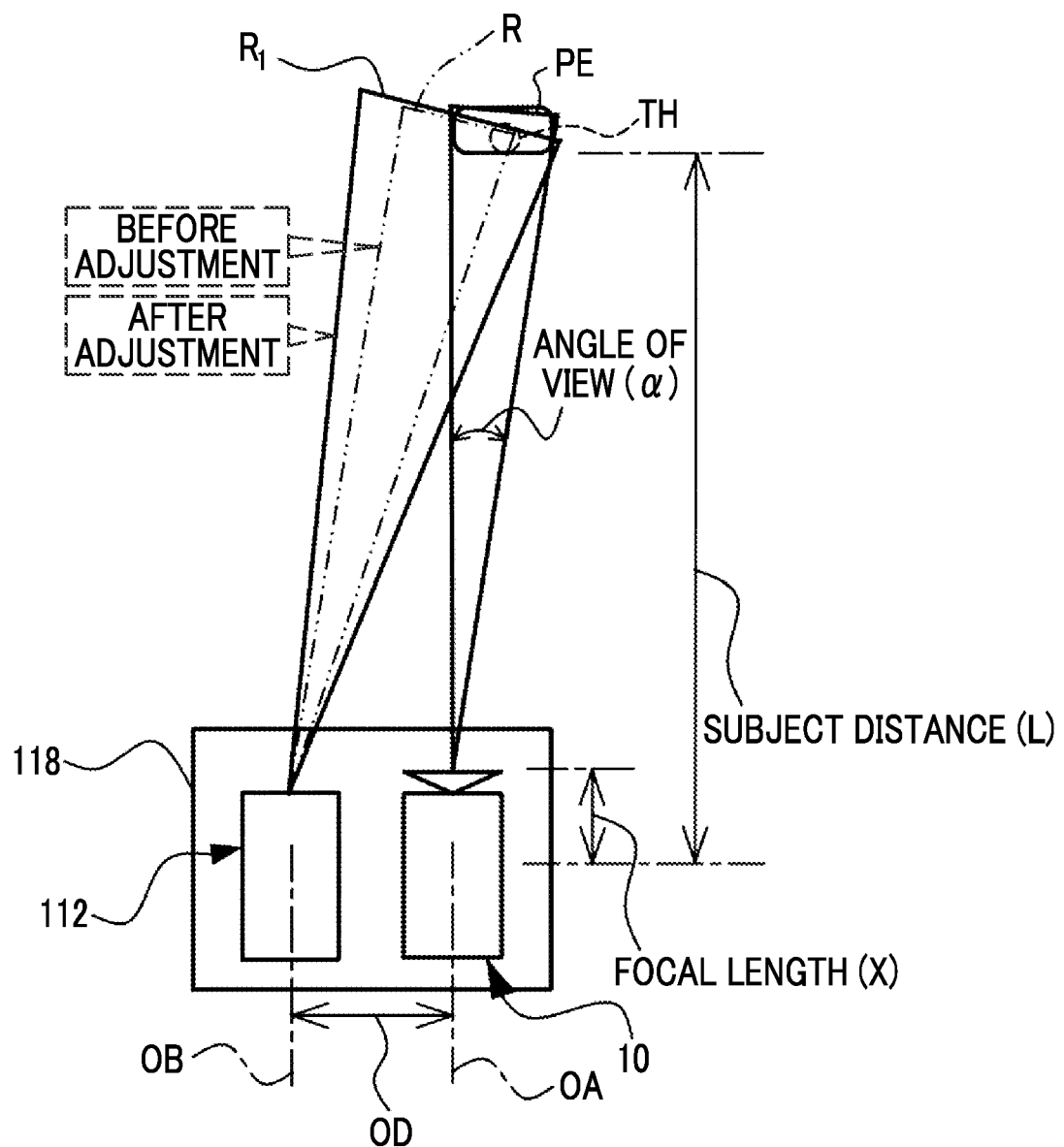
FIG. 16A is a conceptual diagram illustrating an example of a state where a registration control is performed in a surveillance camera according to the second embodiment.
Figure 16B:
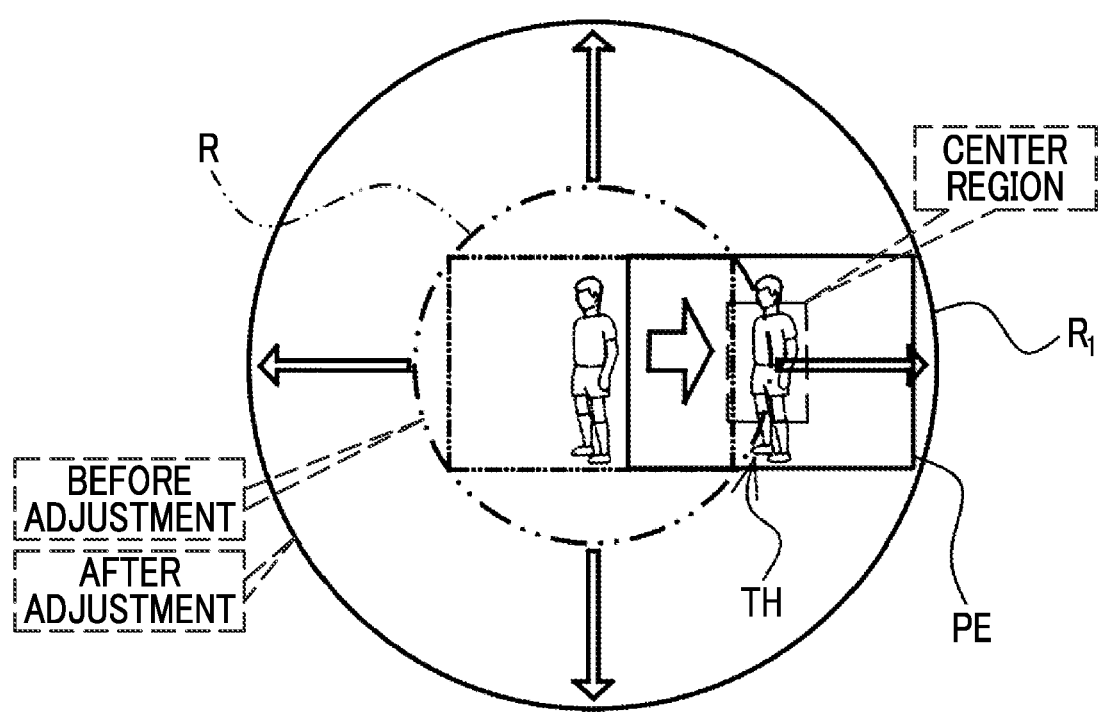
FIG. 16B is a schematic diagram illustrating an example of the captured image obtained by imaging by the surveillance camera and the irradiation range of the light in the state illustrated in FIG. 16A.

FIG. 16A and FIG. 16B illustrate a relationship between the imaging range PE of the surveillance camera 10 and the irradiation range R of the light by the irradiation apparatus 112 in the second embodiment. Even in the second embodiment, in a state where the target subject TH is positioned in front of the surveillance camera 10, the irradiation range R of the light from the irradiation apparatus 112 covers the imaging range PE of the surveillance camera 10 (refer to FIG. 8A and FIG. 8B).

As illustrated in FIG. 16B, in a case where the target subject TH moves (in the example in FIG. 16B, moves rightward), in the second embodiment, the shake correction portion 24 is operated in the surveillance camera 10 while a state where directions of the support table 118, the surveillance camera 10, and the irradiation apparatus 112 are not changed is maintained as illustrated in FIG. 16A. Accordingly, the imaging range PE is moved such that a relative image position of the target subject TH falls within the center region in the imaging range PE. However, the irradiation range R of the light cannot cover the imaging range PE due to the movement of the imaging range PE. Therefore, the control portion 60H of the second embodiment derives the irradiation range R corresponding to the shift correction amount Z, the focal length X, and the subject distance L from the irradiation range derivation table 00 and transmits the information of the derived irradiation range R to the irradiation apparatus 112. In the irradiation apparatus 112, the irradiation range R is widened in accordance with the transmitted information as illustrated by a solid line in FIG. 17A and FIG. 17B. Accordingly, a state where the irradiation range R covers the imaging range PE is implemented.

Figure 17:
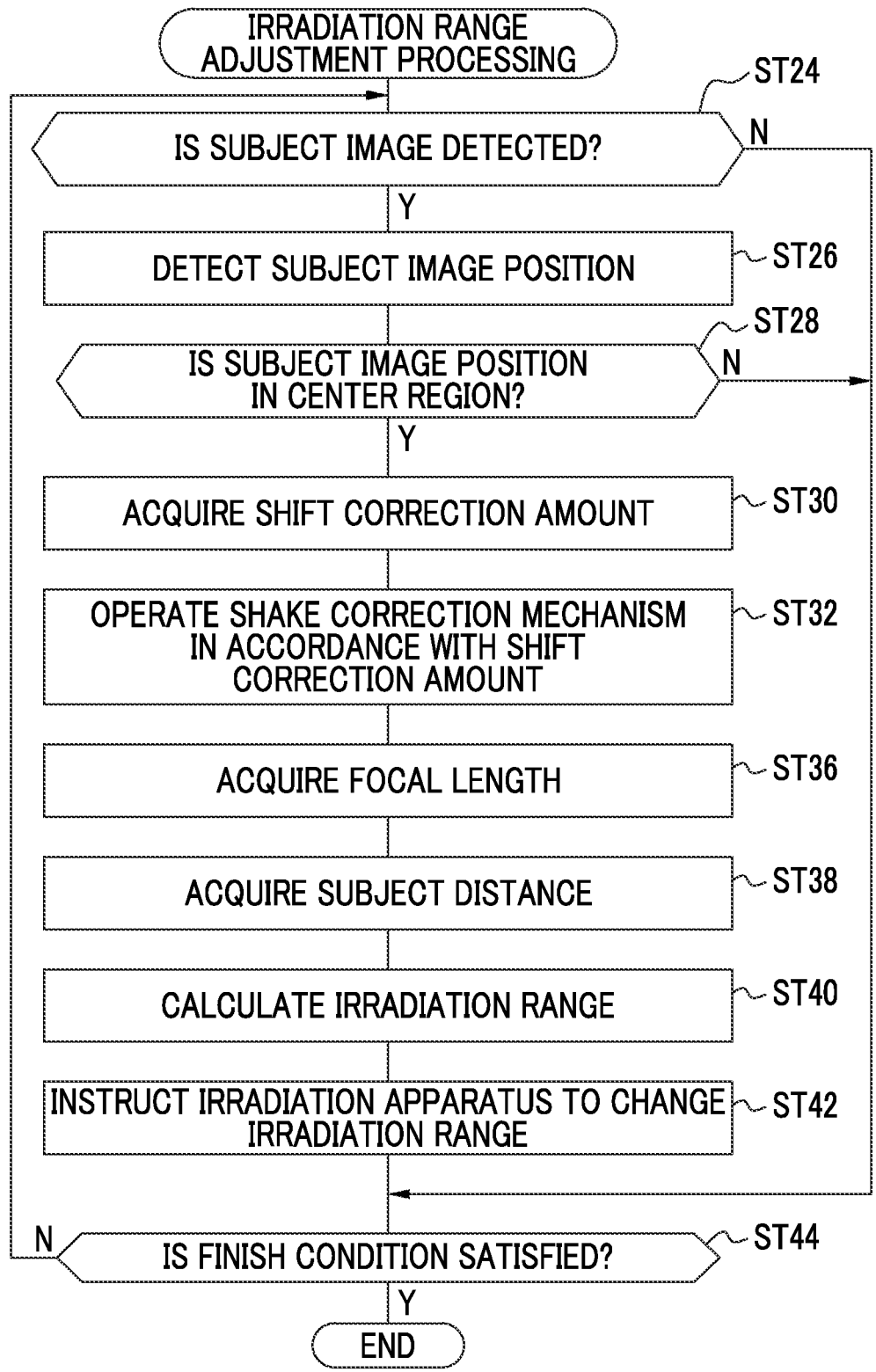
FIG. 17 is a flowchart illustrating an example of a flow of irradiation range adjustment processing according to the second embodiment.

FIG. 17 illustrates an example of a flow of irradiation range adjustment processing executed by the CPU 60A of the management apparatus 11 in accordance with the irradiation range adjustment processing program 60Q in the second embodiment. The flow of irradiation range adjustment processing illustrated in FIG. 17 is an example of the "irradiation range adjustment method" according to the embodiment of the disclosed technology.

In the irradiation range adjustment processing illustrated in FIG. 17, in step ST24, for the captured image acquired from the surveillance camera 10, the subject image detection portion 60K determines whether or not the subject image is detected from the captured image. In step ST24, in a case where the subject image is not detected in the captured image, a negative determination is made, and the irradiation range adjustment processing transitions to step ST44.

In step ST24, in a case where the subject image detection portion 60K detects the subject image from the captured image, a positive determination is made, and the irradiation range adjustment processing transitions to step ST26.

In step ST26, the subject image detection portion 60K detects the subject image position from the captured image. For example, in a case where the subject image is a standing person image in a front view, the subject image detection portion 60K detects the subject image position by detecting a head top portion of the person image as an upper end portion of the subject image and detecting a foot tip portion of the person image as a lower end portion of the subject image. In addition, the subject image detection portion 60K detects a right shoulder portion or a right arm portion of the person image as a right end portion of the target subject image and detects a left shoulder portion or a left arm portion of the person image as a left end portion of the target subject image.

In subsequent step ST28, the image position determination portion 60L determines whether or not the subject image position is in the center region. In step ST28, in a case where the subject image position is not in the center region, a negative determination is made, and the irradiation range adjustment processing transitions to step ST44. In step ST28, in a case where the subject image position is in the center region, a positive determination is made, and the irradiation range adjustment processing transitions to step ST30.

In step ST30, the shift correction amount calculation portion 60M calculates the shift correction amount Z. In the second embodiment, as illustrated in FIG. 16, the control portion 60H acquires the maximum value of the shift correction amount Z within the predetermined time period of the registration control. The maximum value of the shift correction amount Z is a maximum value of a displacement amount of the target subject image in the captured image.

In subsequent step ST32, the control portion 60H performs the registration control of the target subject by operating the shake correction portion 24 in accordance with the shift correction amount Z acquired in step ST30. By the registration control, the subject image position outside the center region is caused to fall within the center region as illustrated in FIG. 16B.

Then, in step ST36, the control portion 60H acquires the focal length X from the surveillance camera 10 in the same manner as the irradiation range adjustment processing of the first embodiment illustrated in FIG. 13. The irradiation range adjustment processing transitions to step ST38. In step ST38, the control portion 60H acquires the subject distance L from the surveillance camera 10. The irradiation range adjustment processing transitions to step ST40. The control portion 60H derives the irradiation range R from the irradiation range derivation table 60T based on the acquired shift correction amount Z, focal length X, and subject distance L. The irradiation range adjustment processing transitions to step ST42. The control portion 60H instructs the irradiation apparatus 112 to change the irradiation range R. Accordingly, as illustrated in FIG. 16A and FIG. 16B, the irradiation range R is changed in the irradiation apparatus 112, and the irradiation range R covers the imaging range PE. The irradiation range adjustment processing transitions to step ST44. In step ST44, the control portion 60H determines whether or not the finish condition is satisfied.

In the second embodiment, registration control processing that is processing of causing the target subject to fall within the center region of the captured image is performed by operating the shake correction portion 24. In the surveillance camera 10 performing this registration control processing, the irradiation range R of the light from the irradiation apparatus 112 can be adjusted.

In the second embodiment, the CPU 60A acquires the maximum value of the shift correction amount Z within the predetermined time period of the registration control. The maximum value of the shift correction amount Z within the predetermined time period is acquired in step ST30. In the derivation of the irradiation range R in step ST40, the irradiation range R is derived within a range restricted in accordance with the maximum value of the shift correction amount Z. In a configuration of adjusting the irradiation range R without providing such a restriction corresponding to the maximum value of the shift correction amount Z, the adjustment of the irradiation range R accompanied by the movement of the target subject TH may be excessively frequently performed. By adjusting the irradiation range R within the range restricted in accordance with the maximum value of the shift correction amount Z, excessively frequent adjustment of the irradiation range R can be suppressed.

In a case where the irradiation range R is widened, the light quantity per unit area for the target subject TH is decreased. Thus, the light quantity per unit area of the target subject TH may be approximated by increasing output of the light source 124 from before the irradiation range R is widened. In addition, in a case where an upper limit of the irradiation range R is not set, the output of the light source 124 needs to be increased in accordance with the widening of the irradiation range R in order to secure the light quantity per unit area of the target subject TH. Accordingly, setting the upper limit of the irradiation range R results in a configuration that does not need to excessively increase the output of the light source 124.

First Modification Example

Next, a first modification example will be described. As an example, the first modification example is an example in which a configuration illustrated below is modified in the configuration in the first embodiment. In the first modification example, the same elements, members, and the like as in the first embodiment will be designated by the same reference numerals as in the first embodiment and will not be described in detail. In addition, overall configurations of a surveillance camera that is an example of an imaging apparatus, and an irradiation apparatus of the first modification example are the same as the surveillance camera 10 and the irradiation apparatus 112 of the first embodiment and thus, will not be illustrated.

Figure 18:
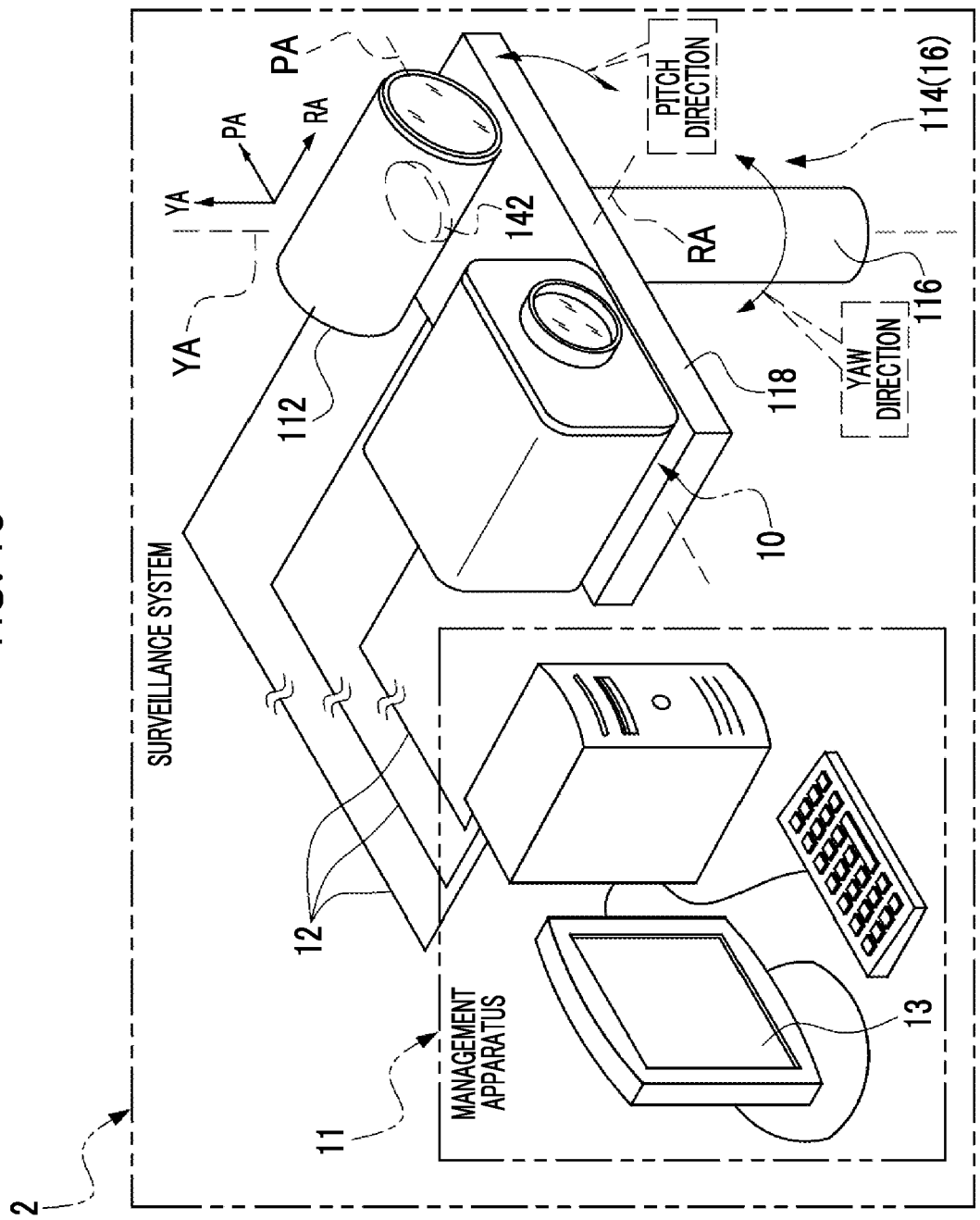
FIG. 18 is a schematic configuration diagram illustrating an example of a configuration of a surveillance system according to a first modification example.

As illustrated in FIG. 18 as an example, in the first modification example, the irradiation apparatus 112 is attached to the support table 118 through a rotary table 142.

Figure 19:
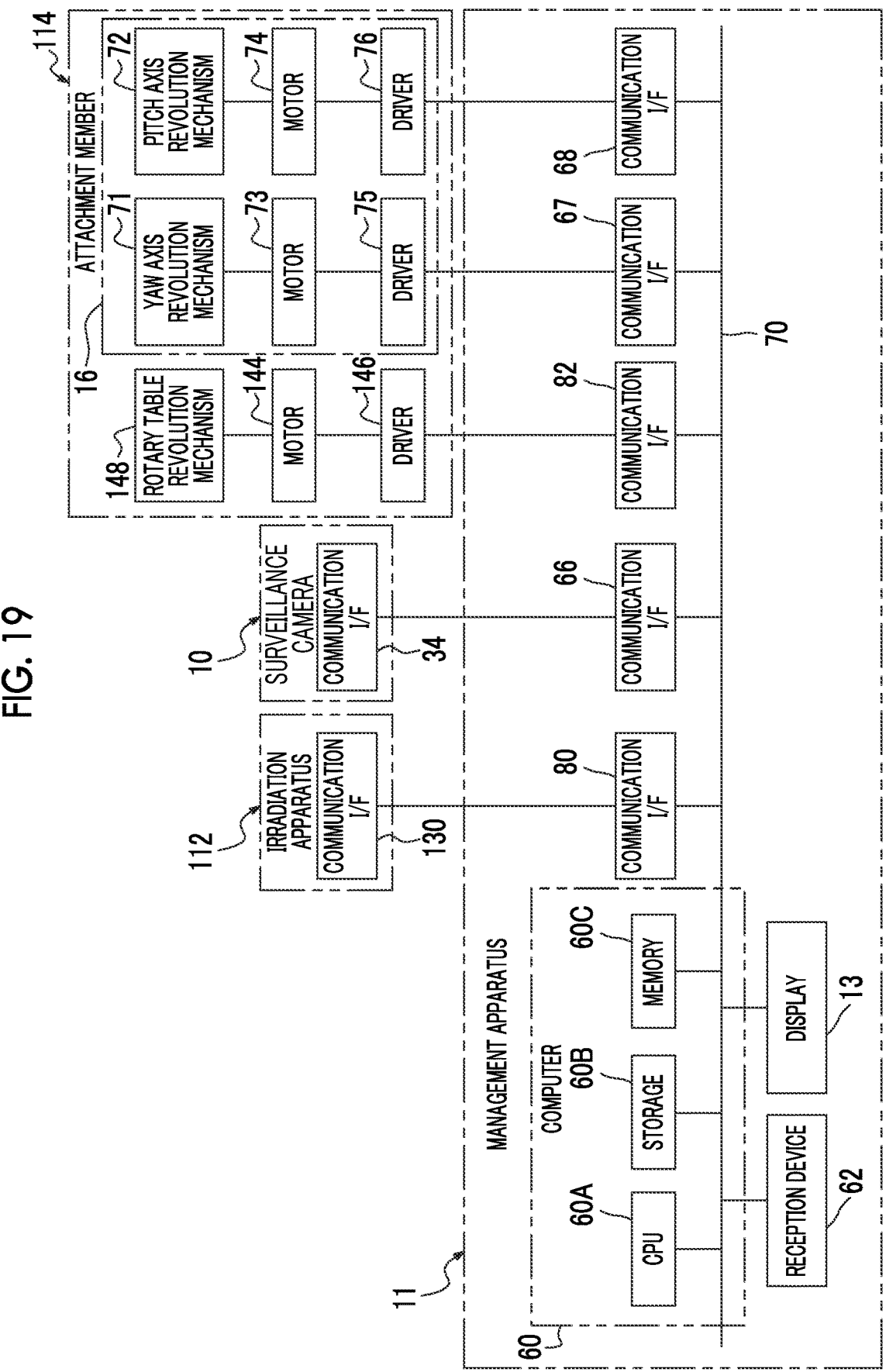
FIG. 19 is a block diagram illustrating an example of a configuration of an electric system of a management apparatus and a revolution mechanism according to the first modification example.

As illustrated in FIG. 19, the attachment member 114 comprises a rotary table revolution mechanism 148, a motor 144, and a driver 146 in addition to the configuration of the first embodiment.

The rotary table revolution mechanism 148 enables the rotary table 142 and the irradiation apparatus 112 to revolve in the yaw direction with respect to the support table 118 as illustrated in FIG. 20. In addition, the rotary table revolution mechanism 148 enables the rotary table 142 and the irradiation apparatus 112 to revolve in the pitch direction with respect to the support table 118 as illustrated in FIG. 21. The revolution directions in FIG. 20 and FIG. 21 represent in which direction an end part of the irradiation apparatus 112 on a light emission side revolves. For example, in FIG. 20, "leftward revolution" means that the end part of the irradiation apparatus 112 on the light emission side revolves in a direction of moving in a leftward direction. In FIG. 21, "upward revolution" means that the end part of the irradiation apparatus 112 on the light emission side revolves in a direction of moving in an upward direction.

The motor 144 is driven to generate motive power under control of the driver 146. The rotary table revolution mechanism 142 causes the rotary table 142 to revolve in the yaw direction and the pitch direction by receiving the motive power generated by the motor 144. The irradiation apparatus 112 is fixed to the rotary table 142. Thus, in a case where the rotary table 142 revolves in the pitch direction and the yaw direction, the irradiation apparatus 112 also revolves in the pitch direction and the yaw direction together with the rotary table 142 as a single body.

In the first modification example, the management apparatus 11 comprises a communication I/F 82. The communication I/F 82 is connected to the bus 70. The communication I/F 82 is, for example, a network interface. The communication I/F 82 is communicably connected to the driver 146 through a network. The CPU 60A controls a revolution operation of the rotary table revolution mechanism 142 by controlling the motor 144 through the communication I/F 82 and the driver 146.

Figure 22A:
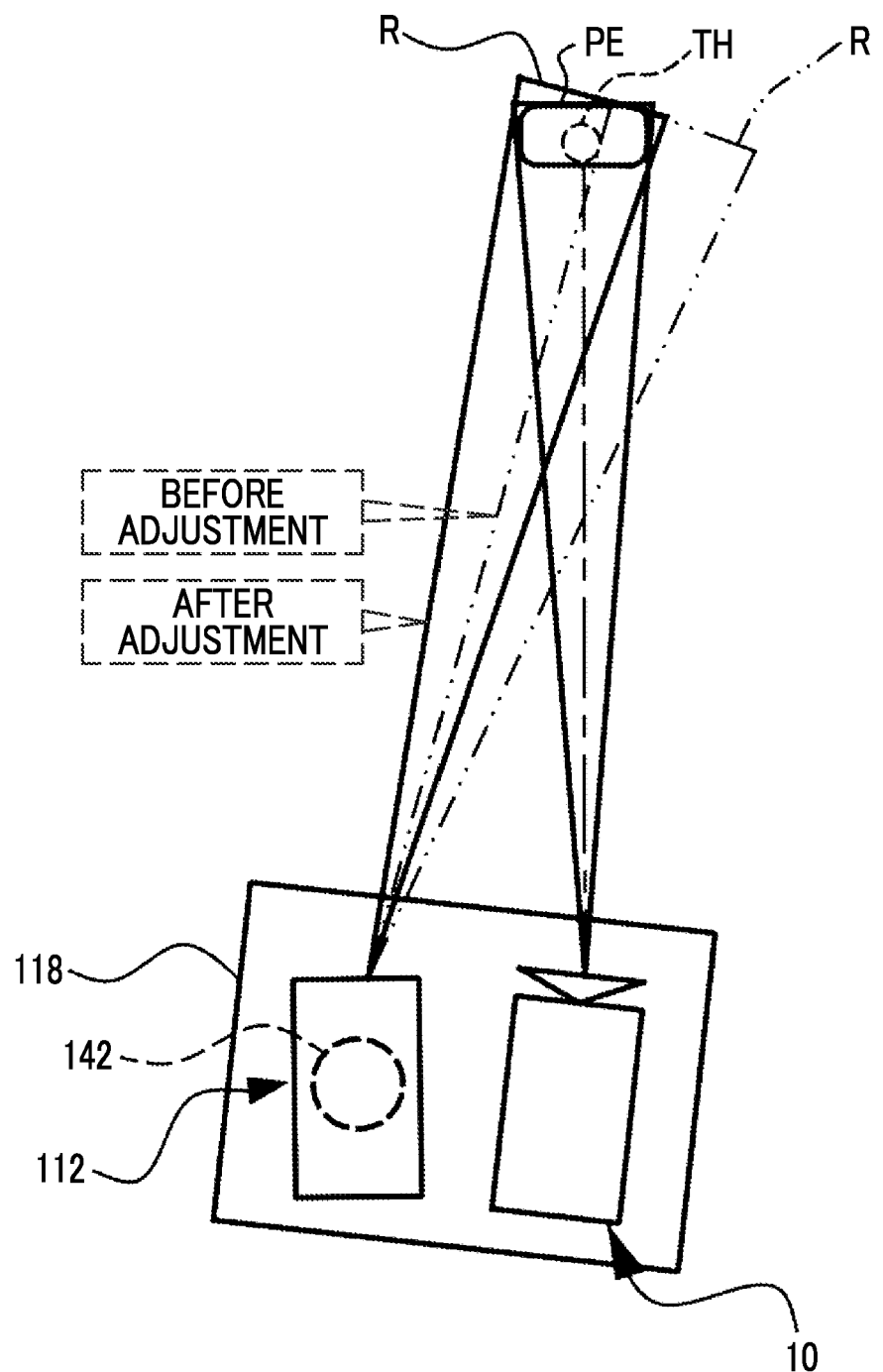
FIG. 22A is a conceptual diagram illustrating an example of a state where the shake correction control is performed in a surveillance camera according to the first modification example.
Figure 22B:
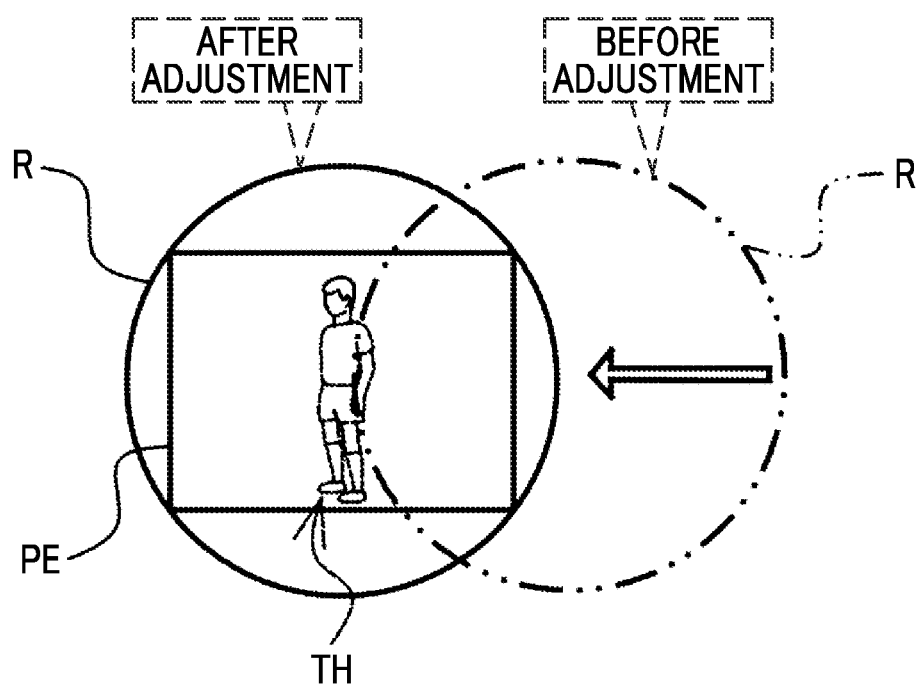
FIG. 22B is a schematic diagram illustrating an example of the captured image obtained by imaging by the surveillance camera and the irradiation range of the light in the state illustrated in FIG. 22A.

FIG. 22A illustrates a state where, as an example, the support table 118 vibrates, and the support table 118 rotates in the clockwise direction in the first modification example. In this case, the image of the target subject TH falls within the imaging range PE as illustrated in FIG. 22B by executing the shake correction control by the shake correction portion 24 of the surveillance camera 10 in the same manner as in the first embodiment.

In the first modification example, in the irradiation range adjustment processing, the rotary table 142 is caused to revolve in the counterclockwise direction relative to the support table 118, that is, caused to revolve leftward, as illustrated in FIG. 22A. Accordingly, the irradiation apparatus 112 revolves leftward, and the irradiation range R relatively moves to the left side as illustrated by a solid line in FIG. 22A and FIG. 22B. A state where the irradiation range R covers the imaging range PE is implemented.

In a case where the support table 118 rotates in the counterclockwise direction as opposed to FIG. 22A, the rotary table 142 is caused to revolve in the clockwise direction relative to the support table 118, that is, caused to revolve rightward, in the irradiation range adjustment processing. Accordingly, the irradiation apparatus 112 revolves rightward, and the irradiation range R relatively moves to the right side. A state where the irradiation range R covers the imaging range PE is implemented.

That is, in the first modification example, in a case where the support table 118 rotates in the yaw direction due to the vibration, the rotary table 142 is caused to revolve in the yaw direction in an opposite direction to the rotation direction of the support table 118. Accordingly, the irradiation range R moves in the yaw direction, that is, a right-left direction, and a state where the irradiation range R covers the imaging range PE can be maintained.

In FIG. 22A and FIG. 22B, a case where the rotary table 142 revolves in the yaw direction relative to the support table 118 is illustrated. However, in the first modification example, the rotary table 142 can also revolve in the pitch direction relative to the support table 118 as illustrated in FIG. 21. Accordingly, even in a case where the support table 118 rotates in the pitch direction due to the vibration, the irradiation range R is moved in the pitch direction, that is, an up-down direction, by revolution of the rotary table 142 and the irradiation apparatus 112 in the pitch direction. In such a manner, by moving the irradiation range R in the up-down direction, a state where the irradiation range R covers the imaging range PE can be maintained.

Second Modification Example

Next, a second modification example will be described. The second modification example is an example in which a configuration illustrated below is modified in the configuration in the first embodiment. In the second modification example, the same elements, members, and the like as in the first embodiment will be designated by the same reference numerals as in the first embodiment and will not be described in detail. In addition, overall configurations of a surveillance camera that is an example of an imaging apparatus, and an irradiation apparatus of the second modification example are the same as the surveillance camera 10 and the irradiation apparatus 112 of the first embodiment or the first modification example and thus, will not be illustrated.

Figure 23:
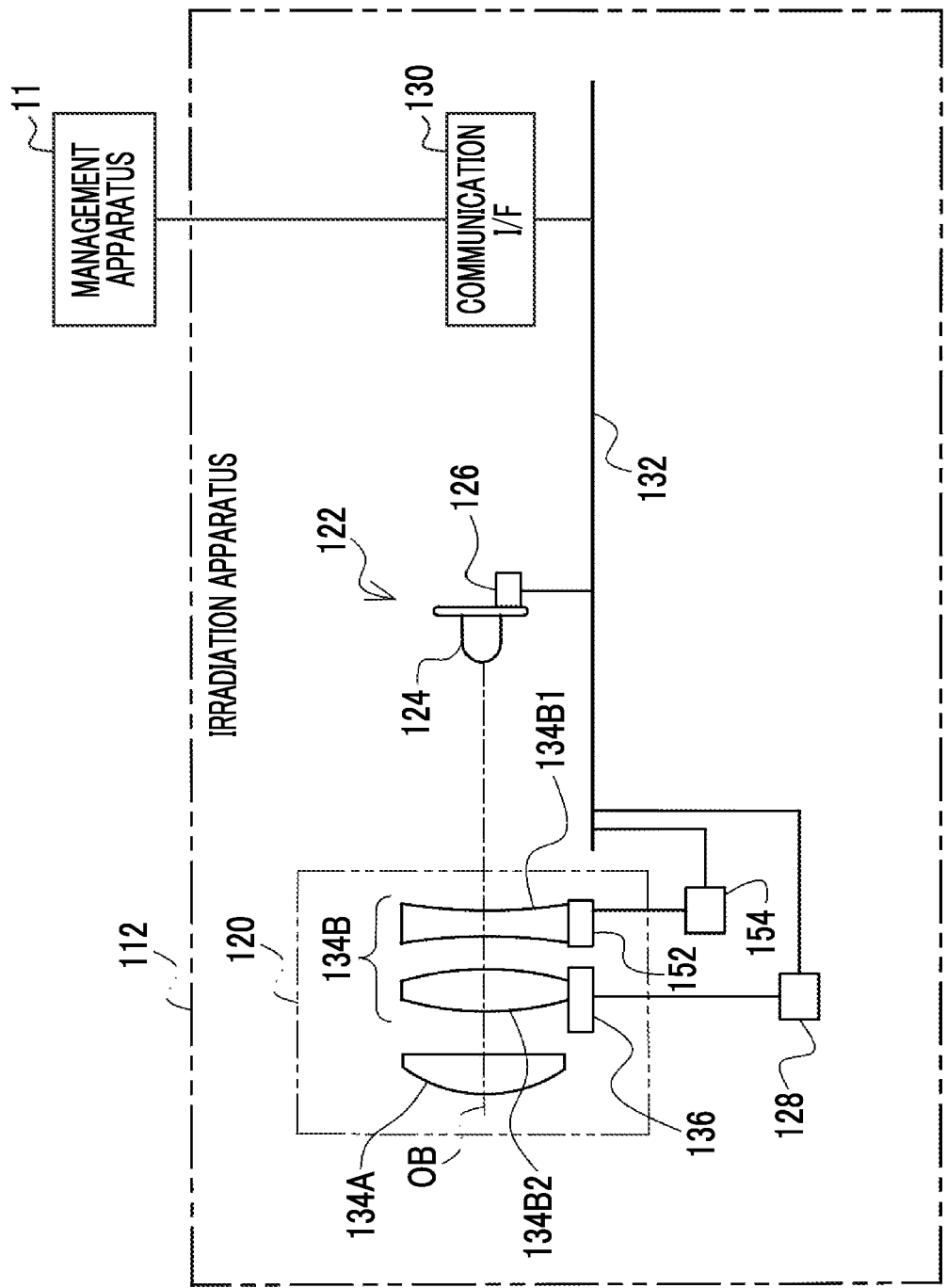
FIG. 23 is a block diagram illustrating an example of a configuration of an optical system and an electric system of an irradiation apparatus according to a second modification example.

As illustrated in FIG. 23, in the irradiation apparatus 112 of the second modification example, the lens group 134B of the optical system 120 comprises the zoom lens 134B2 and further comprises a refracting lens 134B1. Furthermore, the irradiation apparatus 112 of the second modification example comprises an actuator 152. The refracting lens 134B1 is movably supported in a direction perpendicular to the optical axis OB by the actuator 152.

The actuator 152 applies motive power to the refracting lens 134B1 to change the refracting lens 134B1 in the direction perpendicular to the optical axis OB. The actuator 152 is controlled by the CPU 60A of the management apparatus 11 through a displacement driver 154. The displacement driver 154 changes a position of the refracting lens 134B1 in the direction perpendicular to the optical axis OB by operating the actuator 152 in accordance with the instruction from the CPU 60A of the management apparatus. By changing the refracting lens 134B1 in the direction perpendicular to the optical axis OB, an irradiation direction of the light from the irradiation apparatus 112 is adjusted to the yaw direction and the pitch direction with respect to the optical axis OB.

Figure 24A:
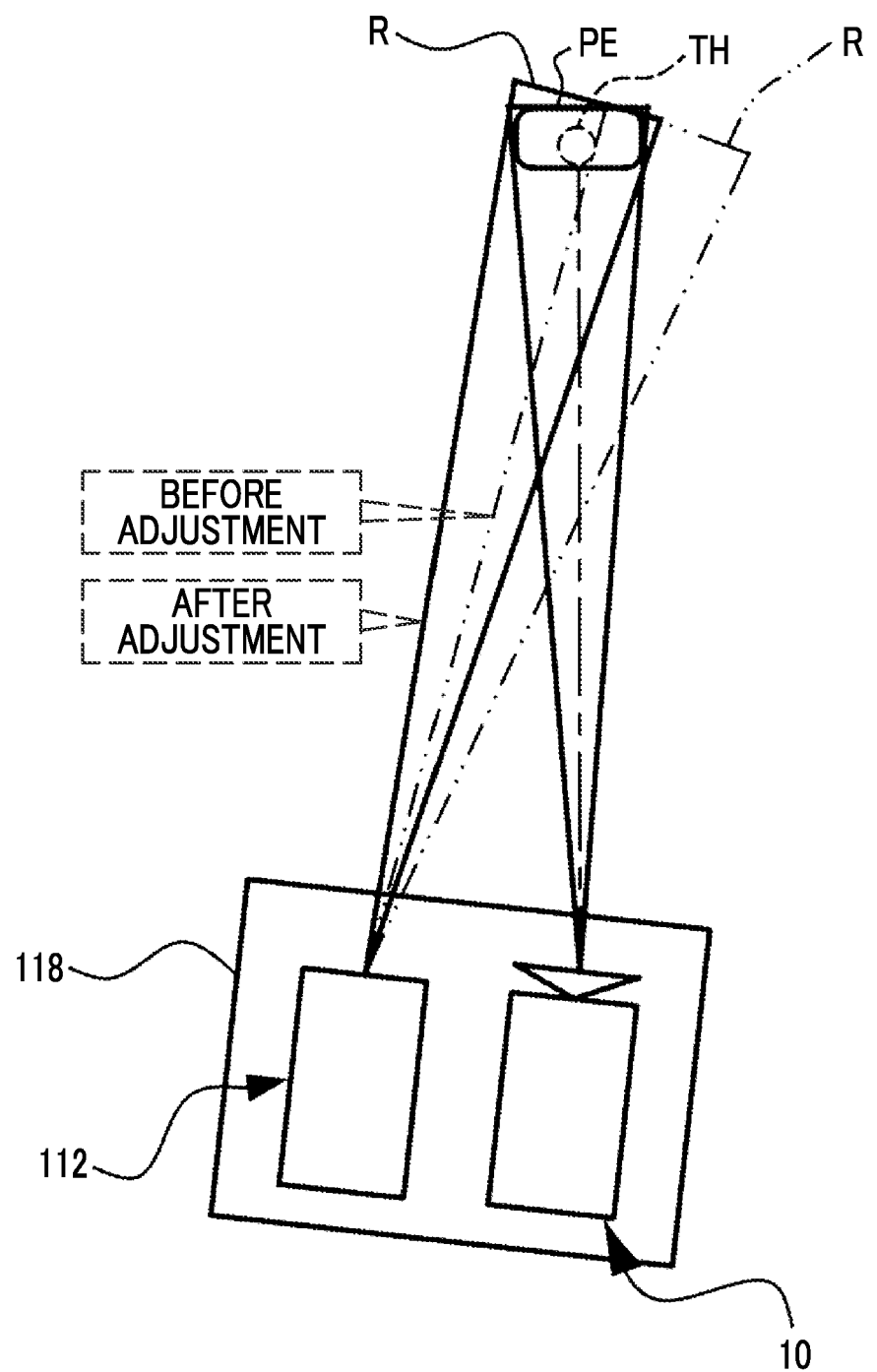
FIG. 24A is a conceptual diagram illustrating an example of a state where the shake correction control is performed in a surveillance camera according to the second modification example.
Figure 24B:
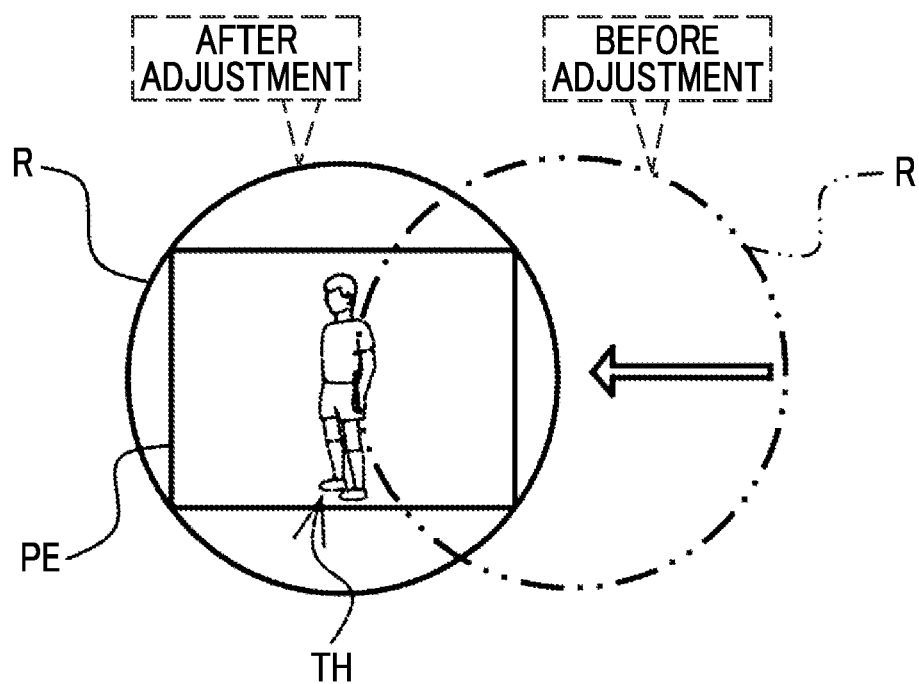
FIG. 24B is a schematic diagram illustrating an example of the captured image obtained by imaging by the surveillance camera and the irradiation range of the light in the state illustrated in FIG. 24A.

FIG. 24A and FIG. 24B illustrate a state where, as an example, the support table 118 vibrates, and the support table 118 rotates in the clockwise direction in the second modification example. In this case, the image of the target subject TH falls within the imaging range PE as illustrated in FIG. 24B by executing the shake correction control by the shake correction portion 24 of the surveillance camera 10 in the same manner as in the first modification example.

In the second modification example, in the irradiation range adjustment processing, the position of the refracting lens 134B1 is changed in the direction perpendicular to the optical axis OB by controlling the actuator 152 by the CPU 60A of the management apparatus 11 through the displacement driver 154. Accordingly, for example, the irradiation range R moves to the left side as illustrated by a solid line in FIG. 24A and FIG. 24B. In addition, the irradiation range R is moved to the right side, an upper side, and a lower side depending on a movement direction of the refracting lens 134B1. By moving the irradiation range R in such a manner, a state where the irradiation range R covers the imaging range PE can be maintained.

In the second modification example, in a case where the support table 118 rotates in the counterclockwise direction, the irradiation range R is moved to the right side in the irradiation range adjustment processing. In addition, in the second modification example, the irradiation range R is also moved in the up-down direction by adjusting the direction in which the refracting lens 134B1 changes.

In the second modification example, a configuration further comprising the rotary table 142 of the first modification example can be employed. That is, a configuration comprising the rotary table 142 of the first modification example and further comprising the refracting lens 134B1 and the actuator 152 in the irradiation apparatus 112 of the second modification example may be employed. In this case, for example, the irradiation range adjustment processing in which coarse adjustment of the irradiation direction is performed by rotating the rotary table 142, and next, fine adjustment of the irradiation direction is performed by changing the refracting lens 134B1 can be executed. The fine adjustment of the irradiation range R is adjustment having relatively higher resolution of adjustment than the coarse adjustment of the irradiation range. For example, as an irradiation angle in the yaw direction, while an angular variation in adjustment accuracy of the coarse adjustment is approximately 1 radian in radian measure, an angular variation in adjustment accuracy of the fine adjustment is approximately 10 minutes.

Third Modification Example

Next, a third modification example will be described. The third modification example is an example in which a configuration illustrated below is modified in the configuration in the first embodiment. In the third modification example, the same elements, members, and the like as in the first embodiment will be designated by the same reference numerals as in the first embodiment and will not be described in detail. In addition, overall configurations of a surveillance camera that is an example of an imaging apparatus, and an irradiation apparatus of the third modification example are the same as the surveillance camera 10 and the irradiation apparatus 112 of the first embodiment and thus, will not be illustrated.

Figure 25:
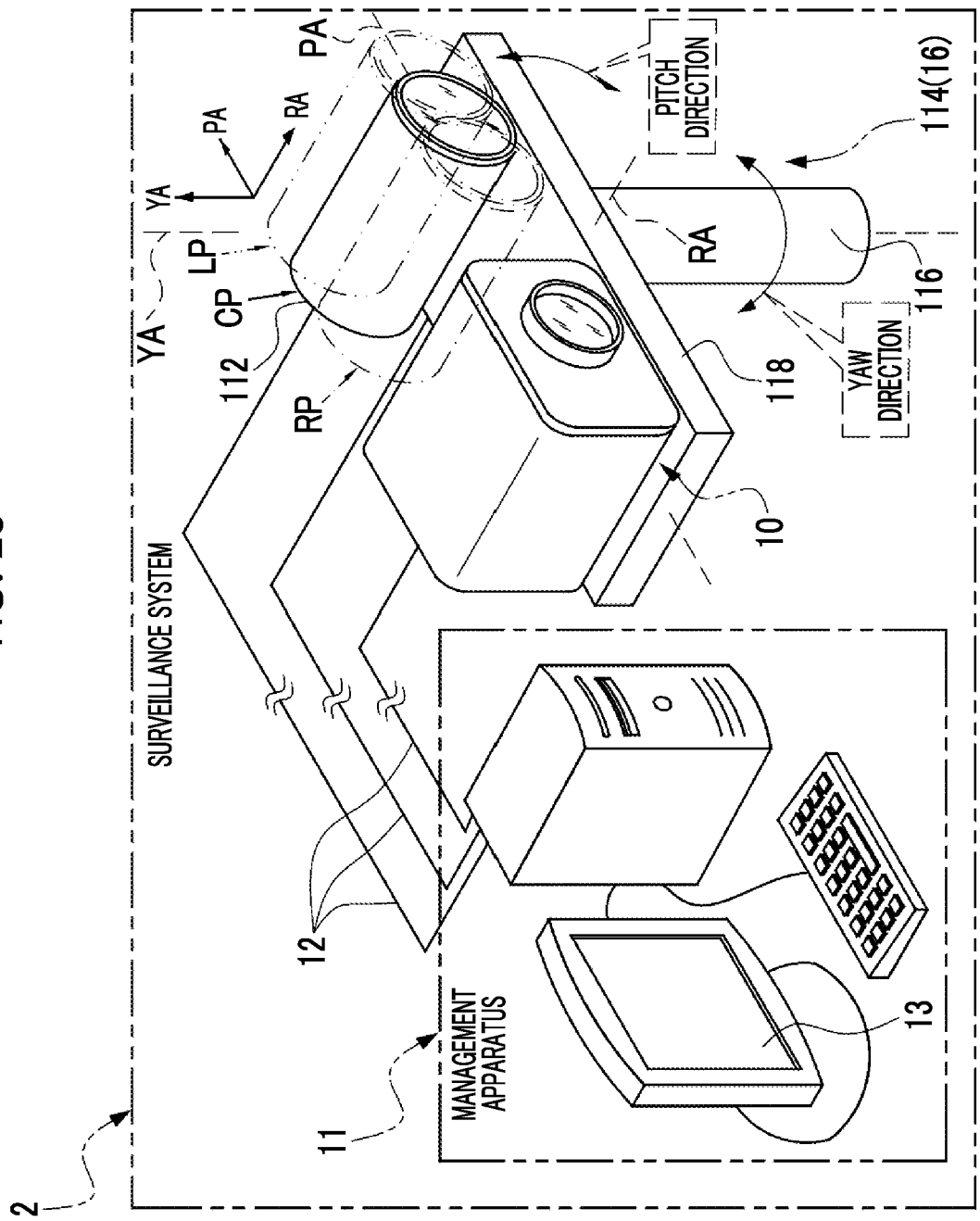
FIG. 25 is a schematic configuration diagram illustrating an example of a configuration of a surveillance system according to a third modification example.

As illustrated in FIG. 25 as an example, in the third modification example, a plurality of locations (in the example illustrated in FIG. 25, three locations of a center position CP illustrated by a solid line, a right position RP illustrated by a dash dotted line, and a left position LP illustrated by a dash double dotted line) along the pitch axis PA are set in the support table 118 as an attachment position of the irradiation apparatus 112 relative to the surveillance camera 10. For example, the plurality of locations of the attachment positions may be set in accordance with a type (a size or intensity of emitted light) of the irradiation apparatus 112, or the attachment position may be configured to be changeable in the irradiation apparatus 112 of one type.

Figure 26:
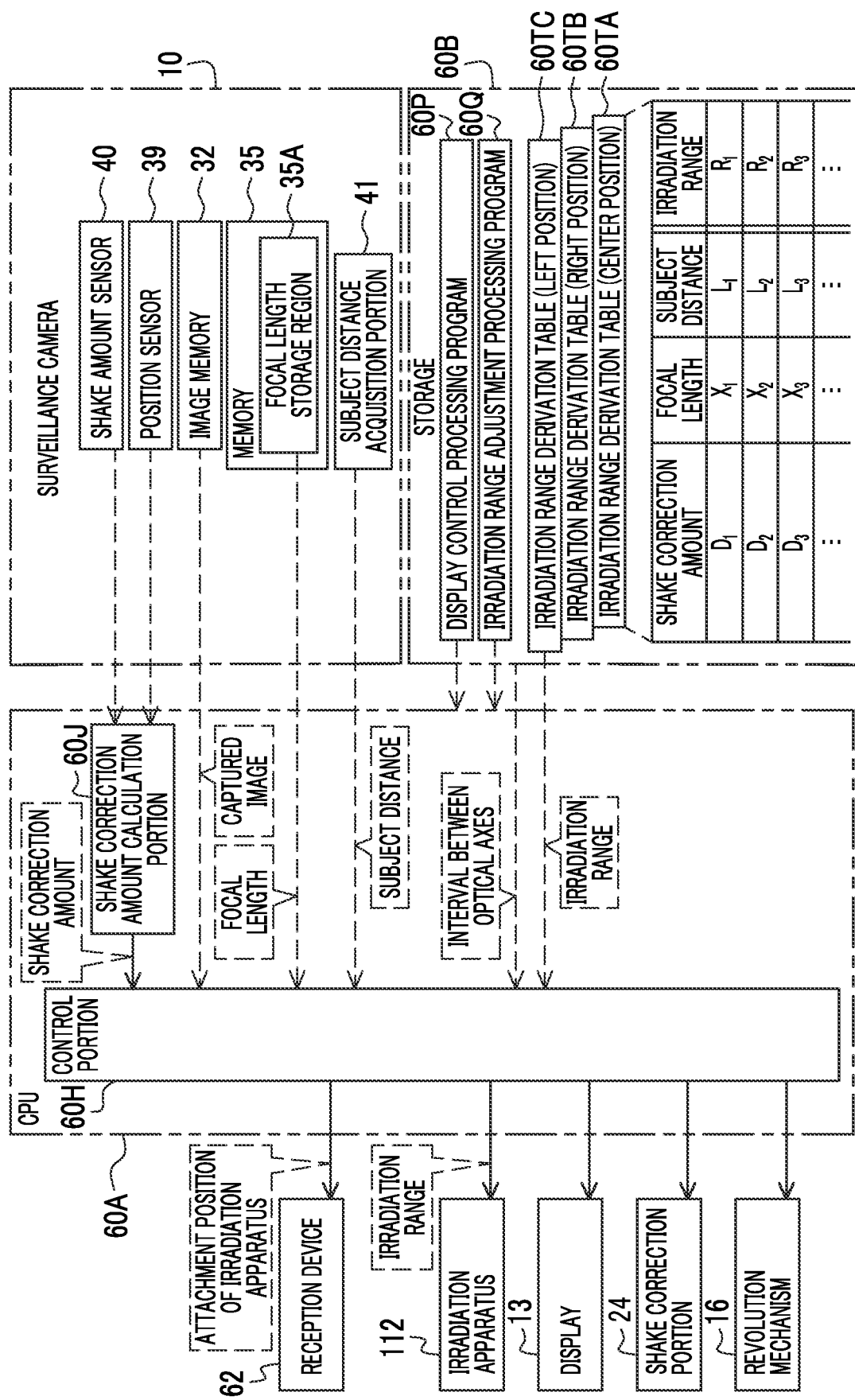
FIG. 26 is a function block diagram illustrating an example of functions of a CPU included in a management apparatus according to the third modification example.
Figure 27A:
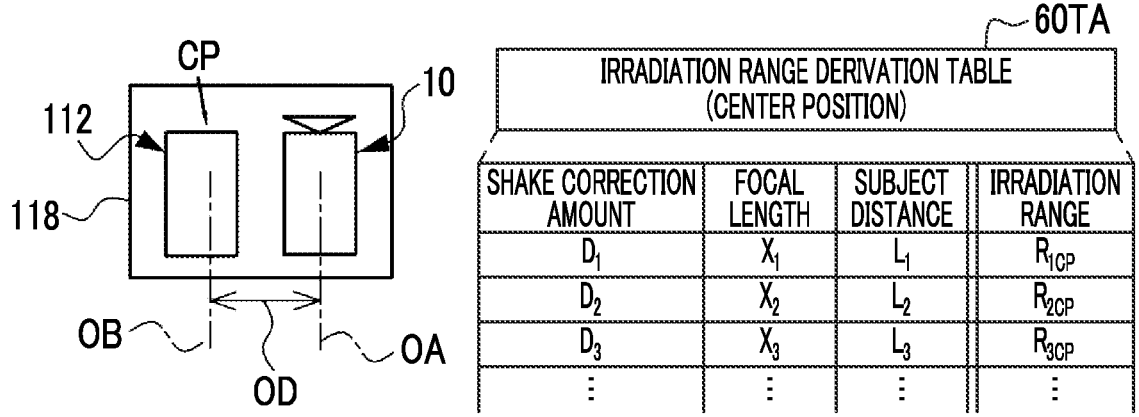
FIG. 27A is a diagram illustrating an example of a combination of an optical axis interval and an irradiation range derivation table according to the third modification example.
Figure 27B:
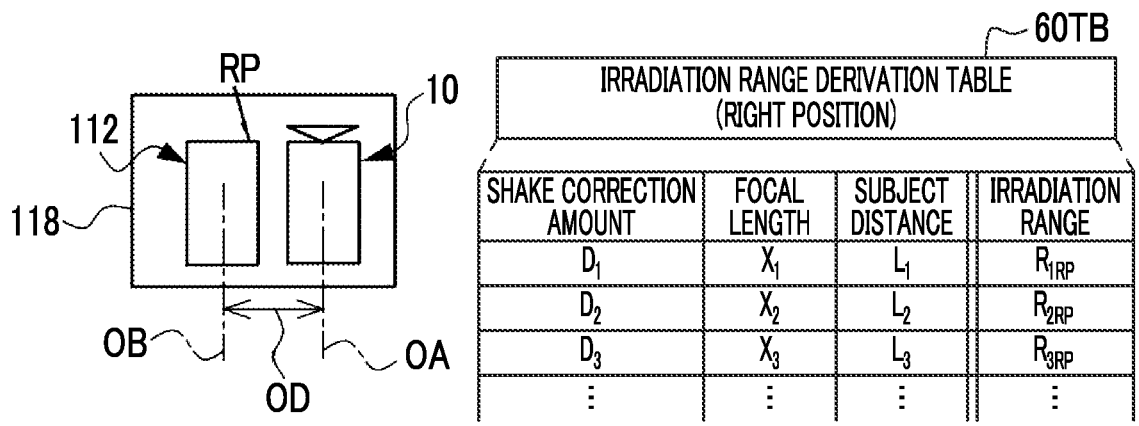
FIG. 27B is a diagram illustrating a different example of the combination of the optical axis interval and the irradiation range derivation table according to the third modification example from FIG. 27A.
Figure 27C:
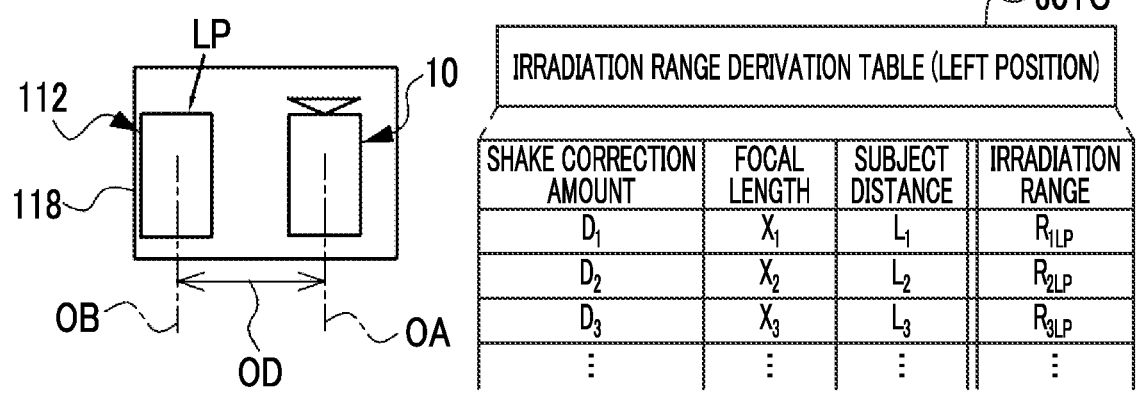
FIG. 27C is a diagram illustrating a different example of the combination of the optical axis interval and the irradiation range derivation table according to the third modification example from FIG. 27A and FIG. 27B.

As illustrated in FIG. 26, in the third modification example, the storage 60B stores the irradiation range derivation table 60T of three types corresponding one-to-one to the attachment position of the irradiation apparatus 112. That is, as illustrated in FIG. 27A to FIG. 27C as an example, an irradiation range derivation table 60TA corresponds to the center position CP, an irradiation range derivation table 60TB corresponds to the right position RP, and an irradiation range derivation table 60TC corresponds to the left position LP. Irradiation ranges $R_{CP}$, $R_{RP}$, and $R_{LP}$ registered in the irradiation range derivation table 60T of three types, respectively, are set to values on which the attachment position of the irradiation apparatus 112 is reflected.

In the third modification example, an optical axis interval OD varies depending on the attachment position of the irradiation apparatus 112. This "optical axis interval OD" is an interval between the optical axis OA of the surveillance camera 10 and the optical axis OB of the irradiation apparatus 112, that is, an inter-optical axis distance, and is also a difference in attachment position. The attachment position of the irradiation apparatus 112 is input by the user through the reception device 62 and is transmitted to the control portion 60H. The attachment position of the irradiation apparatus 112 is stored in the storage 60B. The attachment position may also be obtained by detecting a position of the irradiation apparatus 112 by a position sensor provided in the support table 118.

In the third modification example, in a case of performing the irradiation range adjustment processing, first, the attachment position of the irradiation apparatus 112 is read into the control portion 60H from the storage 60B. The control portion 60H derives the irradiation range R using the irradiation range derivation table 60T corresponding to the read attachment position of the irradiation apparatus 112.

Then, for example, the irradiation range adjustment processing is executed in accordance with the same flow as the first embodiment illustrated in FIG. 13. In a case where the attachment position of the irradiation apparatus 112 varies, the irradiation range R of the light from the irradiation apparatus 112 also varies. However, the irradiation range R on which the attachment position of the irradiation apparatus 112 is reflected is set in the irradiation range derivation table 60T of each of the three types. Accordingly, even in a case where the irradiation range R of the light is shifted due to the varying of the attachment position of the irradiation apparatus 112, a state where the irradiation range R covers the imaging range PE can be maintained by resolving this shift or reducing an effect of the shift.

Figure 28:
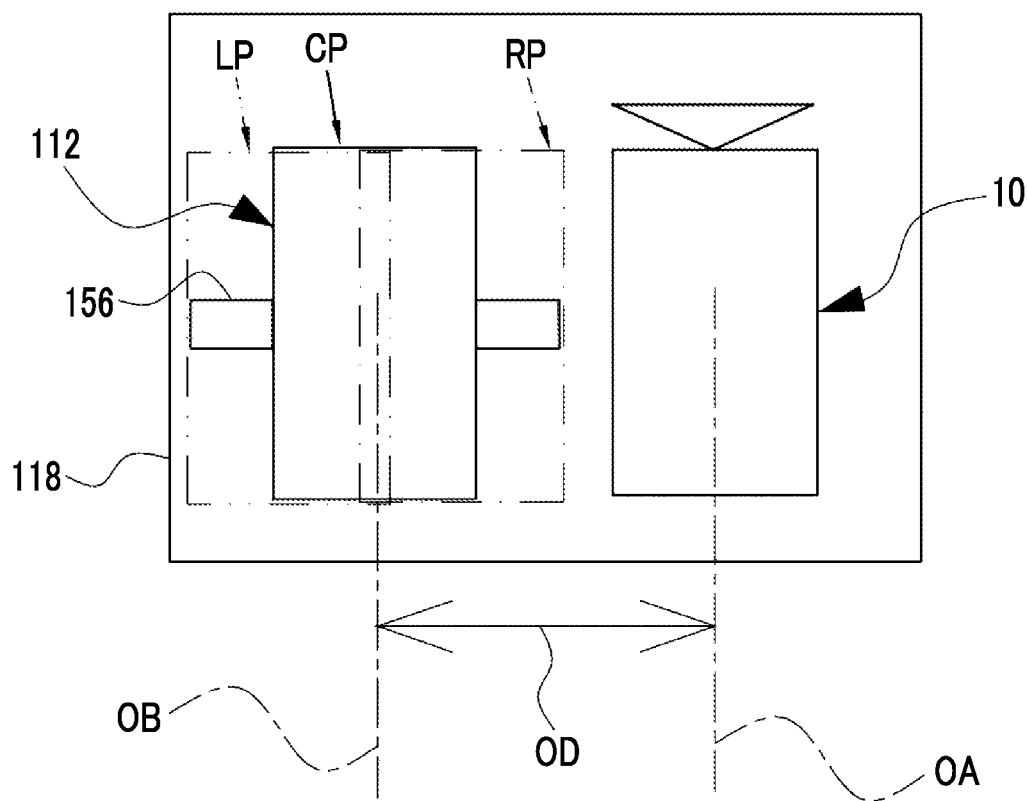
FIG. 28 is a plan view illustrating an example in which an interval between an optical axis of a surveillance camera and an optical axis of an irradiation apparatus is continuously variable in the third modification example.

In the third modification example, while an example in which the plurality of locations are set as the attachment position of the irradiation apparatus 112 is illustrated above, a structure in which the attachment position of the irradiation apparatus 112 is continuously variable may be applied. As illustrated in FIG. 28 as an example, a structure in which a support rail 156 parallel to the pitch axis PA is provided in the support table 118, and the irradiation apparatus 112 slidably moves on the support rail 156 may be employed. In this configuration, for example, a position sensor that detects the position of the irradiation apparatus 112 is provided in the support table 118, and information of the position of the irradiation apparatus 112 is obtained from detection data of the position sensor. In addition, in such a structure in which the attachment position of the irradiation apparatus 112 is continuously variable, in a case where the number of irradiation range derivation tables 60T stored in the storage 60B is plural, that is, finite, a configuration of deriving the irradiation range R by approximately selecting the irradiation range derivation table corresponding to the attachment position of the irradiation apparatus 112 from the finite number of irradiation range derivation tables 60T can be applied. Instead of the irradiation range derivation table 60T, an irradiation range function that takes the shake correction amount D, the focal length X, the subject distance L, and the optical axis interval OD as independent variables and takes the irradiation range R as a dependent variable may be stored in the storage 60B, and the irradiation range R may be calculated using this irradiation range function.

In addition, a structure in which a plurality of optical axis intervals OD are set, and a structure in which the optical axis interval OD is variable are not limited to the above structures. For example, in addition to or instead of the irradiation apparatus 112, a structure in which a plurality of attachment positions of the surveillance camera 10 are set, and a structure in which the attachment position of the surveillance camera 10 is variable may be applied.

In such a manner, in the third modification example, the CPU 60A adjusts the irradiation range R based on the optical axis interval OD, the shake correction amount D, and the focal length X. The imaging range PE can be accurately irradiated with the light from the irradiation apparatus 112 compared to a configuration in which the irradiation range R is adjusted without considering the optical axis interval OD.

Particularly, in the disclosed technology, the CPU 60A also acquires the subject distance L. That is, the CPU 60A adjusts the irradiation range R based on the subject distance L in addition to the optical axis interval OD, the shake correction amount D, and the focal length X. Since the irradiation range R is adjusted by also considering the subject distance L, the imaging range PE can be further accurately irradiated with the light from the irradiation apparatus 112. This means that in a case where the subject distance L is relatively short as illustrated in FIG. 12, the target subject TH is irradiated with the light from a horizontal direction compared to a case where the subject distance L is relatively long as illustrated in FIG. 11. In this case, in a case where the optical axis interval OD is long, the target subject TH is irradiated with the light from a further horizontal direction compared to a case where the optical axis interval OD is short. In such a case, the imaging range PE can be further accurately irradiated with the light from the irradiation apparatus 112 by adjusting the irradiation range R by also considering the subject distance L.

In the third modification example, the optical axis interval OD is said to occur based on the difference in attachment position between the attachment position of the surveillance camera 10 and the attachment position of the irradiation apparatus 112 with respect to the attachment member 114, specifically, the support table 118. The third modification example is a configuration in which the irradiation range R of the light for the target subject TH can be adjusted based on such a difference in attachment position.

The first modification example, the second modification example, and the third modification example are illustrated as an example of application to the configuration of the first embodiment in which the shake correction control is performed by operating the shake correction portion 24. On the other hand, the first modification example, the second modification example, and the third modification example can also be applied to the configuration of the second embodiment in which the registration control is performed by operating the shake correction portion 24.

Figure 29:
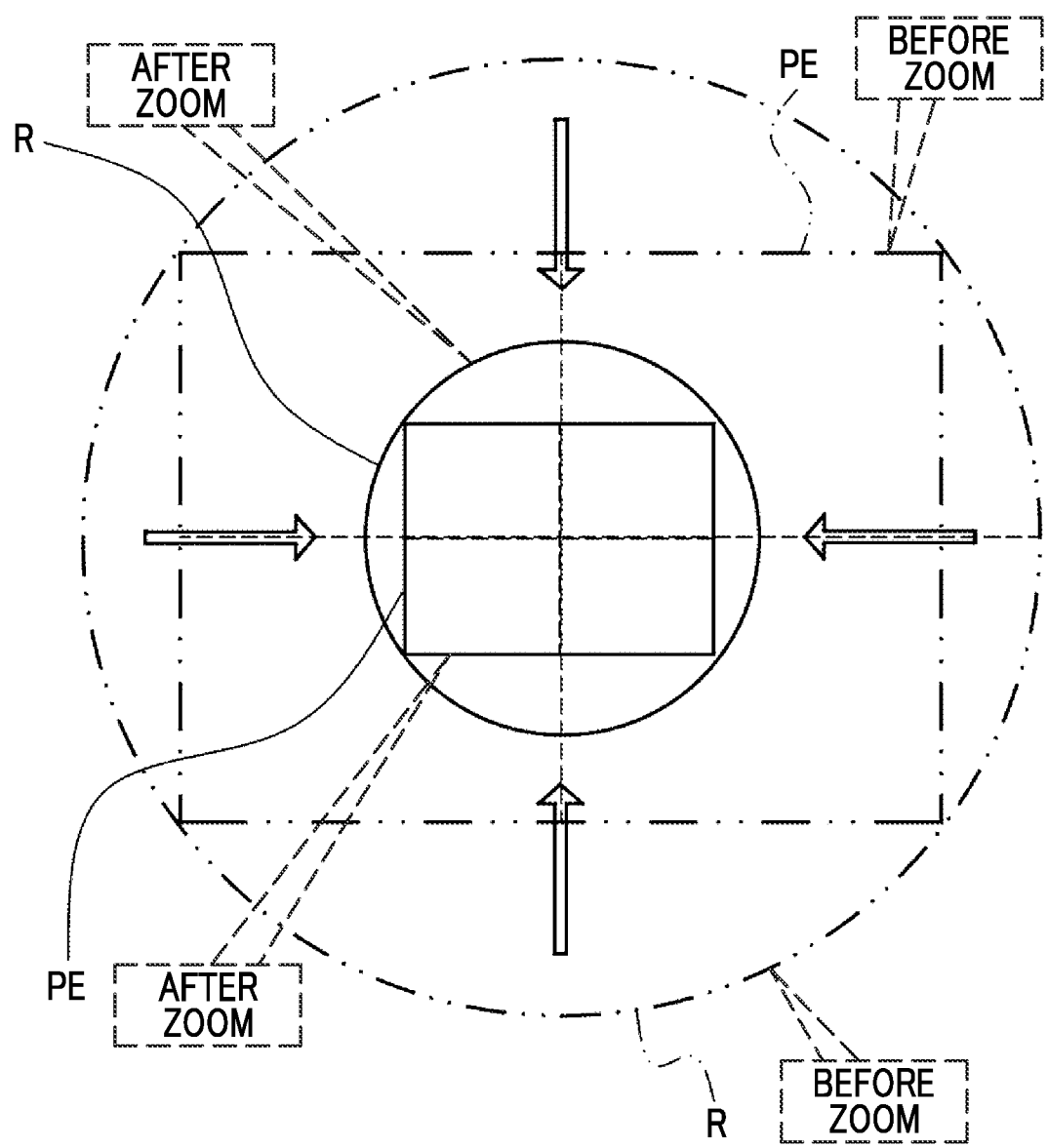
FIG. 29 is a schematic diagram illustrating an example of the captured image and the irradiation range of the light in a state where a focal length is changed from a short state to a long state.
Figure 30:
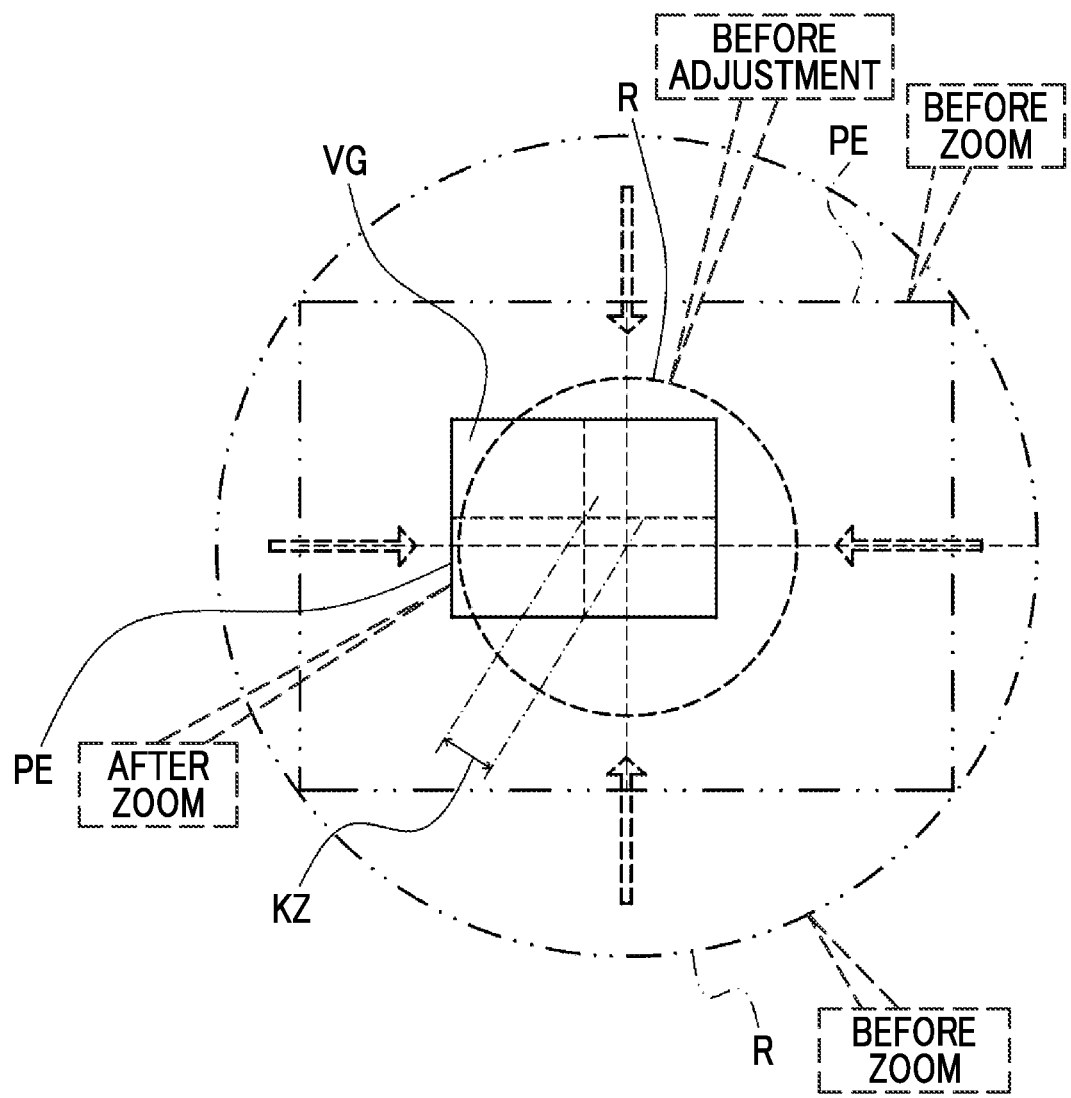
FIG. 30 is a schematic diagram illustrating an example of the captured image and the irradiation range of the light in a state where the focal length is changed from the short state to the long state in a case where an optical axis shift is present.
Figure 31:
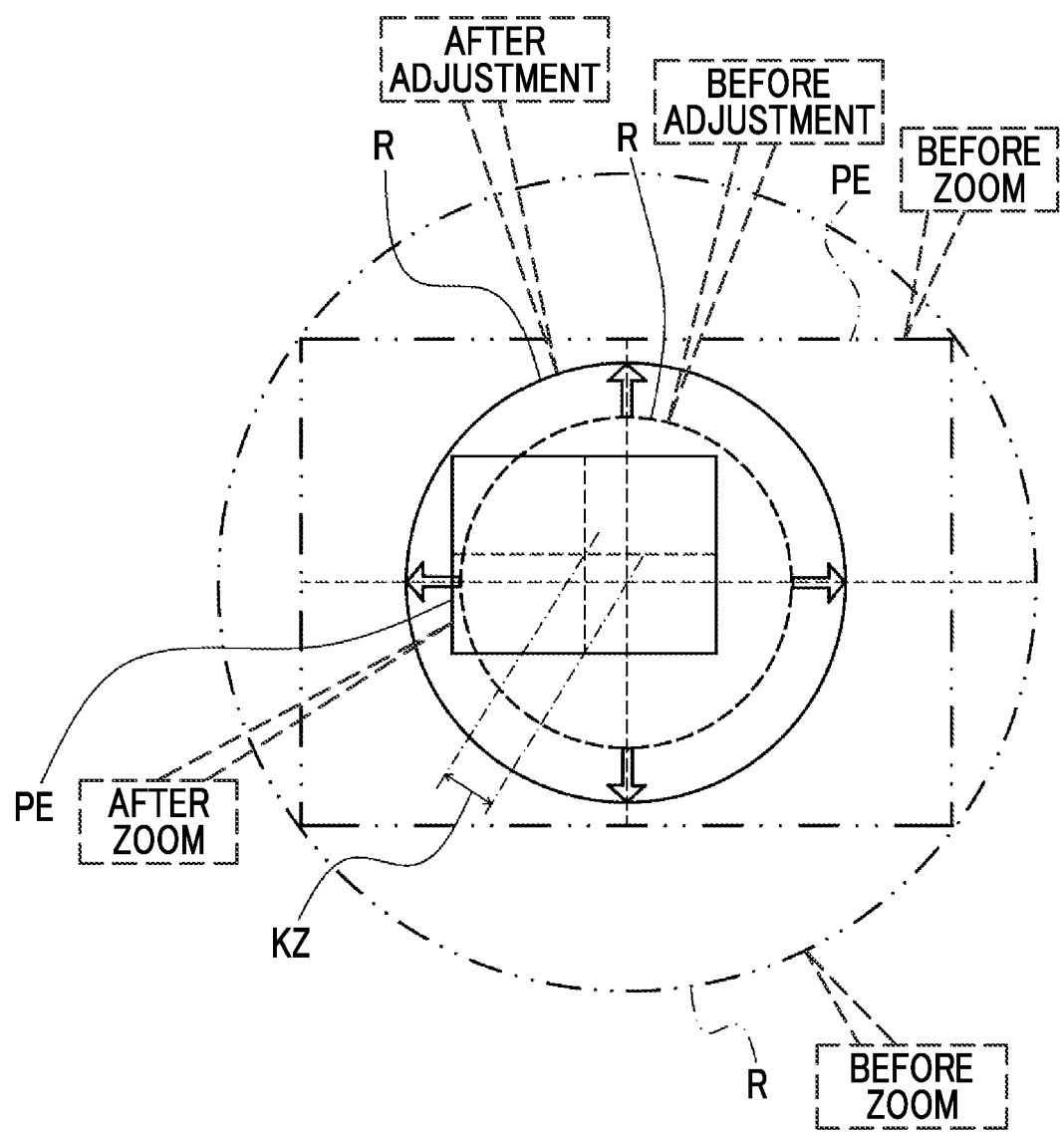
FIG. 31 is a schematic diagram illustrating an example of the captured image and the irradiation range of the light in a state where the focal length is changed from the short state to the long state in a case where the irradiation range is adjusted by considering the optical axis shift.

In the disclosed technology, in a configuration in which the surveillance camera 10 includes the zoom lens 15B2, the focal length X can be continuously changed. FIG. 29 to FIG. 31 illustrate a relationship between the imaging range PE and the irradiation range R in a case where the focal length X of the surveillance camera 10 is increased from a relatively short state.

In FIG. 29, a state illustrated by a dash double dotted line is a short state of the focal length X, and a state illustrated by a solid line is a state after the focal length X is increased. In a case where the focal length X is increased, the angle of view a is narrowed, and the imaging range PE is also narrowed. Accordingly, the irradiation range R is also narrowed. Accordingly, irradiation with the light can be performed by setting the irradiation range R of the light appropriate for a size of the imaging range PE.

A part of the lenses constituting the optical system 15 may be displaced on the optical axis OA in accordance with the increasing of the focal length X of the surveillance camera 10. As illustrated in FIG. 30 as an example, due to shifting of a part of the lenses of the surveillance camera 10, the imaging range PE may be displaced compared to a case where the optical axis OA is not shifted, and a so-called optical axis shift KZ may occur. Due to the optical axis shift KZ, a part that is not irradiated with the light from the irradiation apparatus 112, that is, a vignette VG, may occur in the imaging range PE in a state where the focal length X is increased.

Considering such a case where the vignette VG occurs due to the optical axis shift KZ, for example, as illustrated in FIG. 31, the irradiation range R is widely set in advance to cover the imaging range PE after the focal length X is changed, based on a displacement amount of the lens on the optical axis OA, the shake correction amount D, and the focal length X. Accordingly, the occurrence of the vignette VG due to the optical axis shift KZ can be prevented.

In the disclosed technology, the surveillance camera 10 and the irradiation apparatus 112 are attached to the attachment member 114. In a case where the attachment member 114 vibrates, the light from the irradiation apparatus 112 is adjusted. Accordingly, even in a case where the attachment member 114 vibrates, the imaging range PE can be irradiated with the light of the irradiation apparatus 112.

Particularly, the support table 118 of the attachment member 114 can revolve in the yaw direction and the pitch direction. Thus, for example, in a case where a position of the target subject TH has changed, a control for causing an image of the target subject TH to fall within the imaging range PE can be performed by first causing the support table 118 to revolve in the yaw direction and the pitch direction to cause the surveillance camera 10 to revolve. In this case, the irradiation apparatus 112 revolves together with the surveillance camera 10 and can irradiate the imaging range PE. For example, in a case where the target subject TH has moved, a configuration in which the imaging range PE is accurately irradiated with the light from the irradiation apparatus 112 by performing the registration control of positioning the target subject TH in the center region of the imaging range PE in the surveillance camera 10 can be implemented. Furthermore, even in a case where the vibration of the support table 118 acts on the surveillance camera 10 and the irradiation apparatus 112, a configuration in which the imaging range PE is accurately irradiated with the light from the irradiation apparatus 112 by performing the shake correction control of suppressing a shake of the target subject in the surveillance camera 10 can be implemented.

As described above, in each of the embodiments, the CPU 60A that is an example of the processor acquires the shake correction amount D and the focal length X and adjusts the irradiation range R of the light based on the acquired shake correction amount D and focal length X. Accordingly, in any of a case where a position of the captured image is adjusted by operating the shake correction portion 24 as in the first embodiment, and a case where the captured image is displaced by following the movement of the target subject TH by operating the shake correction portion 24 as in the second embodiment, the target subject TH can be irradiated with the light of irradiation from the irradiation apparatus 112.

In each of the embodiments, the CPU 60A that is an example of the processor acquires the subject distance L of the surveillance camera 10. The CPU 60A adjusts the irradiation range R of the light of irradiation from the irradiation apparatus 112 based on the subject distance L in addition to the shake correction amount D and the focal length X. While a configuration of adjusting the irradiation range R without considering the subject distance L can also be applied, the target subject TH can be further accurately irradiated with the light from the irradiation apparatus 112 compared to the configuration of adjusting the irradiation range R without considering the subject distance L.

In each of the embodiments, the intensity of the light of irradiation from the irradiation apparatus 112 can be adjusted based on the subject distance L. For example, in a case where the subject distance L is short, the intensity of the light is relatively decreased. In a case where the subject distance L is long, the intensity of the light is relatively increased. In such a manner, the intensity of the light is adjusted based on the subject distance L. Thus, insufficient intensity of the light for the target subject TH or conversely, irradiation of the target subject TH with excessively high intensity of the light can be suppressed compared to a case where the intensity of the light is changed without considering the subject distance L, and a case where the intensity of the light is constant.

In each of the embodiments, the irradiation apparatus 112 performs surface irradiation of the target subject TH with the light. A control of irradiating the target subject TH with a center region (refer to FIG. 7) of the light of the surface irradiation is performed. The target subject TH can be irradiated with the light of the center region having higher intensity of the light than an edge part region. Particularly, in a case of the second embodiment in which the registration control is performed to position the target subject TH in the center region of the imaging range PE, the target subject TH positioned in the center region of the imaging range PE can be irradiated with the light of the center region.

In the disclosed technology, the CPU 60A may receive values of the shake correction amount D, the focal length X, the subject distance L, and the optical axis interval OD or may derive the values by calculation or derivation from data related to the values instead of the values.

Figure 32:
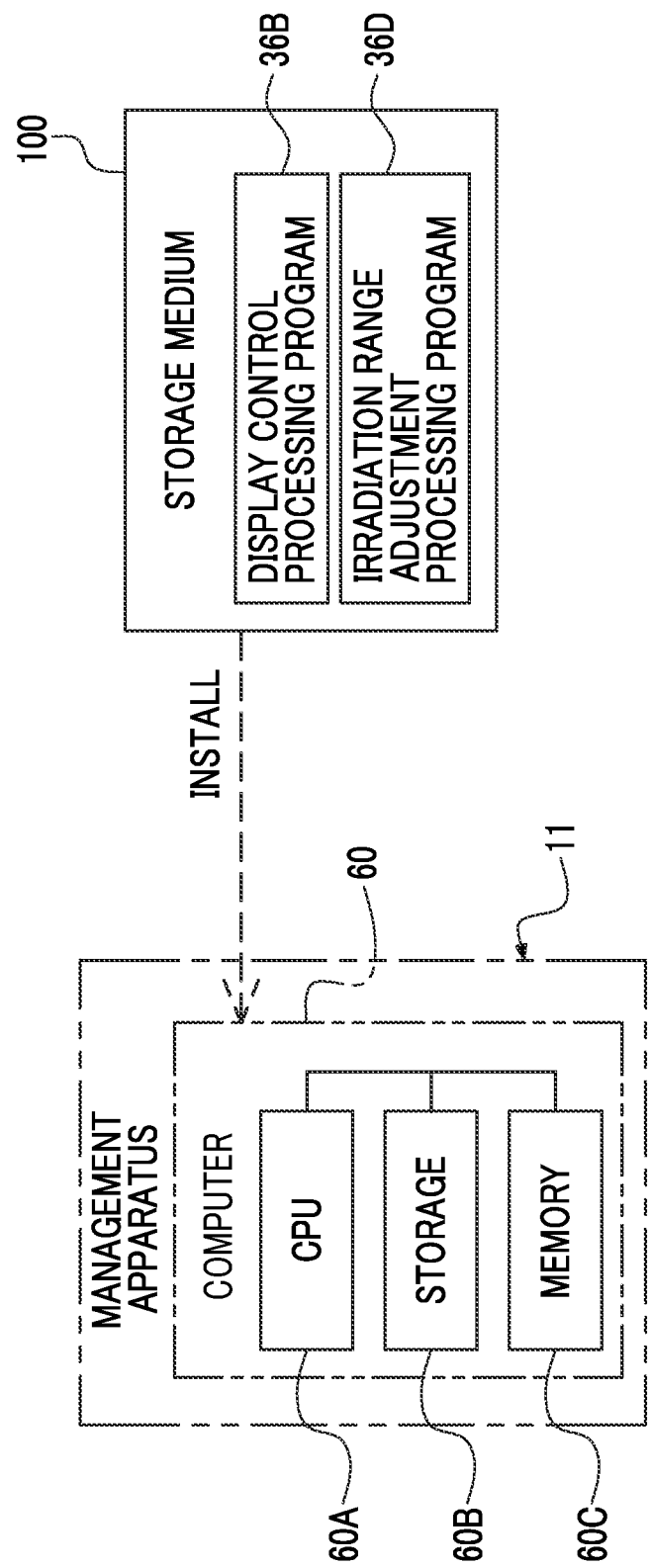
FIG. 32 is a conceptual diagram illustrating an example of an aspect in which a display control processing program and an irradiation range adjustment processing program are installed on a computer in the management apparatus from a storage medium storing the display control processing program and the irradiation range adjustment processing program according to the embodiment.

In each of the embodiments, the storage 60B of the management apparatus 11 stores the display control processing program 60P and the irradiation range adjustment processing program 60Q. An example of a form of executing these programs in the memory 60C of the management apparatus 11 is illustrated. The disclosed technology is not limited thereto. For example, an example in which these programs are stored in the storage 36 of the surveillance camera 10, and the CPU 37 of the surveillance camera 10 executes these programs in the memory 35 may be applied. Furthermore, as illustrated in FIG. 32 as an example, the display control processing program 60P and the irradiation range adjustment processing program 60Q may be stored in a storage medium 100 that is a non-transitory storage medium. In a case of the example illustrated in FIG. 32, the display control processing program 60P and the irradiation range adjustment processing program 60Q stored in the storage medium 100 are installed on the computer 60. The CPU 60A executes each processing described above in accordance with the display control processing program 60P and the irradiation range adjustment processing program 60Q.

In each of the embodiments and the modification examples, the CPU 60A is a single CPU. However, the disclosed technology is not limited thereto, and a plurality of CPUs may be employed. Examples of the storage medium 100 include any portable storage medium such as an SSD or a USB memory.

In addition, the display control processing program 60P and the irradiation range adjustment processing program 60Q may be stored in a storage unit of another computer, a server apparatus, or the like connected to the computer 60 through a communication network (not illustrated), and the display control processing program 60P and the irradiation range adjustment processing program 60Q may be downloaded to the computer 60 in response to a request of the management apparatus 11. In this case, the downloaded display control processing program 60P is executed by the CPU 60A of the computer 60.

In addition, in each of the embodiments, while an example of a form in which a shake correction amount calculation portion 60J, the subject image detection portion 60K, the image position determination portion 60L, the shift correction amount calculation portion 60M, and the control portion 60H are implemented by a hardware configuration using the computer 60 is illustratively described, the disclosed technology is not limited thereto. For example, the shake correction amount calculation portion 60J, the subject image detection portion 60K, the image position determination portion 60L, the shift correction amount calculation portion 60M, and the control portion 60H may be implemented by a device including an ASIC, an FPGA, and/or a PLD. In addition, the shake correction amount calculation portion 60J, the subject image detection portion 60K, the image position determination portion 60L, the shift correction amount calculation portion 60M, and the control portion 60H may be implemented by a combination of a hardware configuration and a software configuration.

Various processors illustrated below can be used as a hardware resource for executing the registration control processing and the irradiation range adjustment processing (hereinafter, these processing will be collectively referred to as "control processing"). Examples of the processors include a CPU that is a general-purpose processor functioning as the hardware resource for executing the control processing by executing software, that is, the programs. In addition, examples of the processors include a dedicated electric circuit such as an FPGA, a PLD, or an ASIC that is a processor having a circuit configuration dedicatedly designed to execute specific processing. Any of the processors incorporates or is connected to a memory, and any of the processors executes the control processing using the memory.

The hardware resource for executing the control processing may be configured with one of those various processors or may be configured with a combination of two or more processors of the same type or different types (for example, a combination of a plurality of FPGAs or a combination of a CPU and an FPGA). In addition, the hardware resource for executing the control processing may be one processor.

Examples of a configuration with one processor include, first, a form in which one processor is configured with a combination of one or more CPUs and software, and the processor functions as the hardware resource for executing processing of each of the shake correction amount calculation portion 60J, the subject image detection portion 60K, the image position determination portion 60L, the shift correction amount calculation portion 60M, and the control portion 60H. Second, as represented by an SoC or the like, a form of using a processor that implements, by one IC chip, functions of the entire system including a plurality of hardware resources for executing the control processing is included. In such a manner, the processing of each of the shake correction amount calculation portion 60J, the subject image detection portion 60K, the image position determination portion 60L, the shift correction amount calculation portion 60M, and the control portion 60H is implemented using one or more of the various processors as the hardware resource.

Furthermore, more specifically, an electric circuit in which circuit elements such as semiconductor elements are combined can be used as a hardware structure of those various processors.

In addition, the control processing is merely an example. Accordingly, unnecessary steps may be deleted, new steps may be added, or a processing order may be rearranged without departing from the gist of the disclosed technology.

In addition, in each of the embodiments, while the surveillance camera 10 is illustrated as an example of the imaging apparatus according to the embodiment of the disclosed technology, the disclosed technology is not limited thereto. For example, the disclosed technology can also be applied to various electronic apparatuses such as a portable lens-interchangeable camera, a portable fixed lens camera, a personal computer, a smart device, or a wearable terminal apparatus instead of the surveillance camera 10. The same actions and effects as the surveillance camera 10 described in each of the embodiments are also obtained for these electronic apparatuses.

Above described contents and illustrated contents are detailed description for parts according to the embodiment of the disclosed technology and are merely an example of the disclosed technology. For example, description related to the above configurations, functions, actions, and effects is description related to an example of configurations, functions, actions, and effects of the parts according to the embodiment of the disclosed technology. Thus, unnecessary parts may be removed, new elements may be added, or parts may be replaced in the above described contents and the illustrated contents without departing from the gist of the disclosed technology. In addition, particularly, description related to common technical knowledge or the like that does not need to be described in terms of embodying the disclosed technology is omitted in the above described contents and the illustrated contents in order to avoid complication and facilitate understanding of the parts according to the embodiment of the disclosed technology.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

What is claimed is:

1. An imaging support device comprising:
a processor; and a memory that is connected to or incorporated in the processor, wherein the processor is configured to acquire data related to a shake correction amount of a shake correction mechanism and data related to a focal length of an imaging apparatus in a state where the shake correction mechanism of the imaging apparatus is operating, and adjust an irradiation range of light from an irradiation apparatus for a target subject based on the acquired data related to the shake correction amount and the acquired data related to the focal length, and wherein the processor configured to acquire data related to a subject distance from the imaging apparatus to the target subject and adjust the irradiation range based on the data related to the subject distance in addition to the data related to the shake correction amount and the data related to the focal length, and the memory stores information of the irradiation range corresponding to the shake correction amount, the focal length, and the subject distance.

2. The imaging support device according to claim 1, wherein the irradiation apparatus is capable of changing intensity of the light, and the processor is further configured to adjust the intensity of the light based on the subject distance.

3. The imaging support device according to claim 1, wherein the processor is configured to adjust the irradiation range based on data related to an interval between an optical axis of a lens of the irradiation apparatus and an optical axis of a lens of the imaging apparatus, the data related to the shake correction amount, and the data related to the focal length.

4. The imaging support device according to claim 1, wherein the processor is configured to adjust the irradiation range based on data related to an interval between an optical axis of a lens of the irradiation apparatus and an optical axis of a lens of the imaging apparatus, the data related to the shake correction amount, the data related to the subject distance, and the data related to the focal length.

5. The imaging support device according to claim 1, wherein the processor is configured to adjust the irradiation range in a case where a registration control of displacing a captured image by operating the shake correction mechanism is performed.

6. The imaging support device according to claim 5, wherein the processor is configured to, in the registration control within a predetermined time period, adjust the irradiation range within a range that is restricted in accordance with a maximum value of a displacement amount of a target subject image in the captured image.

7. The imaging support device according to claim 1, wherein the processor is configured to adjust the irradiation range in a case where a shake correction control of correcting an image shake due to an external vibration exerted on the imaging apparatus by operating the shake correction mechanism is performed.

8. The imaging support device according to claim 7, wherein the processor is configured to, in the shake correction control within a predetermined time period, adjust the irradiation range within a range that is restricted in accordance with a maximum correction amount of the image shake.

9. The imaging support device according to claim 1, wherein the irradiation apparatus performs surface irradiation of the target subject with the light, and the processor is configured to perform, on the irradiation apparatus, a control of irradiating the target subject with a center region of the light of the surface irradiation from the irradiation apparatus.

10. The imaging support device according to claim 1, wherein the imaging apparatus includes a lens that is movable along an optical axis, and the processor is configured to adjust the irradiation range based on data related to a displacement amount of the lens on the optical axis, the data related to the shake correction amount, and the data related to the focal length.

11. An imaging system comprising:

the imaging support device according to claim 1;

the irradiation apparatus; and the imaging apparatus, wherein the irradiation apparatus irradiates the irradiation range adjusted by the imaging support device with the light, and the imaging apparatus images the target subject in a state where the irradiation range is irradiated with the light.

12. The imaging system according to claim 11, further comprising:

an attachment member to which the irradiation apparatus and the imaging apparatus are attached.

13. The imaging system according to claim 12, wherein the processor is configured to adjust the irradiation range of the light for the target subject based on a difference in attachment position between an attachment position of the irradiation apparatus with respect to the attachment member and an attachment position of the imaging apparatus with respect to the attachment member.

14. The imaging system according to claim 12, wherein the attachment member enables the irradiation apparatus and the imaging apparatus to revolve.

15. An imaging support method comprising:

acquiring a shake correction amount of a shake correction mechanism and a focal length of an imaging apparatus in a state where the shake correction mechanism is operating in the imaging apparatus including the shake correction mechanism; and adjusting an irradiation range of light from an irradiation apparatus for a target subject that is a target of imaging, based on the acquired shake correction amount and the acquired focal length, and wherein the imaging support method further comprising:

acquiring a subject distance from the imaging apparatus to the target subject and adjusting the irradiation range based on the subject distance in addition to the shake correction amount and the focal length, and storing information of the irradiation range corresponding to the shake correction amount, the focal length, and the subject distance.

16. A non-transitory recording medium recording a program causing a computer to execute a process comprising:

acquiring a shake correction amount of a shake correction mechanism and a focal length of an imaging apparatus in a state where the shake correction mechanism is operating in the imaging apparatus including the shake correction mechanism; and adjusting an irradiation range of light from an irradiation apparatus for a target subject that is a target of imaging, based on the acquired shake correction amount and the acquired focal length, and wherein the program causing the computer to execute the process further comprising:

acquiring a subject distance from the imaging apparatus to the target subject and adjusting the irradiation range based on the subject distance in addition to the shake correction amount and the focal length, and storing information of the irradiation range corresponding to the shake correction amount, the focal length, and the subject distance.

* * * * *